US011782326B2

(12) United States Patent  
Tenniswood et al.

(10) Patent No.: US 11,782,326 B2  
(45) Date of Patent: Oct. 10, 2023

(54) LIGHTING DEVICE FOR CAMERA AND MOUNTING BRACKET

(71) Applicant: ONEOFF INDUSTRIES LTD., Vancouver (CA)

(72) Inventors: David Mark Tenniswood, Vancouver (CA); Dmytro Kolesnyk, Vancouver (CA)

(73) Assignee: ONEOFF INDUSTRIES LTD., Vancouver (CA)

( * ) Notice: Subject to any disclaimer, the term of this patent is extended or adjusted under 35 U.S.C. 154(b) by 9 days.

(21) Appl. No.: 17/924,310

(22) PCT Filed: May 15, 2020

(86) PCT No.: PCT/CA2020/050663  
§ 371 (c)(1),  
(2) Date: Nov. 9, 2022

(87) PCT Pub. No.: WO2021/226697  
PCT Pub. Date: Nov. 18, 2021

(65) Prior Publication Data  
US 2023/0122805 A1    Apr. 20, 2023

(51) Int. Cl.  
*G03B 15/05*    (2021.01)

(52) U.S. Cl.  
CPC ...... *G03B 15/05* (2013.01); *G03B 2215/0539* (2013.01)

(58) Field of Classification Search  
CPC .................................................. G03B 15/05  
See application file for complete search history.

(56) References Cited

U.S. PATENT DOCUMENTS

| | | | |
|---|---|---|---|
| 4,019,042 A * | 4/1977 | Baliozian | G03B 15/02 362/16 |
| 7,633,521 B2 | 12/2009 | Perlman et al. | |
| 7,690,801 B2 | 4/2010 | Amphlett | |
| 8,506,125 B2 | 8/2013 | Pohlert et al. | |
| 9,097,957 B2 | 8/2015 | Pohlert et al. | |
| 10,156,730 B1 | 12/2018 | Comploi et al. | |
| 10,345,682 B1 * | 7/2019 | Jamison, Jr. | G03B 11/045 |

(Continued)

FOREIGN PATENT DOCUMENTS

GB    2434198 A    7/2007

OTHER PUBLICATIONS

Crimson Engine. "Upgrade your Matte Box with a Light." YouTube, YouTube, Mar. 19, 2021, https://www.youtube.com/watch?v=Yi2rt7USj3U. (Year: 2021).*

(Continued)

*Primary Examiner* — Clayton E. LaBalle  
*Assistant Examiner* — Diana Hancock  
(74) *Attorney, Agent, or Firm* — Norton Rose Fulbright Canada LLP; Maya Medeiros

(57) ABSTRACT

A lighting device with an annular rectangular light that connects to the camera assembly by mechanical linkages. The annular rectangular light can connect to different components of a camera. The annular rectangular light can connect to a matte box or rods of the camera in some embodiments. The mechanical linkages allow positioning of the annular rectangular light such that it surrounds the front of a lens of the camera but does not obstruct a field of view of the lens.

27 Claims, 55 Drawing Sheets

(56) References Cited

U.S. PATENT DOCUMENTS

| | | |
|---|---|---|
| 10,701,253 B2 | 6/2020 | Knoll et al. |
| 2006/0093344 A1 | 5/2006 | Neel |
| 2015/0345736 A1 | 12/2015 | Colacilli |
| 2019/0238741 A1* | 8/2019 | Atkinson ................. G01C 3/08 |
| 2019/0268518 A1 | 8/2019 | Howard et al. |
| 2021/0382373 A1* | 12/2021 | Zeng .................... G03B 17/566 |
| 2022/0299842 A1* | 9/2022 | Wampler ........... G06K 19/0723 |

OTHER PUBLICATIONS

International Search Report and Written Opinion of International Application No. PCT/CA2020/050663 dated Feb. 4, 2021.
International Preliminary Report on Patentability of International Application No. PCT/CA2020/050663 dated Sep. 14, 2021.

* cited by examiner

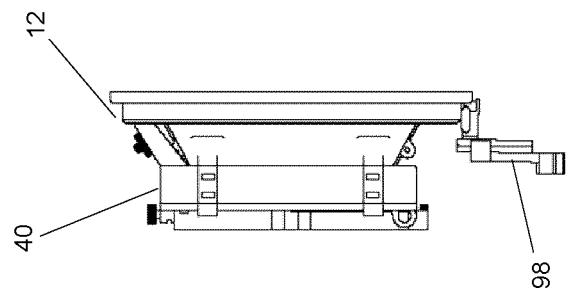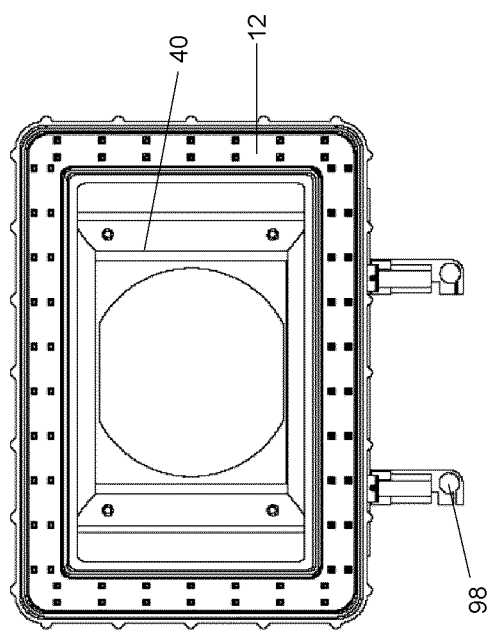
FIG. 33

LIGHTING DEVICE FOR CAMERA AND MOUNTING BRACKET

FIELD

The present disclosure generally relates to the field of lighting devices, and in particular, lighting devices for cinema cameras.

INTRODUCTION

Embodiments described herein relate to devices for lighting camera subjects. Embodiments described herein relate to lighting devices for lighting subjects from the camera.

SUMMARY

In accordance with an aspect, there is provided a lighting device for a camera assembly. The light device has a light surface that projects light, the light surface having an annular rectangular shape to surround a front of a lens of the camera assembly, and at least one mechanical linkage with a link to attach to a matte box of the camera assembly and position the light surface outside a field of view of the lens.

In some embodiments, the at least one mechanical linkage has at least two translational degrees of freedom relative to the light surface. For example, in some embodiments, the mechanical linkage has three translational degrees of freedom relative to the light surface.

In some embodiments, the at least one mechanical linkage comprises two mechanical linkages. For example, in some embodiments, there can be a mechanical linkage for a matte box of the camera and a mechanical linkage for a rod of the camera.

In some embodiments, the light surface projects light away from the front of the lens in a first configuration of the lighting device, and causes light to be projected towards the front of the lens in a second configuration of the lighting device. In another embodiment the lighting device could project light in two directions. The light surface can project light away from the lens and toward the lens simultaneously, for example.

In some embodiments, the lighting surface has a plurality of addressable light emitting diodes (LEDs) configured to project light.

In some embodiments, the lighting device has at least one processor operatively coupled to the light surface, and non-transitory machine-readable memory storing instructions. The instructions are configured to control the processor to: receive an input indicative of a state of the light surface, and cause the light surface to achieve the state by sending an output to the light surface based on the input.

In some embodiments, the light surface includes a plurality of digital addressable light emitting diodes (LEDs) configured to project light via the lighting surface. The state of the light surface includes a color and an intensity of each of the plurality of digital addressable LEDs, for example.

In some embodiments, the at least one mechanical linkage is configured to position the light surface in front of the matte box of the camera assembly. In another embodiment the at least one mechanical linkage is configured to position the light surface behind the matte box of the camera assemble, or behind the front of the lens.

In some embodiments, the at least one mechanical linkage has a first end connected to the light surface and a second end configured to attach to the matte box, the link of the mechanical linkage slidably engaged with the first end to position the second end.

In some embodiments, the link is a first link and a mechanical linkage of the at least one mechanical linkage includes a second link slidably engaged with the first link, wherein a direction of slidable engagement of the second link with the first link is different than a direction of slidable engagement of the first link with the first end.

In some embodiments, the at least one mechanical linkage has a first end and a second end, the first end connected to the light surface, the second end configured to attach to a mounting adapter of the matte box of the camera assembly, the mounting adapter being of a first type of mounting adapter.

In some embodiments, at least one link of the mechanical linkage is removable to change the second end of the at least one mechanical linkage such that the second end is configured to attach to a second mounting adapter, the second mounting adapter being of a second type of mounting adapter.

In some embodiments, at least one mechanical linkage has a first end connected to the light surface and a second end configured to attach to the matte box, wherein a mechanical linkage of the at least one mechanical linkage includes a third link fixedly connected to the second end of the mechanical linkage, a second link connected to the third link via a pivot joint, the second link slidably engaged with the first link of the mechanical linkage.

In some embodiments, the first link is slidably engaged with the first end.

In some embodiments, at least one mechanical linkage has a first end and a second end, the first end connected to the light surface, the second end including a connector configured to connect to a rod of the camera assembly.

In some embodiments, the connector is an adjustable clamp configured to receive a rod diameter within a range.

In some embodiments, at least one mechanical linkage includes two mechanical linkages, each mechanical linkage has a first end connected to the light surface and a second end configured to attach to the matte box, a spacing between the second ends of the two mechanical linkages being adjustable within a range.

In some embodiments, at least one mechanical linkage has a first end connected to the light surface and a second end configured to attach to the matte box, wherein the mechanical linkage comprises an adjustable joint for positioning the second end relative to the first end, a fastener coupled to the adjustable joint to permit movement of the adjustable joint in a first configuration and prevent movement of the adjustable joint in a second configuration.

In some embodiments, at least one mechanical linkage has a first end and a second end, the first end connected to the light surface, the at least one mechanical linkage configured to offset the second end of the mechanical linkage with respect to a center of the front of the lens from between a first range in a vertical direction and from between a second range in a horizontal direction, wherein the vertical and horizontal directions are parallel to a plane of the front of the lens.

In some embodiments, an aspect ratio of the lighting surface is proportional to the field of view of the lens.

In some embodiments, the link attaches to a matte box wing of the matte box.

In some embodiments, there is provided the camera assembly with the lighting device.

In another aspect, there is provided a lighting device for a camera assembly comprising: a light surface that projects light, the light surface having an annular rectangular shape to surround a front of a lens of the camera assembly; and at least one mechanical linkage with a link to attach to the camera assembly and flexibly position the light surface outside a field of view of the lens.

In another aspect, there is provided a lighting device for a camera assembly comprising: a light surface that projects light, the light surface having an annular rectangular shape to surround a front of a lens of the camera assembly; and a plurality of mechanical linkages to attach to a matte box of the camera assembly and position the light surface outside a field of view of the lens, wherein the linkages have enable movement in a plurality of degrees of freedom.

In another aspect, there is provided a lighting device for a camera assembly comprising: a light surface that projects light, the light surface having an annular rectangular shape to surround a front of a lens of the camera assembly; and a plurality of mechanical linkages to position the light surface outside a field of view of the lens, wherein the linkages are configured to move the light surface relative to the camera assembly in multiple planes of motion.

In another aspect, there is provided a lighting device for a camera assembly comprising: a light surface that projects light, the light surface having an annular rectangular shape to surround a front of a lens of the camera assembly; and a plurality of mechanical linkages to attach to the camera assembly and position the light surface outside a field of view of the lens, wherein the linkages provide a bracket system and a rod system, wherein the linkages have enable movement of the light surface relative to the camera assembly.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIG. 33 shows a variant of the lighting device with the LED ring integrated into the matte box with a rod mount.

DETAILED DESCRIPTION

Embodiments of methods, systems, and apparatus are described through reference to the drawings. Embodiments can provide a bespoke, highly controllable, lightweight solution for lighting subjects from the camera. Embodiments can provide a camera-mounted consistent light.

Figure 1:
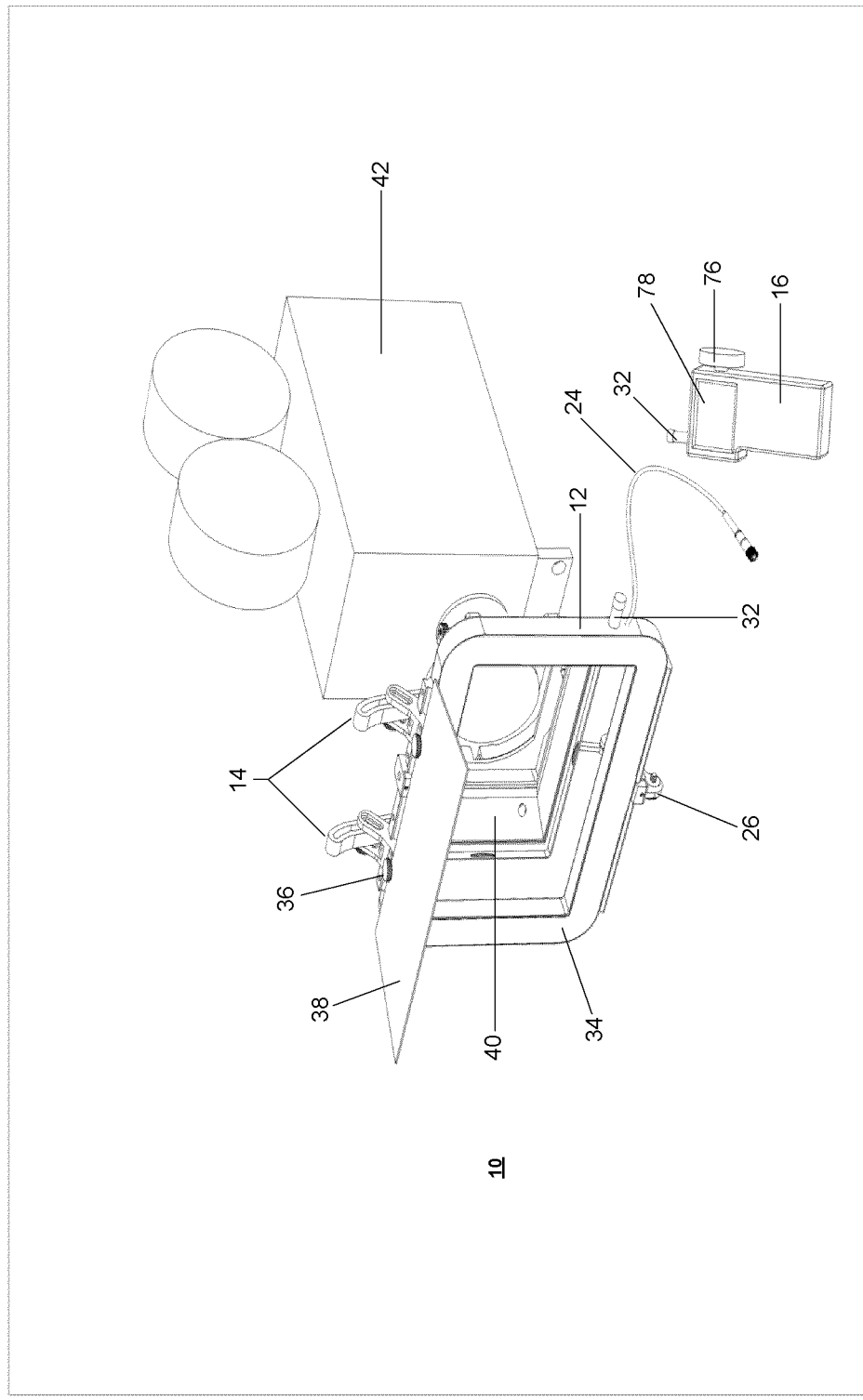
FIG. 1 shows a lighting device with an annular rectangular light.

FIG. 1 shows a lighting device 10 with an annular rectangular light 12 that connects to the camera assembly 42 by mechanical linkages. Different types of mechanical linkages can be used for lighting device 10. Example mechanical linkages are shown in FIG. 1 as bracket system 14. Other example mechanical linkages include rod mounts or supports. The camera assembly 42 can be a cinema camera.

Figure 24:
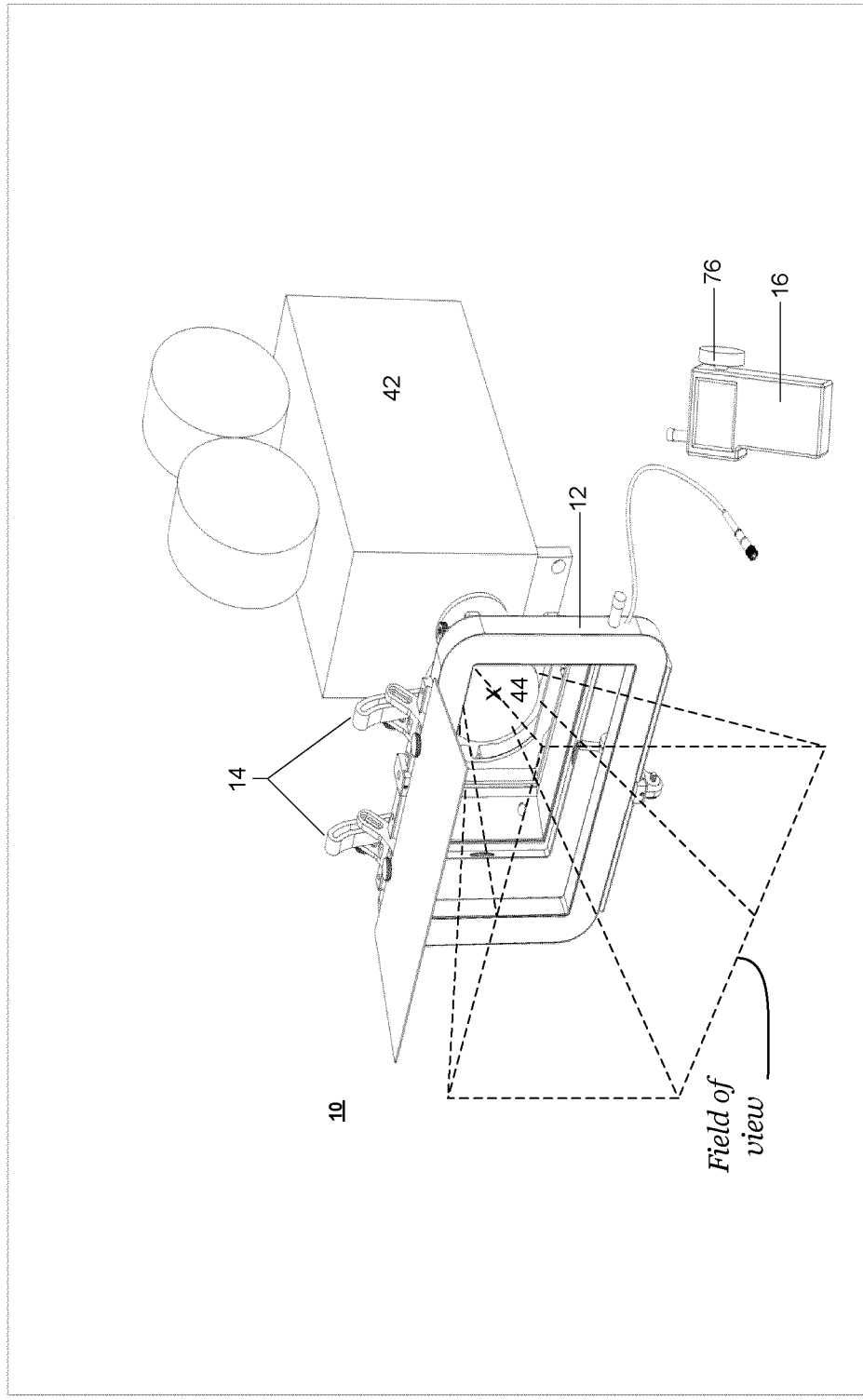
FIG. 24 shows a lighting device with an annular rectangular light.

The annular rectangular light 12 is a light surface that projects light. The annular rectangular light 12 has a shape to surround a front of a lens 44 of the camera assembly 42. The mechanical linkages have links to attach the annular rectangular light 12 to the camera assembly 42 and flexibly position the annular rectangular light 12 outside a field of view (FOV) of the lens 44. The annular rectangular light 12 has addressable light emitting diodes (LEDs) to project light. An example FOV of the lens 44 is shown in FIG. 24.

The mechanical linkages can connect the annular rectangular light 12 to a matte box 40 in some embodiments. For example, a mechanical linkage can have a link to attach to a matte box 40 of the camera assembly 42 and position the annular rectangular light 12 outside a field of view (FOV) of the lens 44. In this example, the mechanical linkages can be referred to as a bracket system 14 to connect the annular rectangular light 12 to the matte box 40. The annular rectangular light 12 can be referred to as an annular rectangular LED housing in some example embodiments.

The mechanical linkage allows positioning of the annular rectangular light 12 such that it surrounds the front of a lens 44 of the camera 42 but does not obstruct a FOV of the lens 44. The bracket system 14 can position the annular rectangular light 12 such that it surrounds the front of a lens 44 of the camera 42 but does not obstruct a FOV of the lens 44.

A mechanical linkage may be slidably engaged with the annular rectangular light 12 and opposite ends that attach to the assembly 42 can be positioned. In this example, bracket system 14 can be slidably engaged with the annular rectangular light 12. This may allow relative positioning of mechanical linkages (such as bracket system 14) so that they are compatible with a matte box 40 (or wing of the matte box), accessory mounts, rod spacings, and/or flag mount spacings. The slidable engagement allows for a universal fitting (e.g. when there are two or more mechanical linkages). For example, the rectangular annular configuration is adapted to the rectangular shape of the FOV of the lens 44. The positioning provided by the mechanical linkage allows the lighting to be close to the edge of the FOV while not obstructing the FOV and still lighting around the FOV of the lens 44.

The mechanical linkage allows positioning of the annular rectangular light 12 relative to the lens 44 of the camera 42. For example, the mechanical linkages can provide three translational degrees of freedom in relation to the camera 42, including vertical movement, horizontal movement, forward/backward movement, or rotational movement. In some embodiments, the mechanical linkage allows least two translational degrees of freedom of the annular rectangular light 12 relative to the camera 42. In this example, there are two bracket system 14 includes two links or components shown above the lens 44 of the camera. Other mechanical linkages can be used to position the annular rectangular light 12 relative to the lens 44 of the camera 42.

The lighting device 10 can have a rectangular shape to correspond to the annular rectangular light 12 and can be designed to mount to the front of cinema cameras. The aspect ratio of the annular rectangular light 12 can be proportional to the field of view of the lens 44. The rectangular shape eliminates the issue of a lens vignette (e.g. obstructing the captured area of the camera assembly 42) that a round ring lights present. A round ring light when mounted to a matte box has visible portions in corners of the rectangle frame. For example, the back side of the round ring light might be visible in the FOV of the camera assembly 42 lens 44. The lighting device 10 can have a rectangular shape that matches the capture area of the camera assembly 42 and by mounting around the matte box 40 which is inherently out of the captured area.

The lighting device 10 can have a top flag 38 that connects to the annular rectangular light 12 by connectors 36. The annular rectangular light 12 can have a diffusion filter 34. The lighting device 10 can have a stabilizer arm 26. Matte boxes 40 can use top flags, and the lighting device 10 can mount to the location that the top flag mounts and can provide a replacement mounting point.

The lighting device 10 can have an antenna 32 configured to communicate with another antenna 32 of a control handset 16. The control handset 16 can have a control screen 78 or display with a dimming wheel 76 to control the annular rectangular light 12.

The lighting device 10 can have a system power cable 24 that connects to the annular rectangular light 12.

The mechanical linkages can have multiple links and different configurations. The bracket system 14 can have multiple links and different configurations.

The mechanical linkage is configured to position the annular rectangular light 12 in front of the matte box 40 of the camera assembly 42. The mechanical linkage has a first end connected to the annular rectangular light 12 and a second end configured to attach to the matte box 40. A link of the mechanical linkage can be slidably engaged with the first end to position the second end. The mechanical linkage can have multiple links. Another link can be slidably engaged with the first link. The direction of slidable engagement of the second link with the first link is different than a direction of slidable engagement of the first link with the first end.

The mechanical linkage can have a first end and a second end. The first end can be connected to the annular rectangular light 12, and the second end can be configured to attach to a mounting adapter of the matte box 40 of the camera assembly 42. There can be different types of mounting adapters. The mounting adapters can be a first type of mounting adapter, a second type of mounting adapter, third type of mounting adapter, fourth type of mounting adapter, and so on. For example, a mounting adapter can be of a first type of mounting adapter. The mechanical linkage can be removable to change the second end of the at least one mechanical linkage such that the second end is configured to attach to a second mounting adapter. A second mounting adapter can be of a second type of mounting adapter. This enables different types of adapters to be used. This is an example and there can be a number of different types of mounting adapters.

The mechanical linkage can have a first end connected to the annular rectangular light 12 and a second end configured to attach to the matte box 40. The mechanical linkage can have a third link fixedly connected to the second end of the mechanical linkage. A second link can connect to the third link via a pivot joint, and the second link can be slidably engaged with the first link of the mechanical linkage.

The mechanical linkages can be integrated with or part of a rod system. The mechanical linkage can have a first end and a second end. The first end can be connected to the annular rectangular light 12. The second end can have a connector configured to connect to a rod of the camera assembly. The connector can be an adjustable clamp configured to receive a rod diameter ranging from 15 mm to 19 mm, or 2 mm to 50 mm or another range.

The mechanical linkages can be integrated with or part of a bracket system 14. The mechanical linkage can have a first end connected to the annular rectangular light 12 and a second end configured to attach to the matte box 40. There can be a spacing between the ends of two mechanical linkages. The spacing can be adjustable between 25 mm to 212 mm, 20 mm to 1000 mm, or another range, for example.

The mechanical linkage can have a first end connected to the annular rectangular light 12 and a second end configured to attach to the matte box 40. The mechanical linkage has an adjustable joint for positioning the second end relative to the first end. A fastener coupled to the adjustable joint can permit movement of the adjustable joint in a first configuration and prevent movement of the adjustable joint in a second configuration.

The mechanical linkage can have a first end and a second end. The first end connects to the annular rectangular light 12. The mechanical linkage can offset the second end of the mechanical linkage with respect to a center of the front of the lens 44 from between 0 mm and 65 mm, 0 mm and 500 mm, or another range, in a vertical direction and from between 0 mm and 106 mm, −200 mm to 200 mm, or another range, in a horizontal direction. The vertical and horizontal directions are parallel to a plane of the front of the lens 44, for example.

The lighting device 10 can project light in different directions. The lighting device 10 can project light away from the front of the lens 44 in a first configuration, and can cause light to be projected towards the front of the lens 44 in a second configuration. In another embodiment the lighting device 10 can project light in two directions simultaneously. The lighting device can light in front of the lens and toward the lens.

Figure 2:
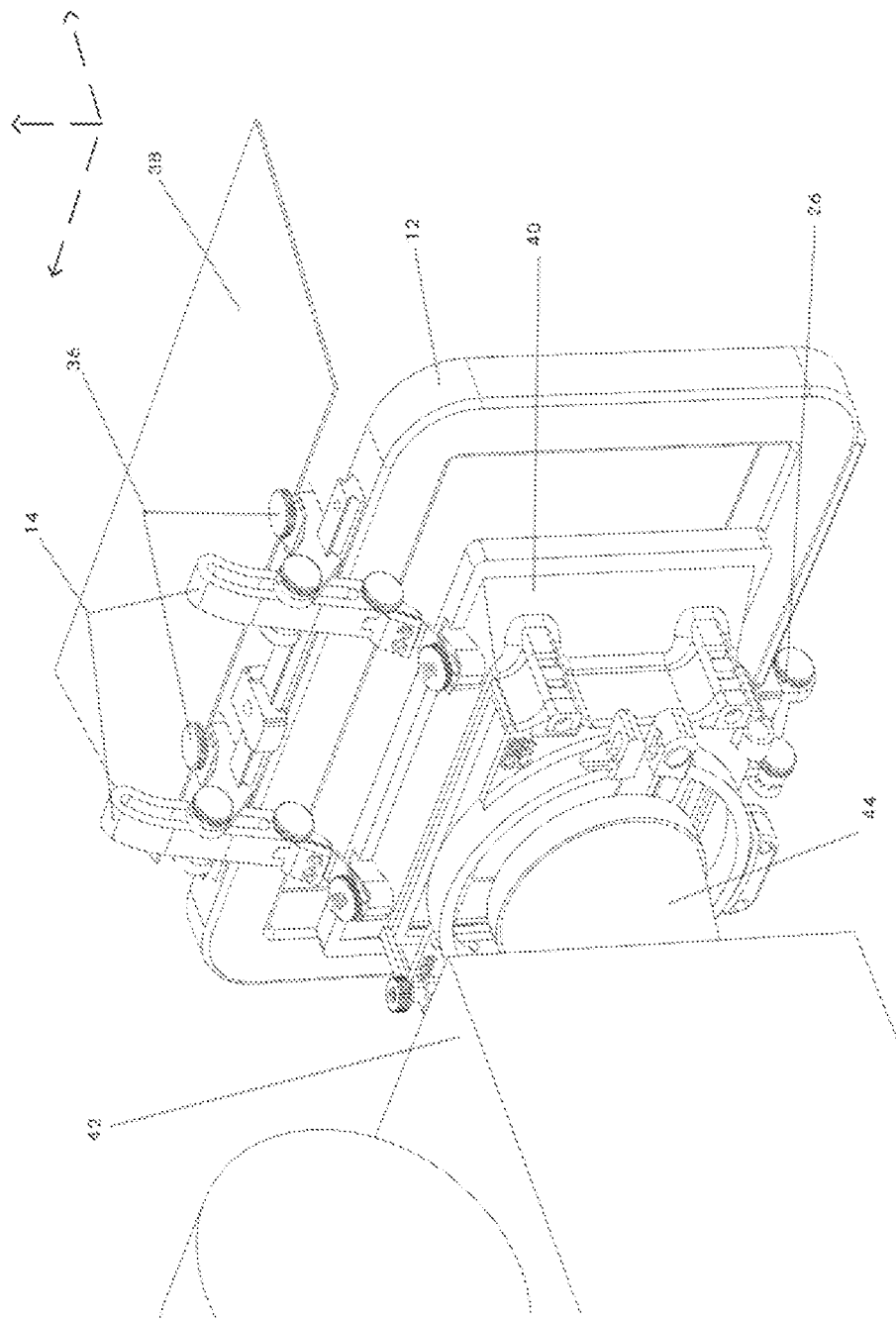
FIG. 2 shows a rear view of the lighting device.

FIG. 2 shows a rear view of the lighting device 10. The lighting device 10 connects to the matte box 40 of the camera assembly 42. The annular rectangular light 12 surrounds the lens 44 of the camera assembly 42. FIG. 2 shows an example of the lighting device 10 projecting light away from the front of the lens 44.

In some embodiments, the lighting device 10 has a stabilizer arm 26 below the matte box 40. The lighting device 10 connects to the matte box 40 using mechanical linkages of the universal bracket system. The lighting device 10 has a top flag 38 that connects to the annular rectangular light 12 by connectors 36. In this example, the connectors are designed to mimic the spacing of the matte box 40.

The mechanical linkages can have links, adjustable fasteners, and pivot joints. In this example, a mechanical linkage has a first end that connects to the annular rectangular light 12 by a first link. The first link can enable movement of the annular rectangular light 12 in a first direction (e.g. horizontal). The first link can connect to (or integrate with) a second link of the mechanical linkage which can have an adjustable fastener. The second link can enable movement of the annular rectangular light 12 in a second direction (e.g. vertical). The mechanical linkage has a second end that connects to the matte box 40 by a third link. The mechanical linkage can have a pivot joint to enable additional movement (e.g. backwards and forwards, pivots). The mechanical linkage can have multiple links and these are examples.

Figure 3:
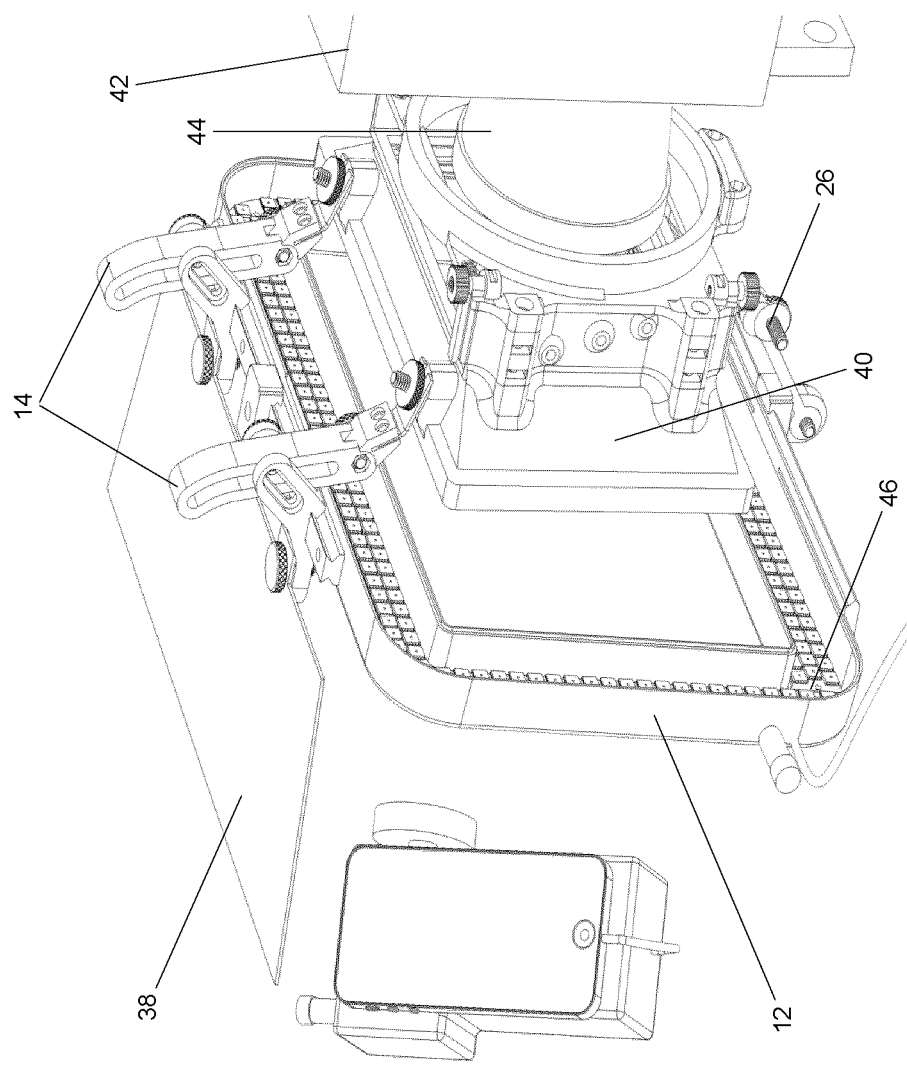
FIG. 3 shows another rear view of the lighting device.

FIG. 3 shows another rear view of the lighting device 10. The lighting device 10 is facing toward the camera 42 with a diffusion insert removed, in this example. The lighting device 10 can have an LED covered printed circuit board 46. The lighting device 10 connects, by the mechanical linkages (e.g. bracket system 14), to the matte box 40 of the camera assembly 42. The annular rectangular light 12 has a rectangular shape that is adapted to surround (and not cover) the lens 44 of the camera assembly 42. FIG. 3 shows an example of the lighting device 10 projecting light towards the front of the lens 44.

Figure 4:
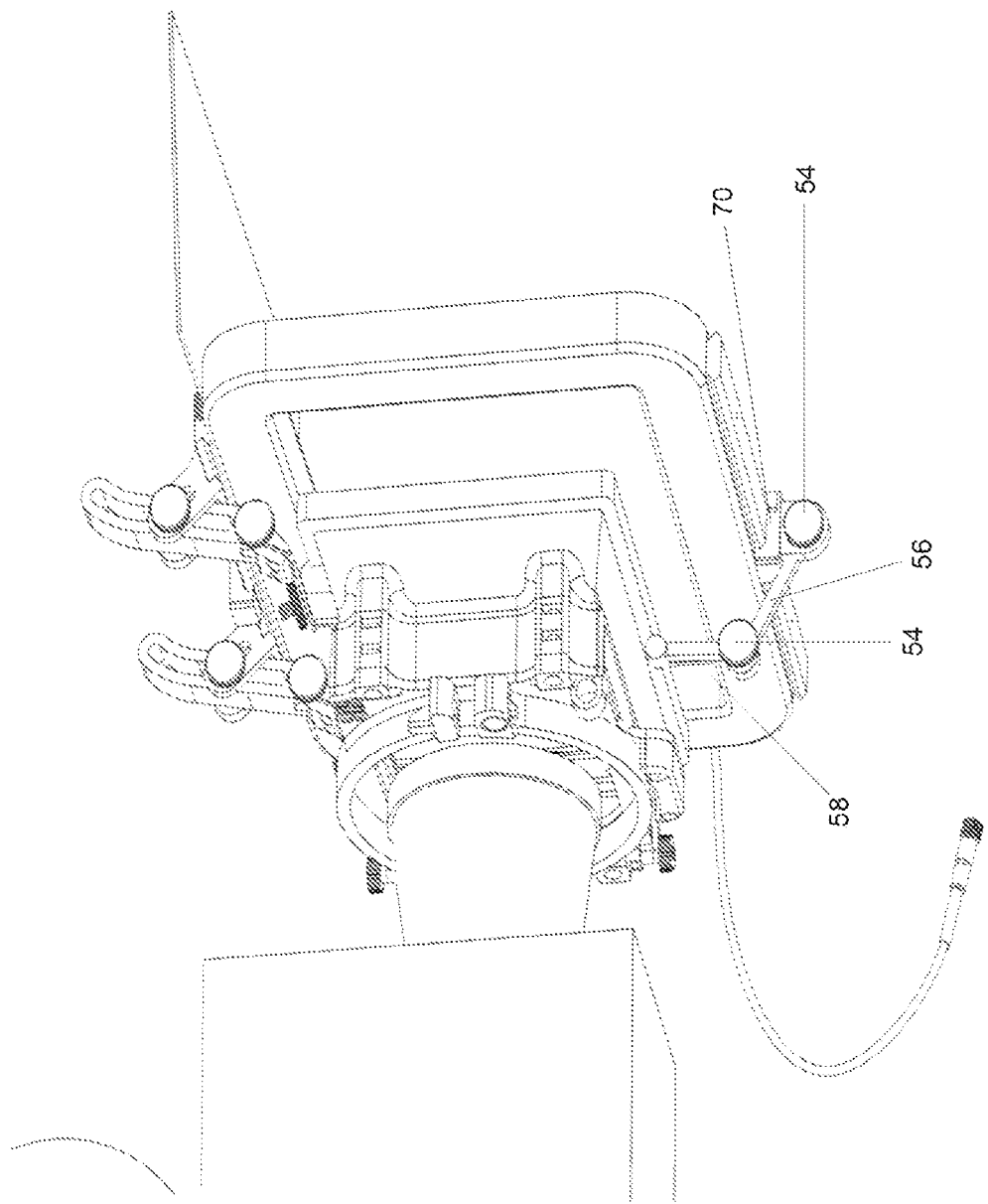
FIG. 4 shows a bottom view of the lighting device.

FIG. 4 shows a bottom view of the lighting device 10 with a stabilizer arm. The lighting device 10 has a horizontal sliding base 70 to enable movement of the stabilizing arm in relation to the lighting device and camera assembly 42. The lighting device 10 has a lower pivoting arm 56 and an upper pivoting arm 58 for stabilizing the annular rectangular light 12. The lighting device 10 has tightening screws 54 for the lower pivoting arm 56 and the upper pivoting arm 58. The horizontal sliding base 70 is coupled to the annular rectangular light 12 by links of the mechanical linkage. The horizontal sliding base 70, lower pivoting arm 56 and the upper pivoting arm 58 can be part of mechanical linkages of the lighting device 10 and enable movement of the stabilizing arm relative to the lighting device 10 and lens 44. In this example, mechanical linkages have a first end connected to the annular rectangular light 12 by a link (e.g. horizontal sliding base 70) and second end connected to the matte box 40 (or a portion thereof).

Figure 5:
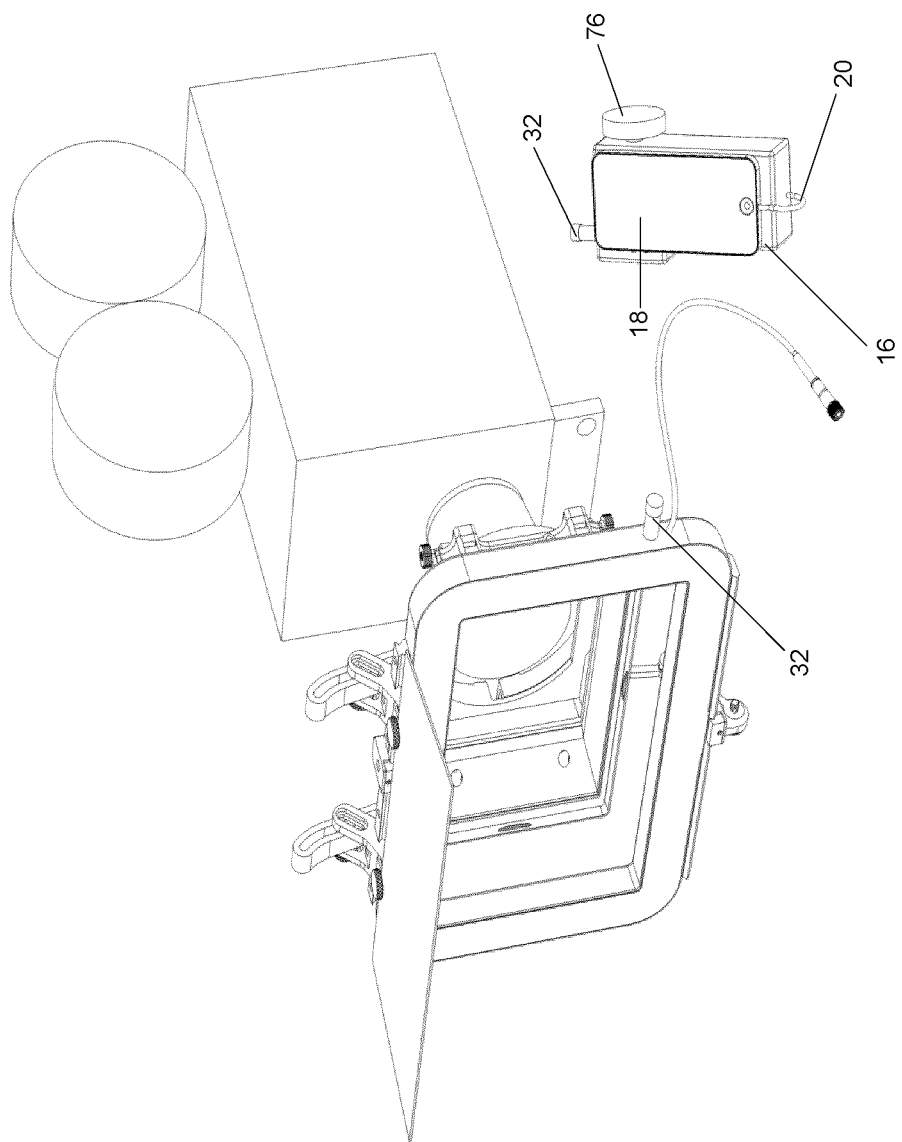
FIG. 5 shows a view of the lighting device with a power cable.

FIG. 5 shows a view of the lighting device 10 with a power cable. The lighting device 10 has an antenna 32 configured to communicate with another antenna 32 of the control handset 16. The control handset 16 can be a mobile device 18 with a control screen 78 or display. The control handset 16 has a dimming wheel 76 to control the annular rectangular light 12. The control handset 16 has a power and data cable 20. The control handset 16 can be implemented using a computer or mobile device, for example. The control handset 16 can provide input or control commands for controlling the state of the annular rectangular light 12 (e.g. intensity, color, animation). In this example, lighting device 10 has a power cable. In this example there is a wireless connection between the LEDs of the annular rectangular light 12 and the control handset 16. The control handset 16 can also connect to a mobile device via Bluetooth or cable.

Figure 6:
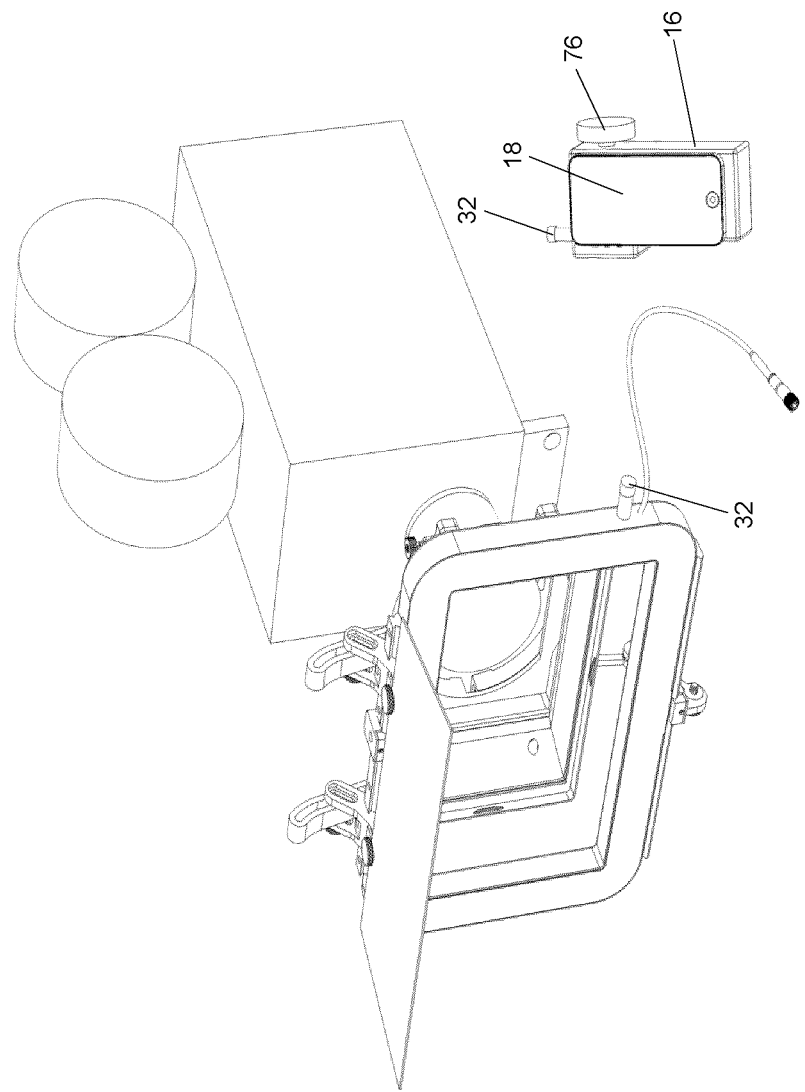
FIG. 6 shows a view a wireless connection between a control handset and a mobile device.

FIG. 6 shows a view of the control handset 16 with a wireless connection to a mobile device. The control handset 16 can wirelessly transmit control signals or commands to control the state of the annular rectangular light 12 (e.g. intensity, color). The control handset 16 can also connect to the LEDs via wireless connection.

Figure 7:
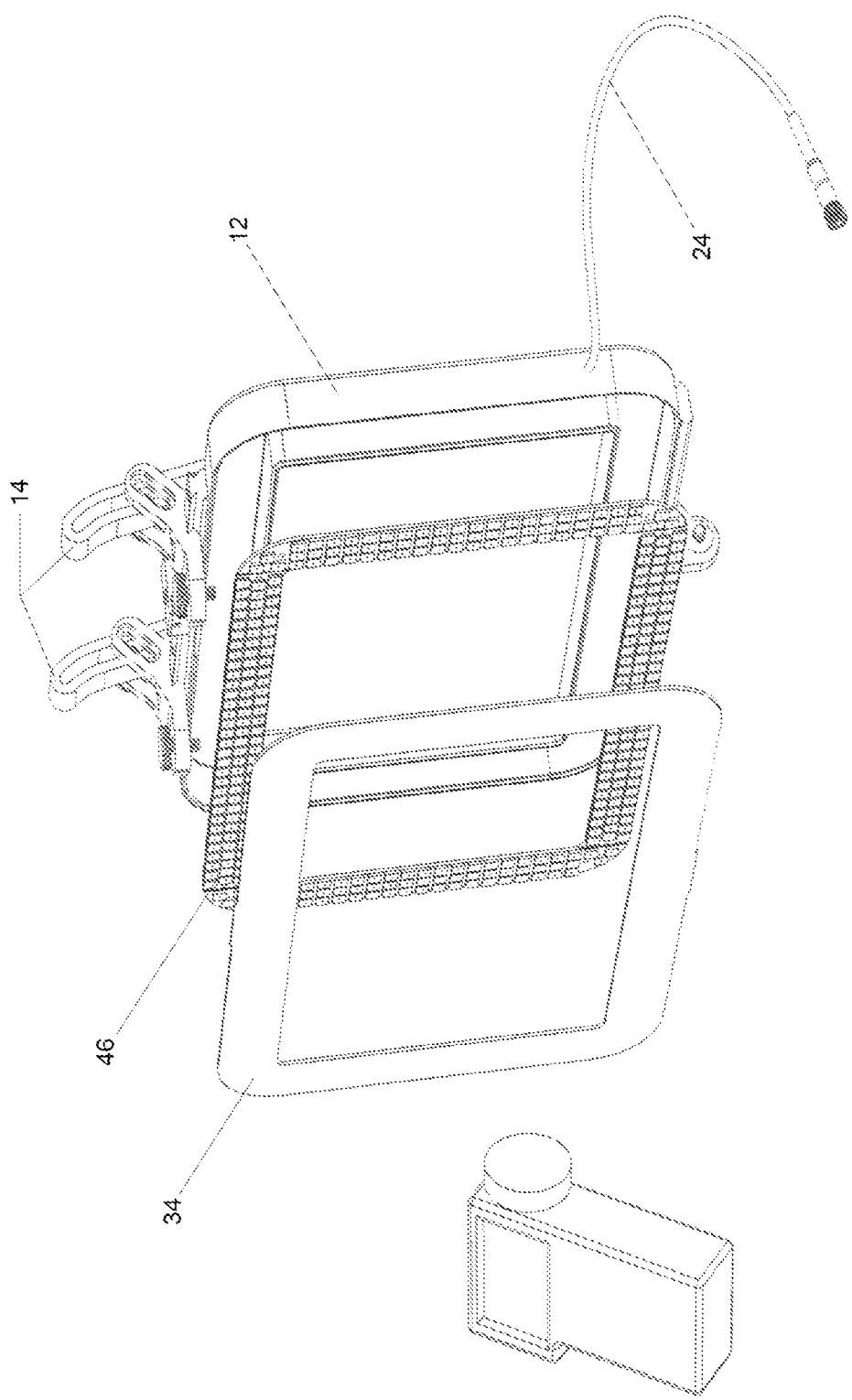
FIG. 7 shows an exploded view of a housing of the lighting device.

FIG. 7 shows an exploded view of a housing for the annular rectangular light 12 of the lighting device 10. The annular rectangular light 12 has a diffusion filter 34 and an LED covered printed circuit board 46. The annular rectangular light 12 connects to mechanical linkages for mounting to the matte box 40 in some embodiments. The LEDs are digitally addressable. Control commands can trigger actuation of the LEDs.

Figure 8:
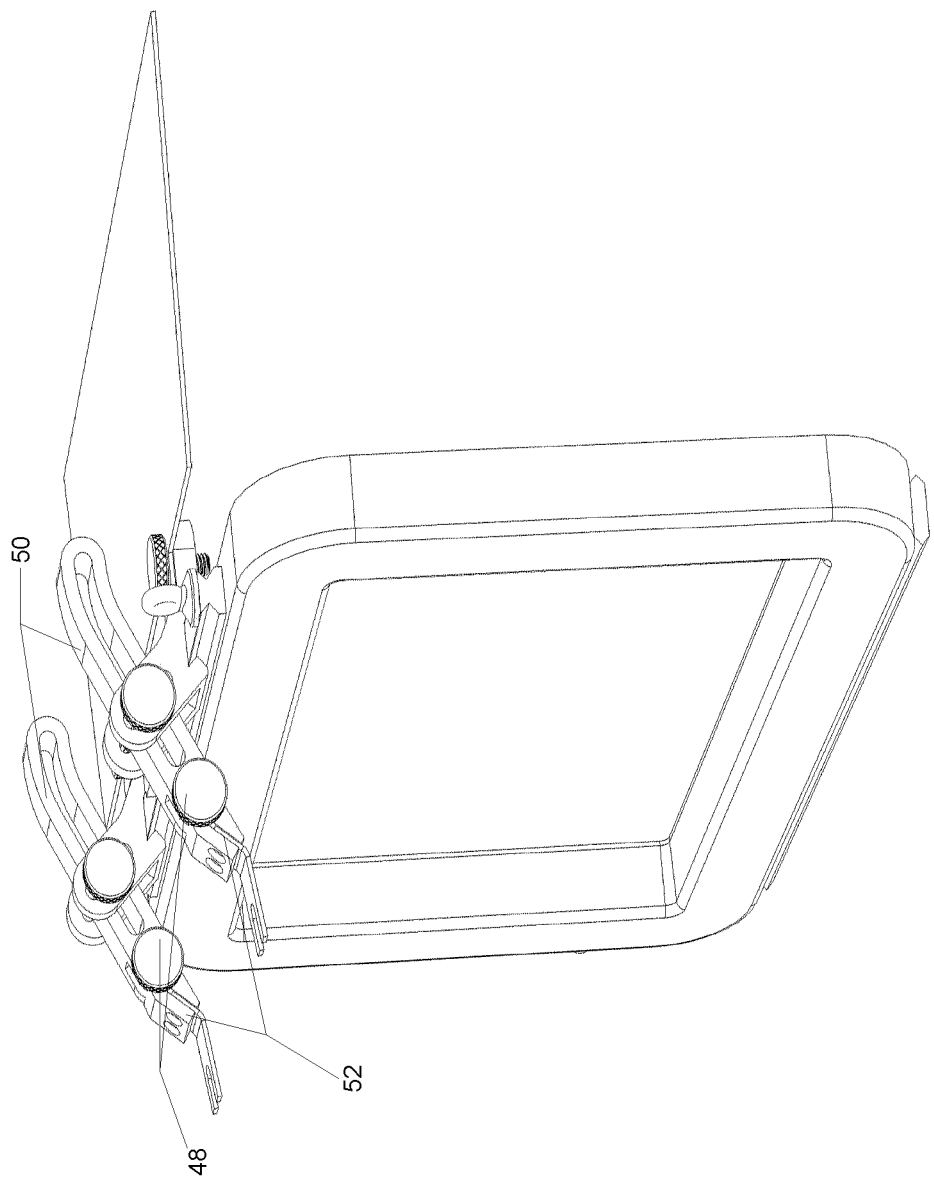
FIG. 8 shows an alternative view of the lighting device.

FIG. 8 shows an alternative position of the lighting device 10. The mechanical linkages can have different positions. The bracket system 14 can have different positions. In this example, the lighting device 10 has a sliding base with top flag connector 48, sliding tilting arm 50, and the pivoting base with top flag connector tab 52. These components can enable movement of the annular rectangular light 12 in different directions.

Figure 9:
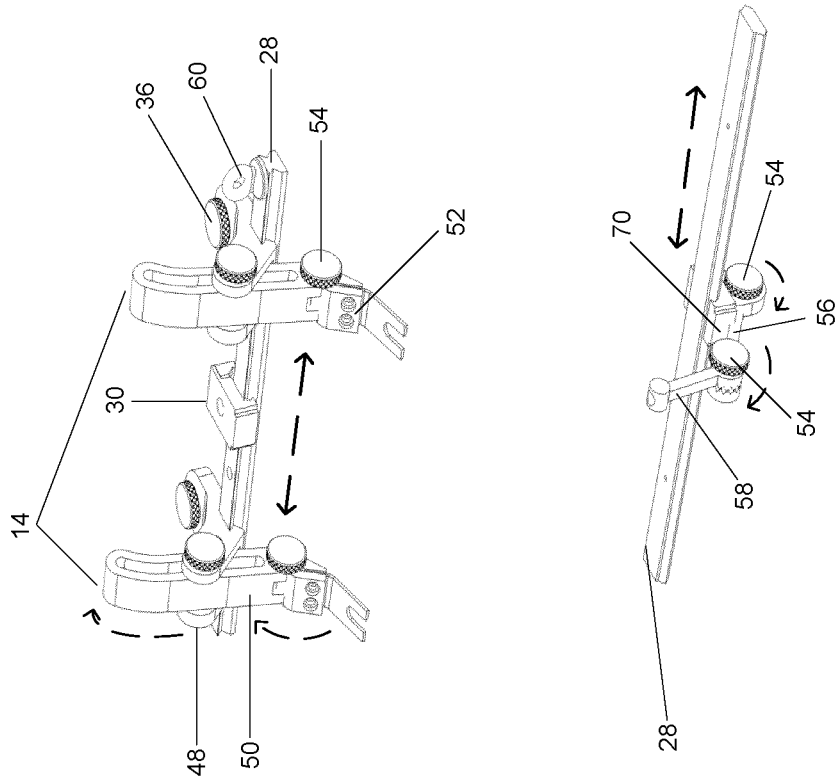
FIG. 9 shows a bracket system for mechanical linkages of the lighting device.

FIG. 9 shows a bracket system 14 of mechanical linkages of the lighting device 10. The bracket system 14 can connect to different accessories. The bracket system 14 can connect to a matte box 40, for example. The mechanical linkages can have upper components and lower components. The upper components for the mechanical linkages can connect to the housing and the lower components for the mechanical linkages can connect to the matte box 40, for example. The bracket system 14 of mechanical linkages has a sliding mount 30 and a linear rail 28. This can enable movement in the horizontal direction, for example. A mechanical linkage has an end to connect with the annular rectangular light 12 and another end to connect to the camera 42. The mechanical linkages can have a sliding tilting arm 50 and a sliding base with a top flag connector 48. Connectors 36 connect to a top flag 38. These components can enable movement in other directions. There can be a safety cord loop 60 in some embodiments.

The mechanical linkages can have a pivoting base with top flag connector tab 52 and tightening screw 54. The mechanical linkages can have a linear rail 28, an upper pivoting arm 58, a lower pivoting arm 56, tightening screw 54, and a horizontal sliding base 70. These components enable movement in different directions. There can be movement in the horizontal direction, vertical direction, or backwards/forwards. There can be rotational movements, for example. There can be slidable engagement for translational movement. There can be pivots for rotational movement.

The mechanical linkages can connect with the annular rectangular light 12 at first ends. In example embodiments, the linear rail 28 can be mounted to the annular rectangular light 12. The linear rail 28 can be mounted to other matte box mountable accessories. In the reference frame of the annular rectangular light 12, the linear rail 28 can also be fixed and the mechanical linkages can move along the linear rail 28 in their translational degree of freedom (DOF), pivot on the linear rail 28 in their rotational DOF, and slide on the linear rail 28 in a slidable DOF. The mechanical linkages can connect with the matte box 40 at second ends. The mechanical linkages can have mounting adaptors to connect with the matte box 40. The mechanical linkages can provide a spacing between the ends or adaptors.

The mechanical linkages enable different translational degrees of freedom for the annular rectangular light 12. The linear rail 28 can connect with slidable engagement and enable movement in different directions.

The mechanical linkages of the lighting device 10 can connect to a matte box 40 in some embodiments. The mechanical linkages of the lighting device 10 can connect to camera rods 64, 80 in some embodiments. The mechanical linkages of the lighting device 10 enable movement of the annular rectangular light 12 in horizontal direction, vertical direction, and forwards/backwards direction. The mechanical linkages of the lighting device 10 enable translational and rotational movements. The mechanical linkages of the lighting device 10 have links to enable different movements. The mechanical linkages of the lighting device 10 have ends to connect to the annular rectangular light 12 and ends to connect to components of the camera 42.

Figure 10:
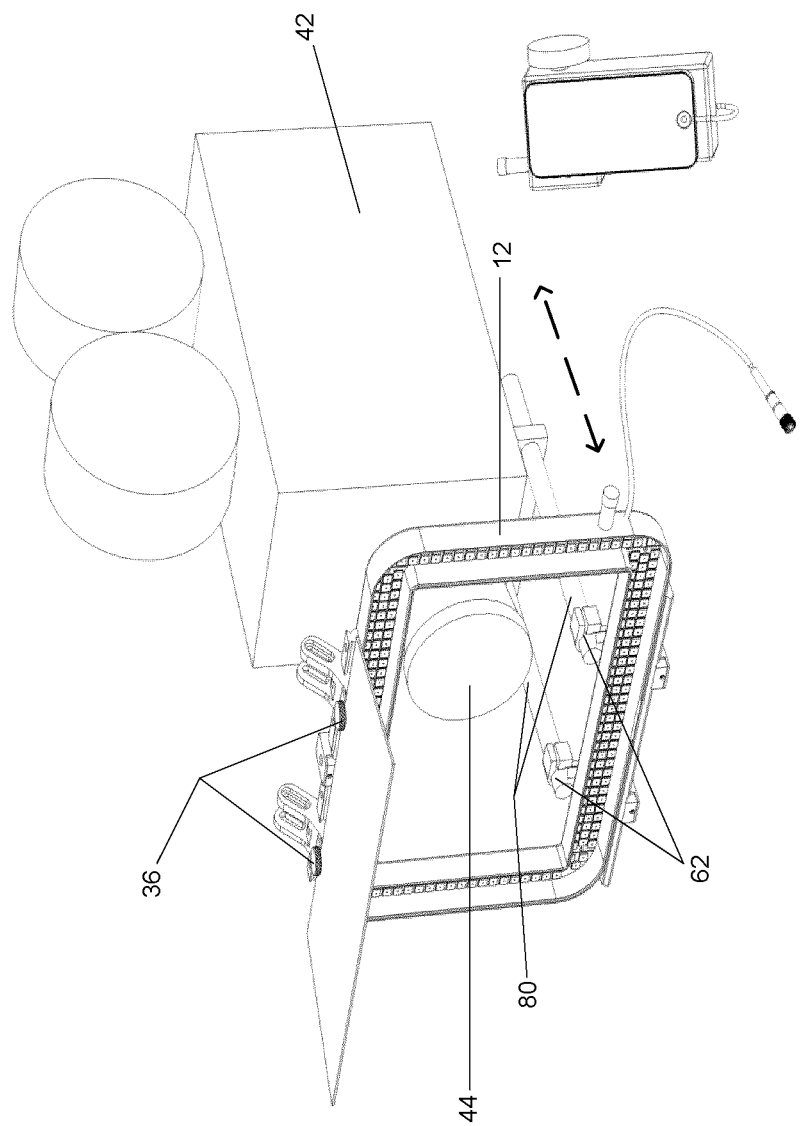
FIG. 10 shows a rod system for mechanical linkages of the lighting device.

FIG. 10 shows a rod system of the lighting device 10. The rod system (bars, mounts) is another example of mechanical linkages to position the annular rectangular light 12. The camera apparatus 42 has camera rods 80. The camera rods 80 can be different sizes, such as 15 mm or 19 mm. In some example embodiments, the lighting device 10 connects to camera rods 80 using mechanical linkages. In this example, the annular rectangular light 12 can connect to camera rods 80 by universal rod mounts 62 (of mechanical linkages). The universal rod mounts 62 engage with the rods 80 to enable movement of the annular rectangular light 12 in forwards and backwards direction. The lighting device 10 has top-flag connectors 36. In this example, the lighting device 10 connects to the camera assembly 42 by connecting to camera rods 80, instead of a matte box 40. The annular rectangular light 12 surrounds the lens 44 and can move in different directions relative to the lens 44 by the mechanical linkages.

Figure 11:
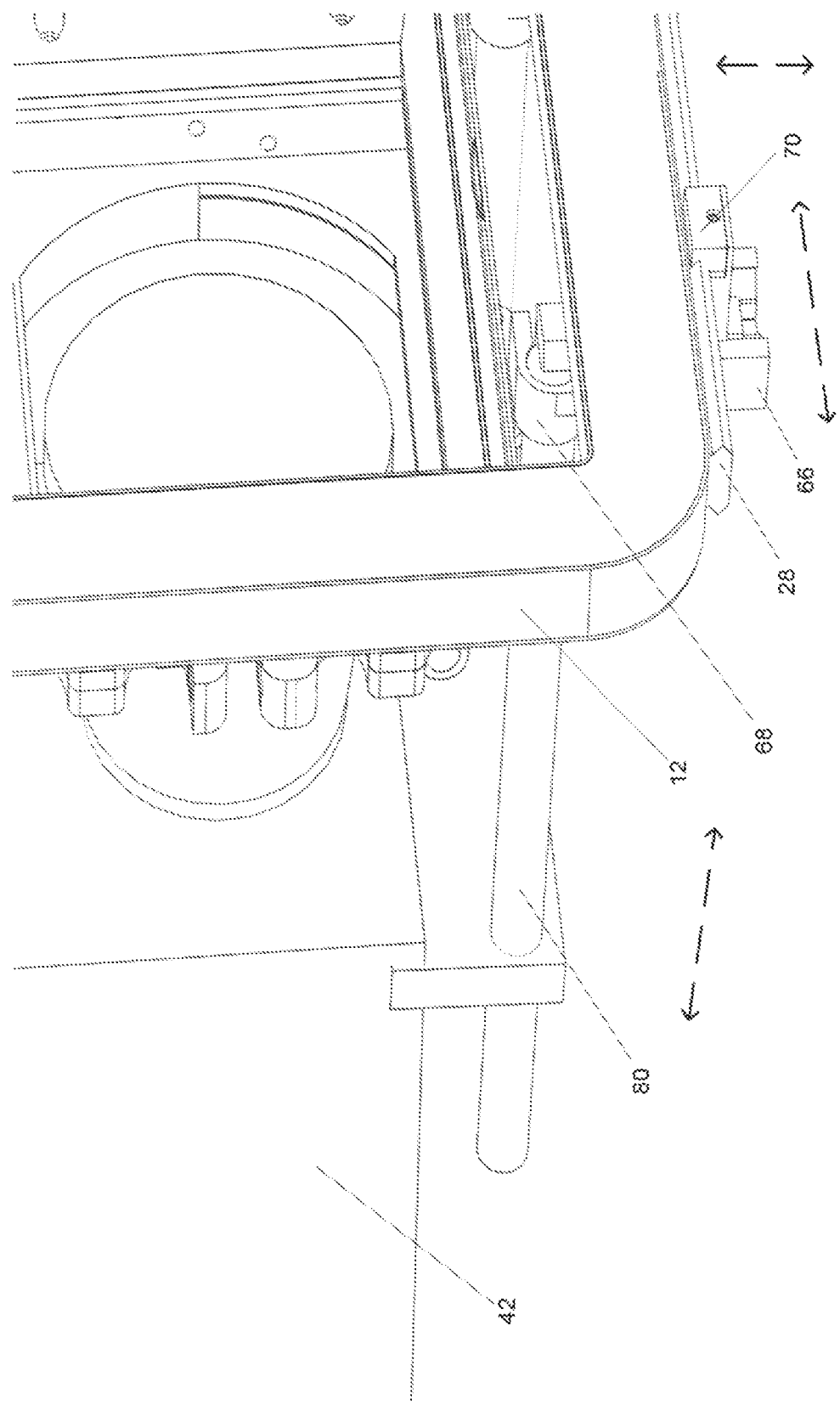
FIG. 11 shows a front view of a rod system for mechanical linkages of the lighting device.

FIG. 11 shows a front view of a rod system for mechanical linkages of the lighting device 10. The camera apparatus 42 has camera rods 80. The mechanical linkages include a linear rail 28, a horizontal sliding base 70, a vertical sliding rail 66, and a rod clamp 68. The linear rail 28 and horizontal sliding base 70 enable movement in a horizontal (or first) direction. The vertical sliding rail 66 enables movement in a vertical (or second) direction. The rod clamp 68 enables movement along the rods 80 in a backward/forward (or third) direction. The mechanical linkages connect to the annular rectangular light 12 to move it in the different directions for positioning relative to the lens 44 or camera 42.

Figure 12:
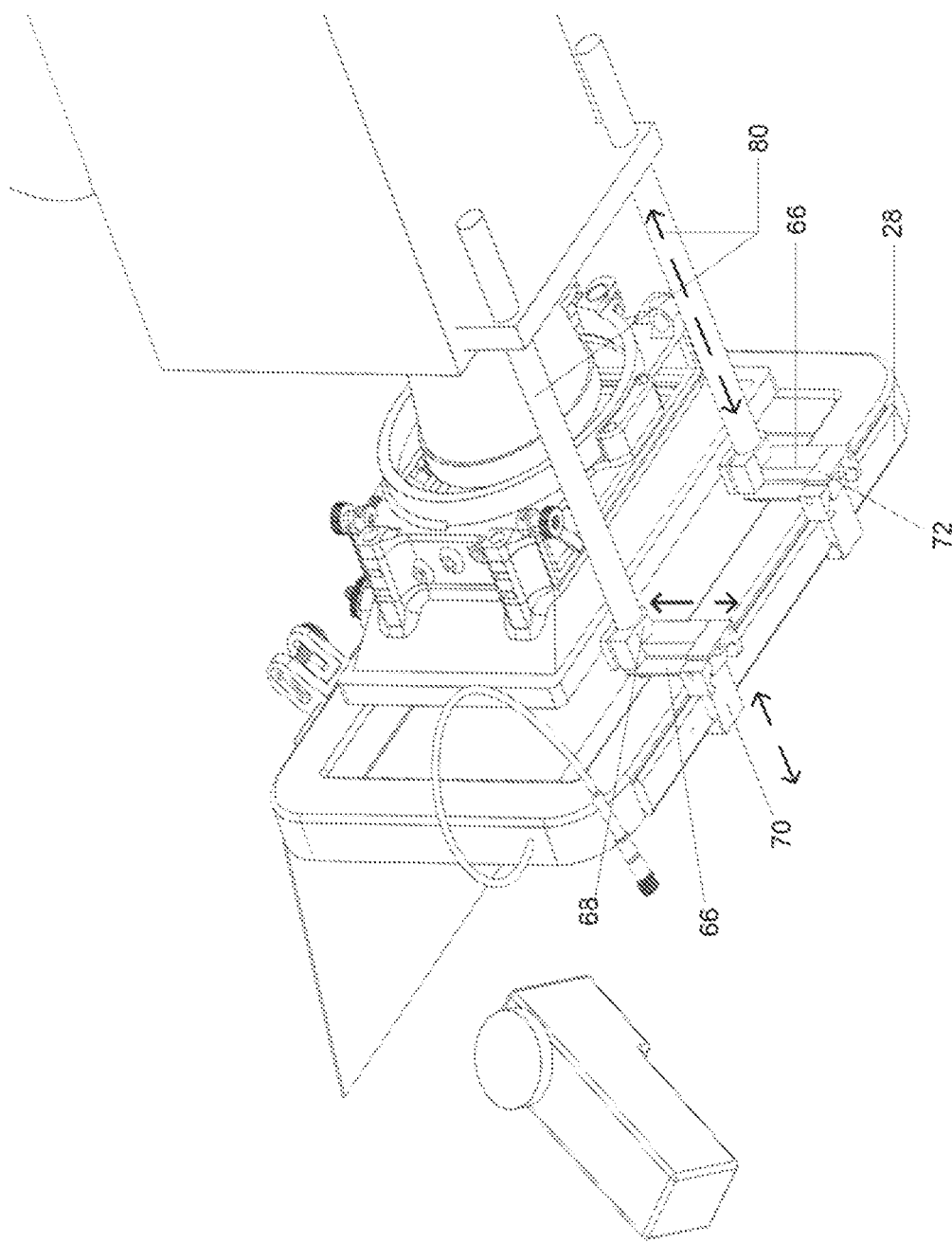
FIG. 12 shows a bottom view of a rod system of the lighting device.

FIG. 12 shows a bottom view of a rod system for mechanical linkages of the lighting device 10. Example mechanical linkages can include a linear rail 28, a horizontal sliding base 70, a vertical sliding rail 66, a rail clamp 72 and a rod clamp 68 (FIG. 11) that connects to the camera rods 80. The vertical sliding rail 66 and rail clamp 72 can move the annular rectangular light 12 relative to the camera rods 80 (and lens 44) in a direction. The linear rail 28 and horizontal sliding base 70 can move the lighting device 10 (relative to the camera rods 80 or lens 44) in different directions. In this configuration, the horizontal sliding base 70 allows the annular rectangular light 12 to move horizontally in relation to the lens 44. In other configurations, such as shown in FIG. 4, the horizontal sliding base 70 can enable movement of the lower stabilizing arm in relation to the lighting device 10 and camera 42. The rod clamp 68 enables movement along the rods 80 in a further direction. Accordingly, the mechanical linkages enable movement of the annular rectangular light 12 in multiple directions relative to the camera 42 or lens 44.

Figure 13:
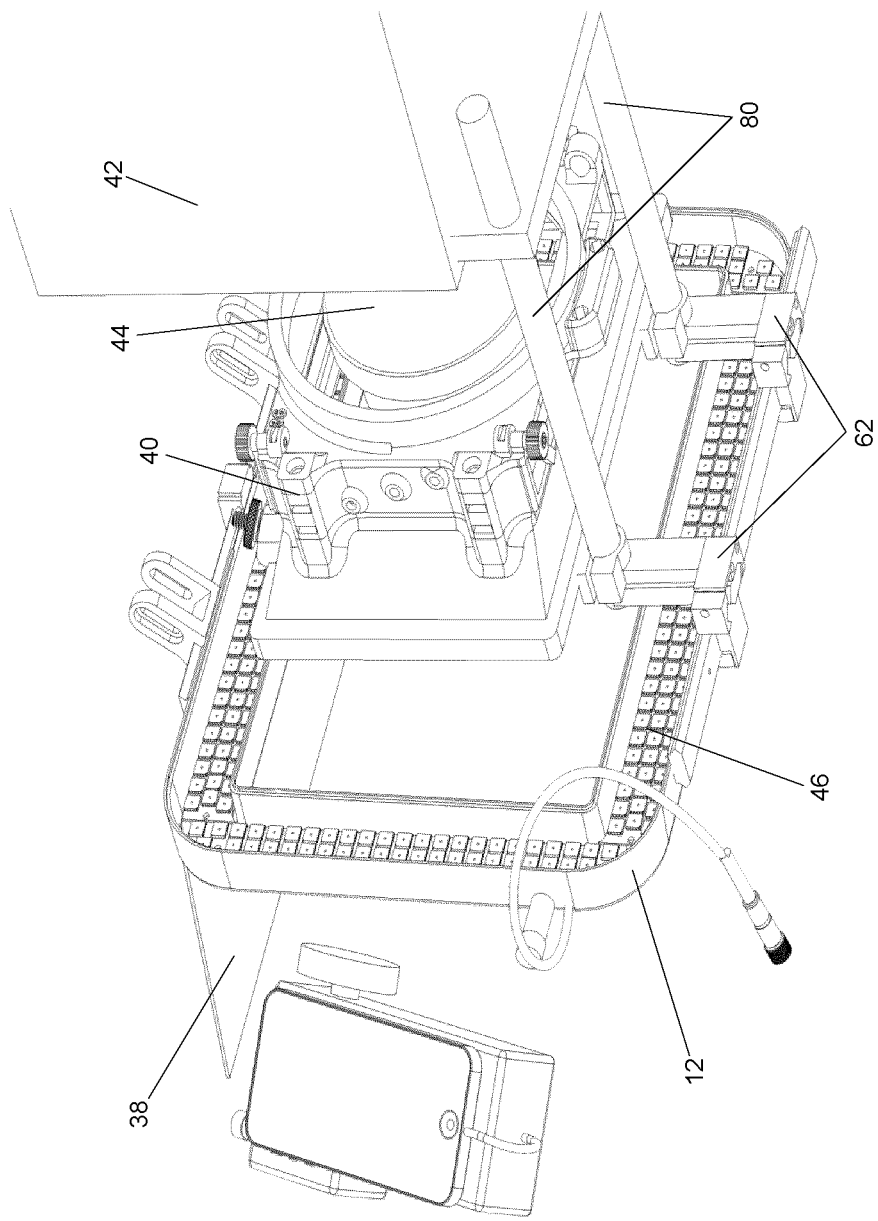
FIG. 13 shows a bottom view of a rod system of the lighting device.

FIG. 13 shows a bottom view of a rod system for mechanical linkages of the lighting device 10. The annular rectangular light 12 has an LED covered printed circuit board 46. The annular rectangular light 12 connects to camera rods 80 (of the camera apparatus 42) by universal rod mounts 62 (of the mechanical linkages). The matte box 40 can connect to the universal rod mounts 62 separately from the lighting device 10 and/or can be connected to the lens 44. The annular rectangular light 12 surrounds the lens 44 and matte box 40. The mechanical linkages (including, for example universal rod mounts 62) enable movement of the annular rectangular light 12 in multiple directions relative to the camera 42 or lens 44. In this configuration, the light faces the camera. The rod system does not connect to the matte box 40.

Figure 14:
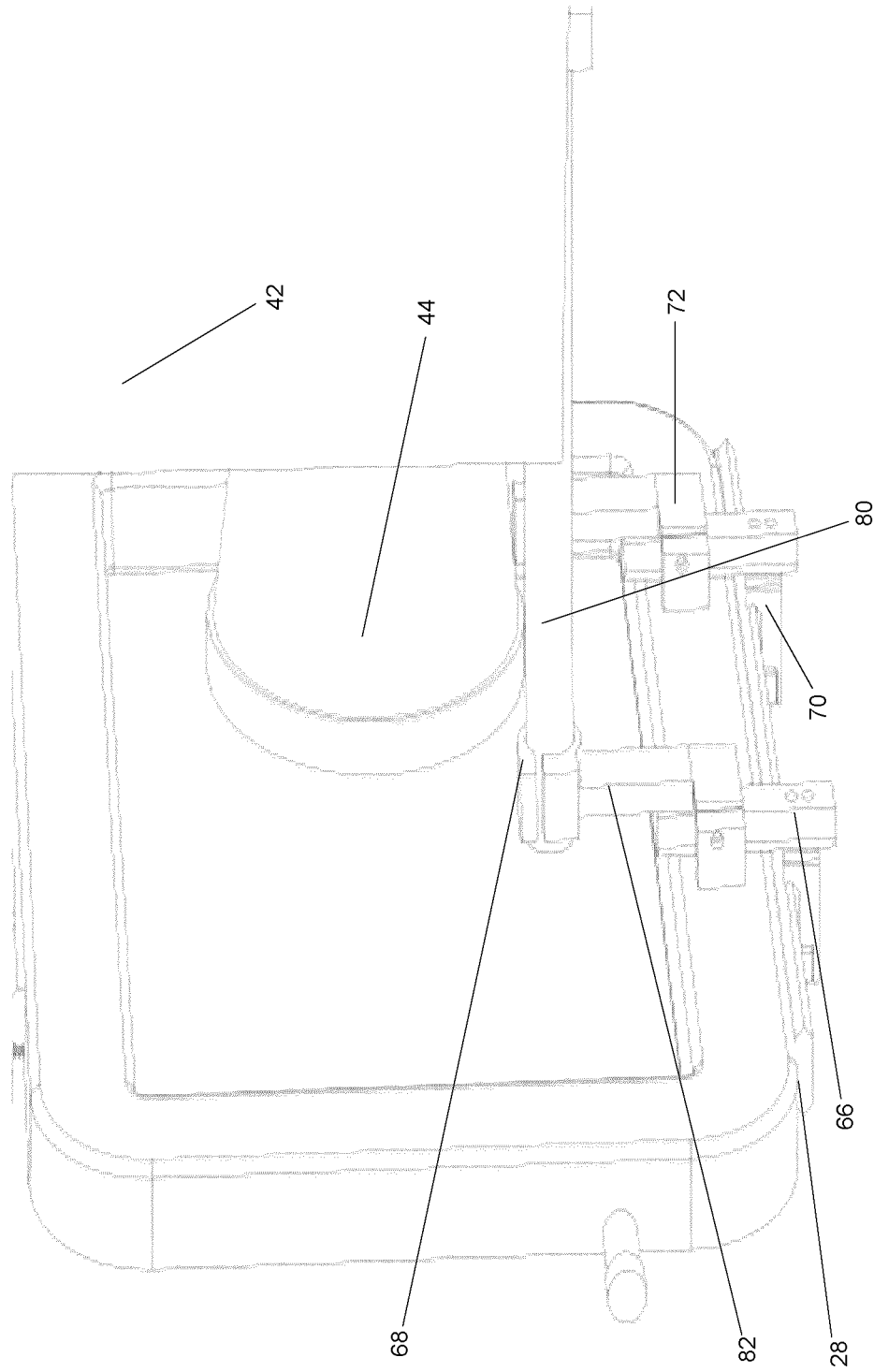
FIG. 14 shows another view of a rod system of the lighting device.

FIG. 14 shows another view of a rod system of mechanical linkages for the lighting device 10. In this view, the lighting device 10 faces away from the lens 44. The mechanical linkages include a linear rail 28, a horizontal sliding base 70, a vertical sliding rail 66, a rail clamp 72 and a rod clamp 68 that connects to the camera rods 80. The mechanical linkages connect to the annular rectangular light 12. The vertical sliding rail 66 can move the annular rectangular light 12 relative to the camera rods 80 in a vertical direction. The linear rail 28 can move the annular rectangular light 12 relative to the camera rods 80 in a horizontal direction. The rod clamp 68 can move annular rectangular light 12 in a further direction (forward, backward). The movement can help position the annular rectangular light 12 relative to the lens 44. The annular rectangular light 12 is positioned relative to the lens 44 to ensure the annular rectangular light 12 does not obstruct the FOV of the lens 44 or camera 42. The vertical sliders of the rod system extend to adjust for different shapes and sizes of cameras 42.

Figure 15:
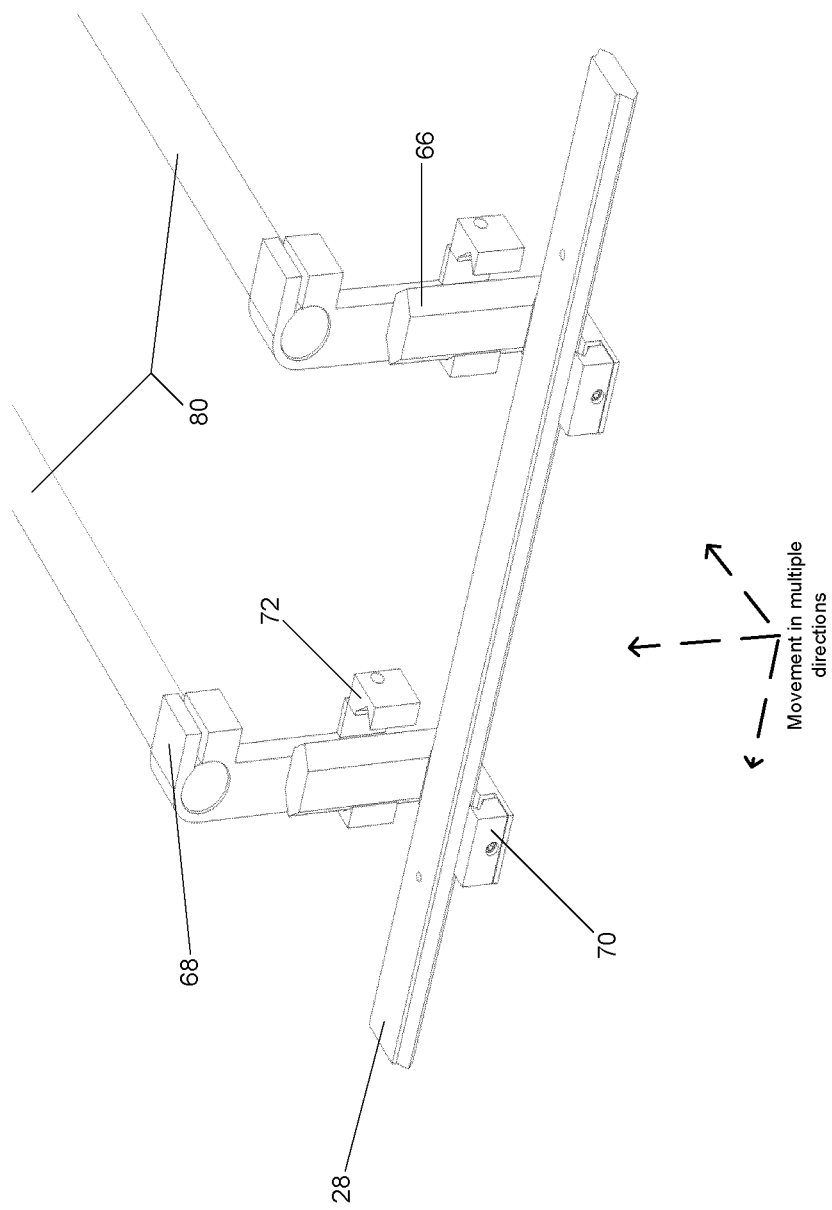
FIG. 15 shows a rod system of the lighting device.

FIG. 15 shows a rod system of mechanical linkages to connect to the camera rods 80. The mechanical linkages include a linear rail 28, a horizontal sliding base 70, a vertical sliding rail 66, a rail clamp 72 and a rod clamp 68 that can connect the annular rectangular light 12 to the camera rods 80. The mechanical linkages can also include other rod mounted components. For example, a user can connect the linear rail 28 to a matte box 40, or hand grips and use the rod system to mount the matte box 40 to the rods 80. The mechanical linkages enable movement of the annular rectangular light 12 in different directions or degrees of freedom. For example, the mechanical linkages can provide degrees of freedom in relation to the camera 42, including vertical movement, horizontal movement, and forward/backward movement (e.g. along rods 80 of the camera 42). In this example, mechanical linkages enable movement of the annular rectangular light 12 along three different axis. For example, a first axis can be vertical (along direction of the vertical sliding rail 66), a second axis can be horizontal (along direction of the linear rail 28), and the third axis can offset forward and backward from the camera 42 with movement along direction of the camera rods 80. The mechanical linkages can provide X, Y, Z degrees of freedom of the annular rectangular light 12 relative to the camera 42.

Figure 16:
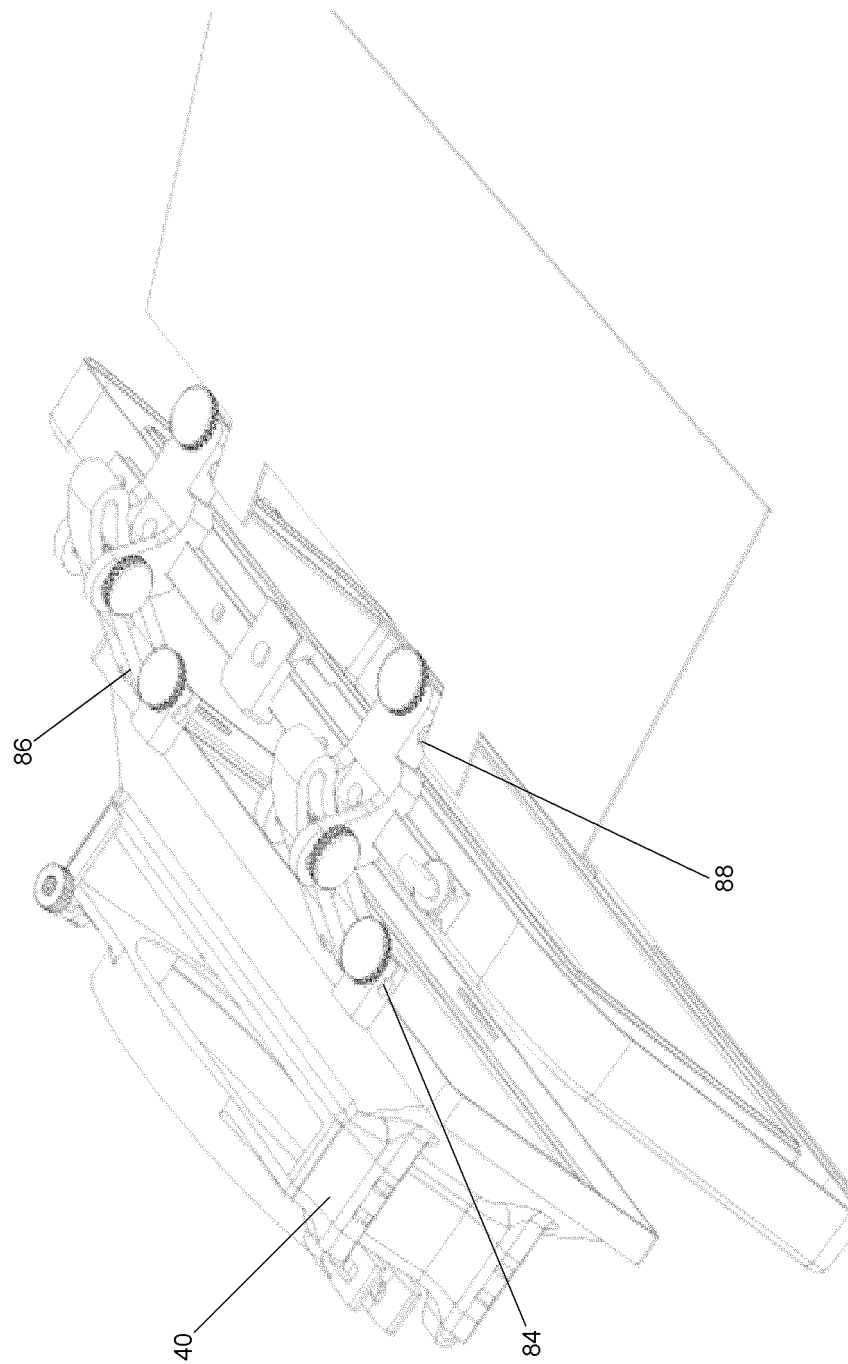
FIG. 16 shows the bracket system of the lighting device adapted for a different style of matte box.

FIG. 16 shows a top view of the lighting device 10 that connects to the matte box 40. In this example, mechanical linkages include a matte box mount 84, pivoting base with top flag connector 86, and a top flag connector clamp 88. The mechanical linkages connect the annular rectangular light 12 to the matte box 40. There can be different configurations for the mechanical linkages, including the top flag connector 86 and the top flag connector clamp 88. This shows an alternative configuration for the matte box 40. There can be connections on the flag and matte box 40 around pins going into sides instead of screwing down on top, for example.

Figure 17:
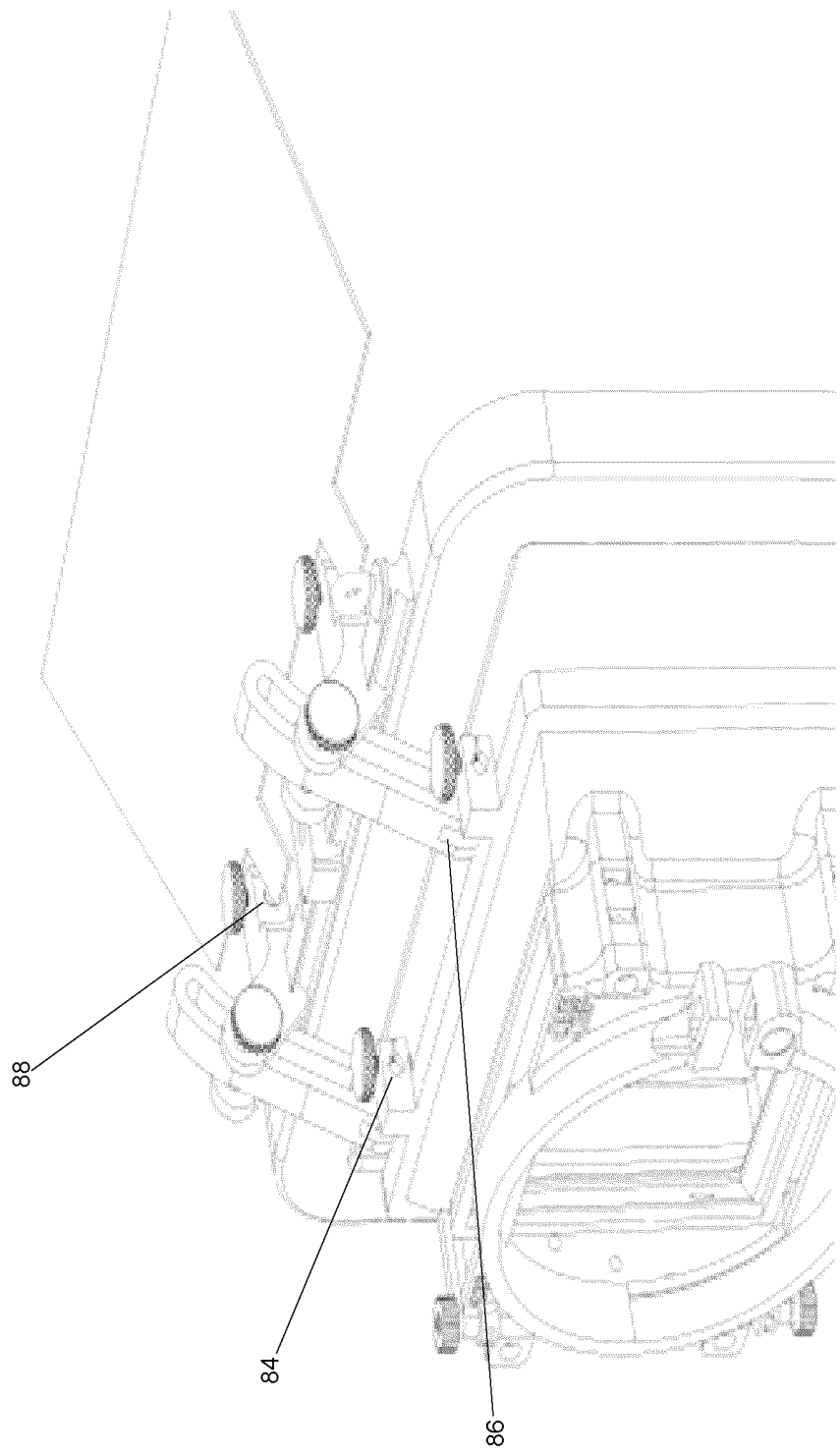
FIG. 17 shows a rear view of the lighting device.

FIG. 17 shows a rear view of the lighting device 10 with a different connector type. In this example, mechanical linkages include a matte box mount 84, pivoting based with top flag connector 86, and a top flag connector clamp 88.

FIGS. 16 and 17 show an alternative type connection for the matte box 40. In this example, the matte box 40 is not a fork shape that gets screwed down but a pair of pins that slide from the side and lock in.

Figure 18:
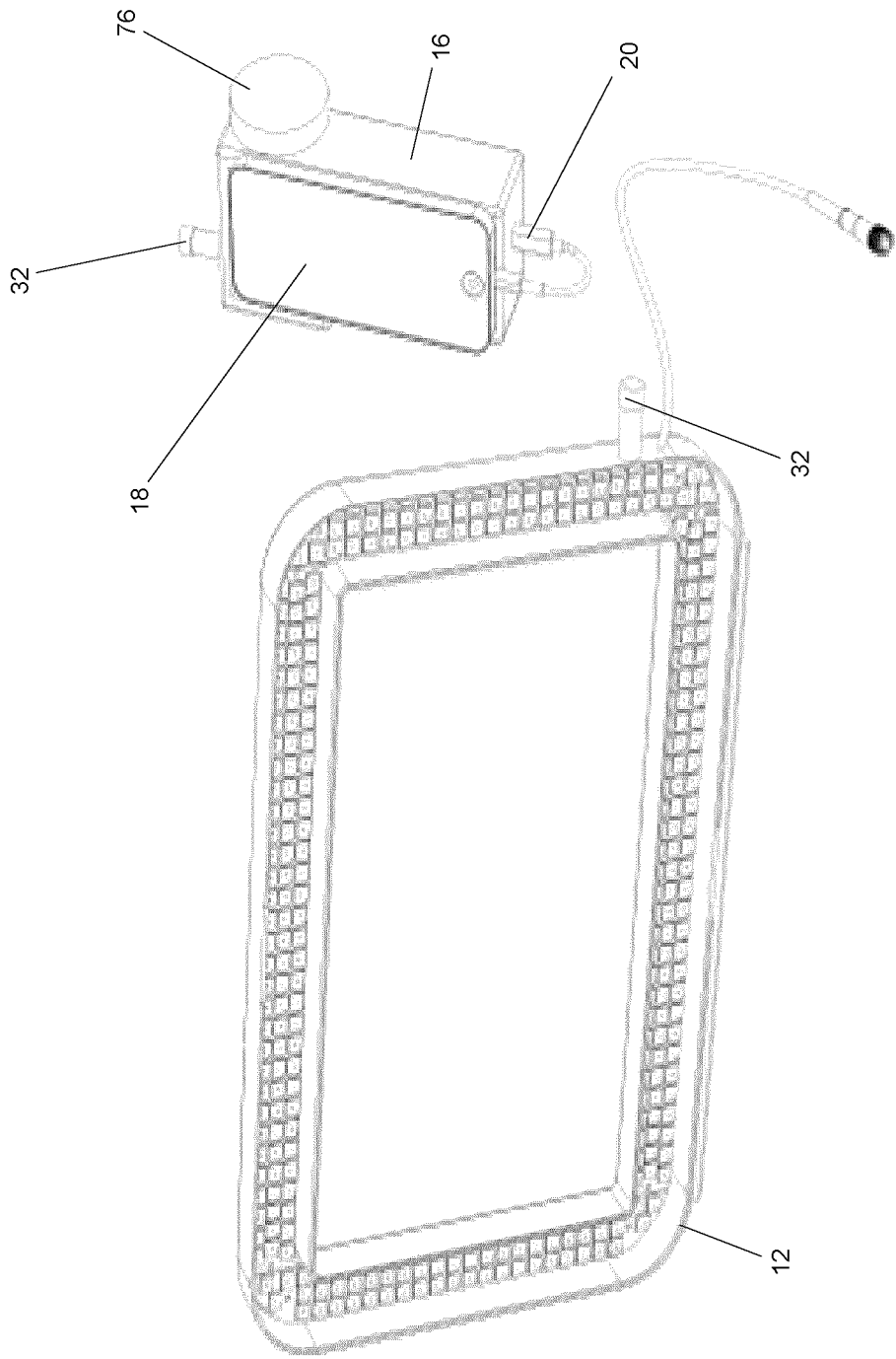
FIG. 18 shows an annular rectangular light of the lighting device.

FIG. 18 shows an annular rectangular light 12 of the lighting device 10 with an antenna 32 configured to communicate with another antenna 32 of the control handset 16. The control handset 16 can be a mobile device 18 with a control screen 78 or touch display to send control commands to the annular rectangular light 12. The control handset 16 can control the annular rectangular light 12. For example, the control handset 16 can have a dimming wheel 76 to navigate control commands, such scrolling menu options or controlling brightness of the annular rectangular light 12. The control handset 16 has a power and data cable 20. The control handset 16 can also have buttons to control various functions of the lighting device 10 and its annular rectangular light 12.

Figure 19:
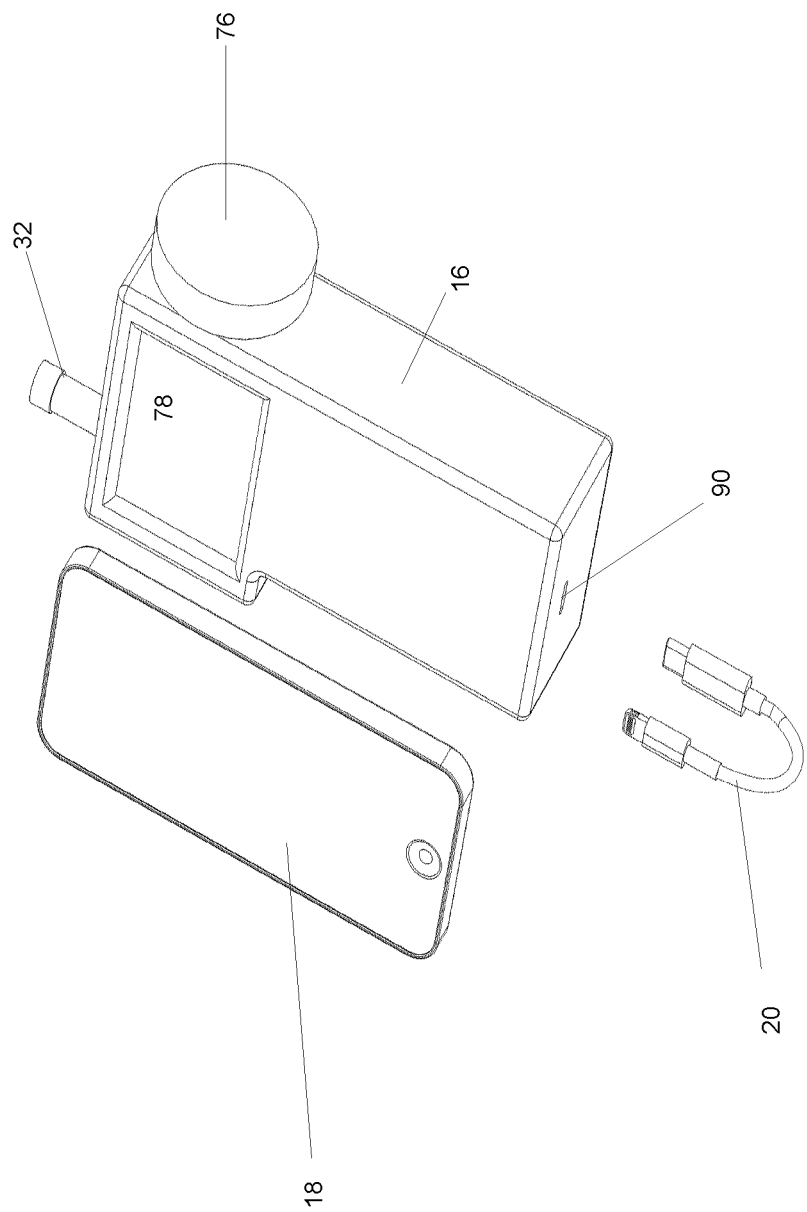
FIG. 19 shows a control handset that can connect to the lighting device.

FIG. 19 shows a control handset 16 that can connect to the lighting device 10 to control the annular rectangular light 12. The control handset 16 can be a mobile device 18 with a control screen 78. The control handset 16 has a dimming wheel 76 that can be moved to trigger control commands for the annular rectangular light 12. The control handset 16 can connect to a mobile device 18 to control the lighting device 10. The control handset 16 can connect to a mobile device 18 via wired or wireless connection.

Figure 20:
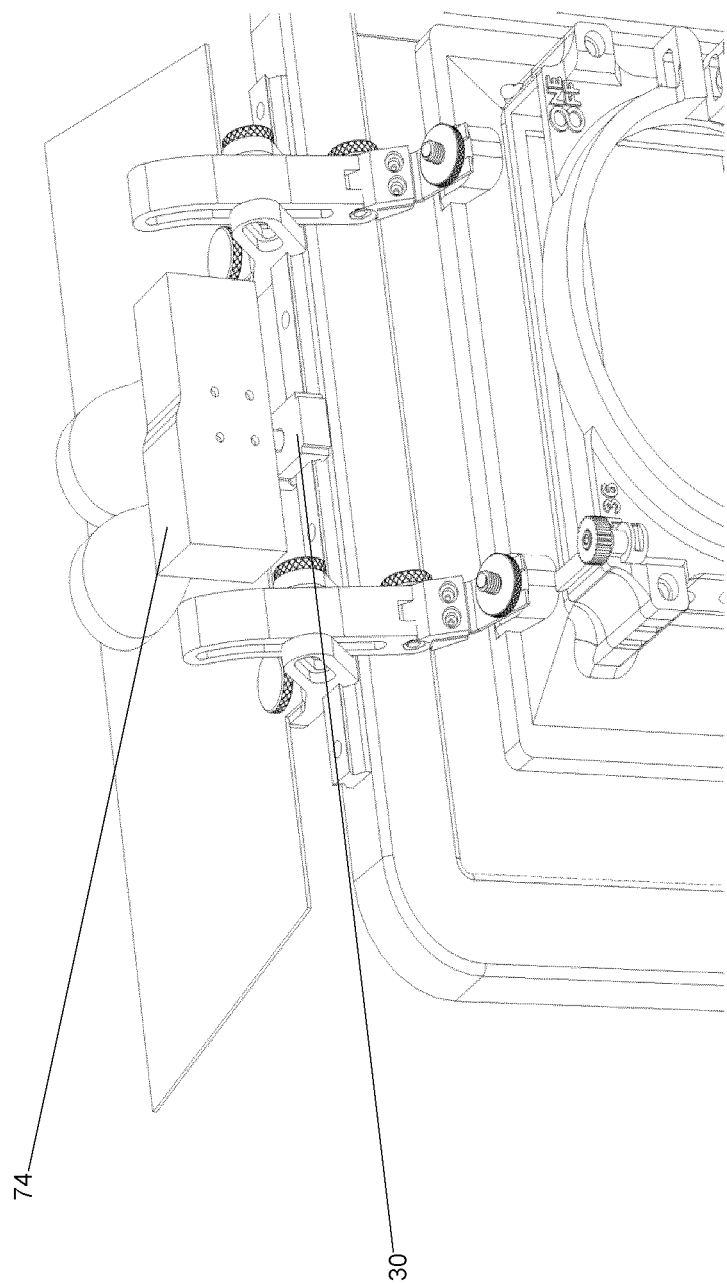
FIG. 20 shows an accessory device mounted to the lighting device.

FIG. 20 shows a lighting device 10 with an accessory mounted, which in this example is an infrasonic range finder 74 connected to the a sliding accessory mount 30 that can couple to the annular rectangular light 12 by a rail, for example. This is an example accessory and other accessories can be attached to the sliding accessory mount 30. Different accessories can slidably engage with the sliding rail system via a screw type mount on an accessory bracket. For example, an accessory with a ¼-20 thread ⅜" tread can be attached to the sliding accessory mount 30

The mechanical linkages for the lighting device 10 can connect or mount in the front of the camera assembly 42 to a matte box 40 or rods 80. The mechanical linkages can be components of the bracket system 14 or a rod system, for example. The mechanical linkages can move the annular rectangular light 12 relative to the lens 44 in multiple directions. The rectangular shape of the annular rectangular light 12 of the lighting device 10 eliminates the issue of obstructing the captured area of the lens 44 that round shape ring lights can present. Traditional ring lights when mounted to the matte box 40 show corners of the rectangular frame due to the back side of the round ring light. The shape of the annular rectangular light 12 matches the capture area of a camera 42 and can mount to the matte box 40 which is out of the capture area of the camera 42. Traditional round ring lights are intended for use with photography cameras and do not interface with cinema cameras properly.

The mechanical linkages provide a universal bracket system that allows users to mount and centre the lighting device 10 onto virtually any matte box 40 or rod mount for camera rods 80. The mechanical linkages provide a universal bracket system that allows the annular rectangular light 12 to connect to any matte box 40 via articulating arms the permit the annular rectangular light 12 to be centered in front or around the user's matte box 30 or lens 44. The mechanical linkages provide a universal bracket system that allows users to move the annular rectangular light 12 in different directions relative to the lens 44. In an example, the brackets slide along a dovetail plate that runs perpendicular to the axis of the lens 44 so the brackets can be positioned square with the receiving clamps on the matte box 40 there-by centering the annular rectangular light 12 on the X-axis of the lens 44. In an example, sliding or articulating arms provide vertical and fore-aft adjustment so the annular rectangular light 12 can be centred on the Y-axis of the lens 44 and then pulled as close to the lens 44 as possible on the Z-axis In this example, the mechanical linkages allow movement of the annular rectangular light 12 in different directions (X-axis, Y-axis, Z-axis) relative to the lens 44.

Receiving clamps on matte boxes 40 can vary in design. The lighting device 10 has mechanical linkages that can be varied depending on the matte box 40 by only changing minimal components. Further, in some examples, lighting device 10 connects to rods 80 instead of a matte box 40. If the camera does not have a matte box 40 or the user does not want to connect to the matte box 40, then they can optionally remove the lighting device 10 matte box brackets. The mechanical linkages can connect the lighting device 10 to rods 80 using rod support brackets to provide the fore-aft, up-down and left-right adjustability. The user can then connect the lighting device 10 to their camera 42 using 15 mm or 19 mm rod supports, for example.

The lighting device 10 can light the on-camera subject from same angle as the cinema camera apparatus 42 with no interference to how the camera normally operates. The lighting device 10 can allow the user to have the functionality of a ring light on a cinema camera without the need to remove the matte box or sacrifice any functionality of the camera 42 or matte box 40.

Figure 21:
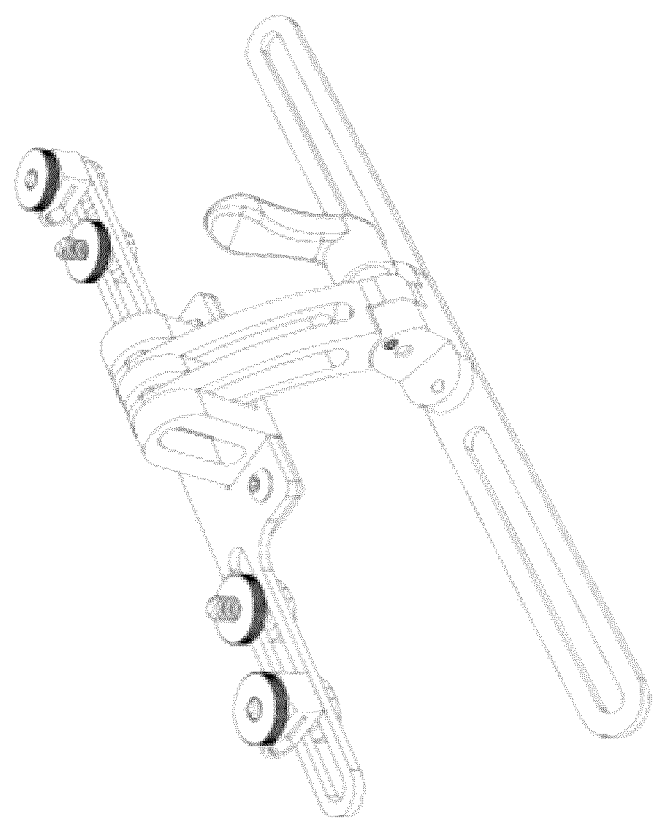
FIG. 21 shows another bracket system for the lighting device.

FIG. 21 shows another example of mechanical linkages used as part of bracket system 14 of the lighting device 10. This example shows an alternative configuration (single arm) of the bracket system.

Figure 22:
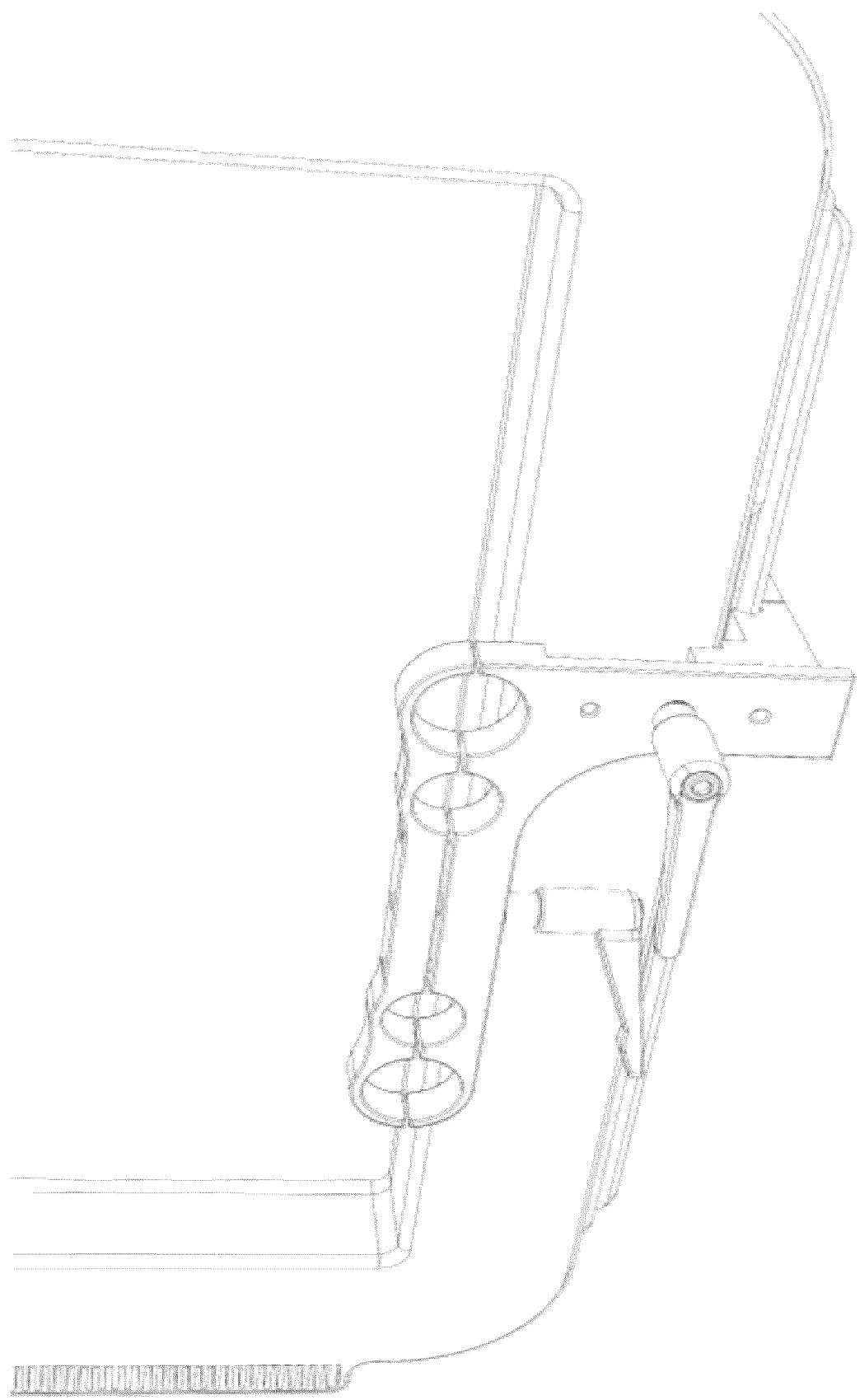
FIG. 22 shows a variation of the rod mount system of the lighting device.

FIG. 22 shows another view of mechanical linkages of the lighting device 10 used as part of rod system. This is an example variation of the rod system for 15 mm or 19 mm rods 80. In this example. the mechanical linkages are for rail mounts. The rails can be mounted onto a lighting device 10.

Figure 23:
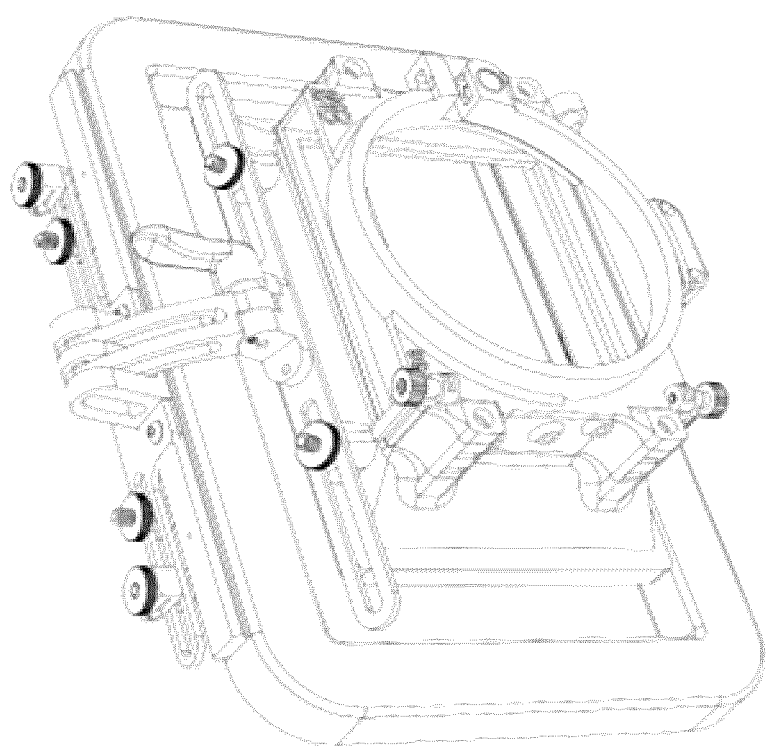
FIG. 23 shows a rear view of a bracket system of the lighting device.

FIG. 23 shows a rear view of mechanical linkages of the lighting device 10 shown in FIG. 21 with a single arm alternative configuration for the bracket system.

FIG. 24 shows the annular rectangular light 12 and an example FOV of the lens 44. The mechanical linkages allow positioning of the annular rectangular light 12 such that it surrounds the front of a lens 44 of the camera 42 but does not obstruct the FOV of the lens 44. The mechanical linkages allow movement of the annular rectangular light 12 in multiple directions relative to the front of a lens 44 of the camera 42.

Figure 25:
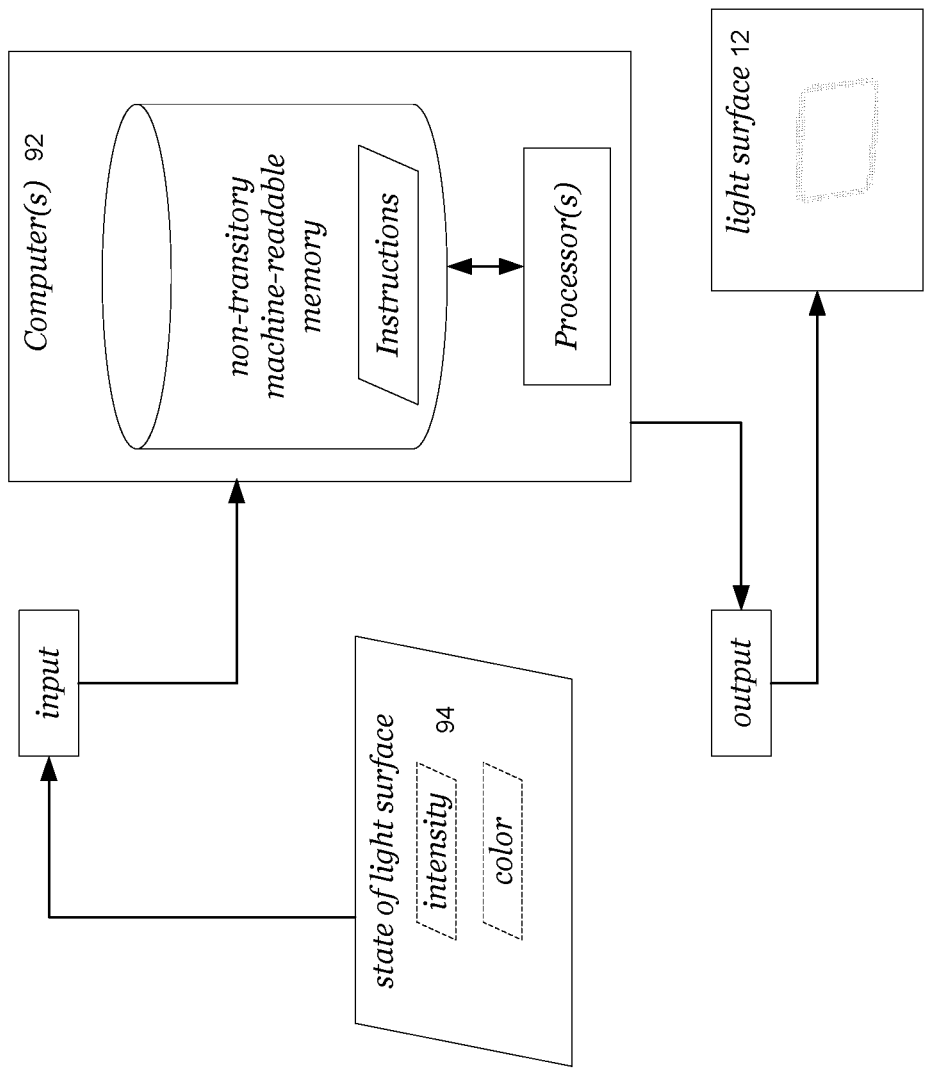
FIG. 25 shows a computer for controlling the lighting device.

FIG. 25 shows a computer 92 for controlling the annular rectangular light 12 of the lighting device. The control handset 16 can have the computer 92, for example. The embodiments of the devices, systems and methods described herein may include an application implemented in a combination of both hardware and software of the computer 9. The application can connect to the annular rectangular light 12 to control the state 94 of the light surface with control commands. The state 94 of the light surface can be defined by different intensity values and/or color values, for example. The computer 92 can include at least one processor, a data storage system (including volatile memory or non-volatile memory or other data storage elements or a combination thereof), and at least one communication interface. Program code is applied to input data to perform the functions described herein and to generate output control commands to adjust the annular rectangular light 12. The output control commands can be applied to one or more output devices (light surface) of the annular rectangular light 12. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The computer 92 can receive an input indicative of a state of the annular rectangular light 12, and cause the annular rectangular light 12 to achieve the state by sending an output to the annular rectangular light 12 based on the input. For example, the state of the annular rectangular light 12 can include a color and an intensity of each of the plurality of digital addressable LEDs.

The computer 92 has at least one processor configured to execute software instructions stored on a computer readable tangible, non-transitory medium. For example, computer 92 can be operating as a web server, database server, or other type of computer server in a manner to fulfill described roles, responsibilities, or functions.

Figure 26:
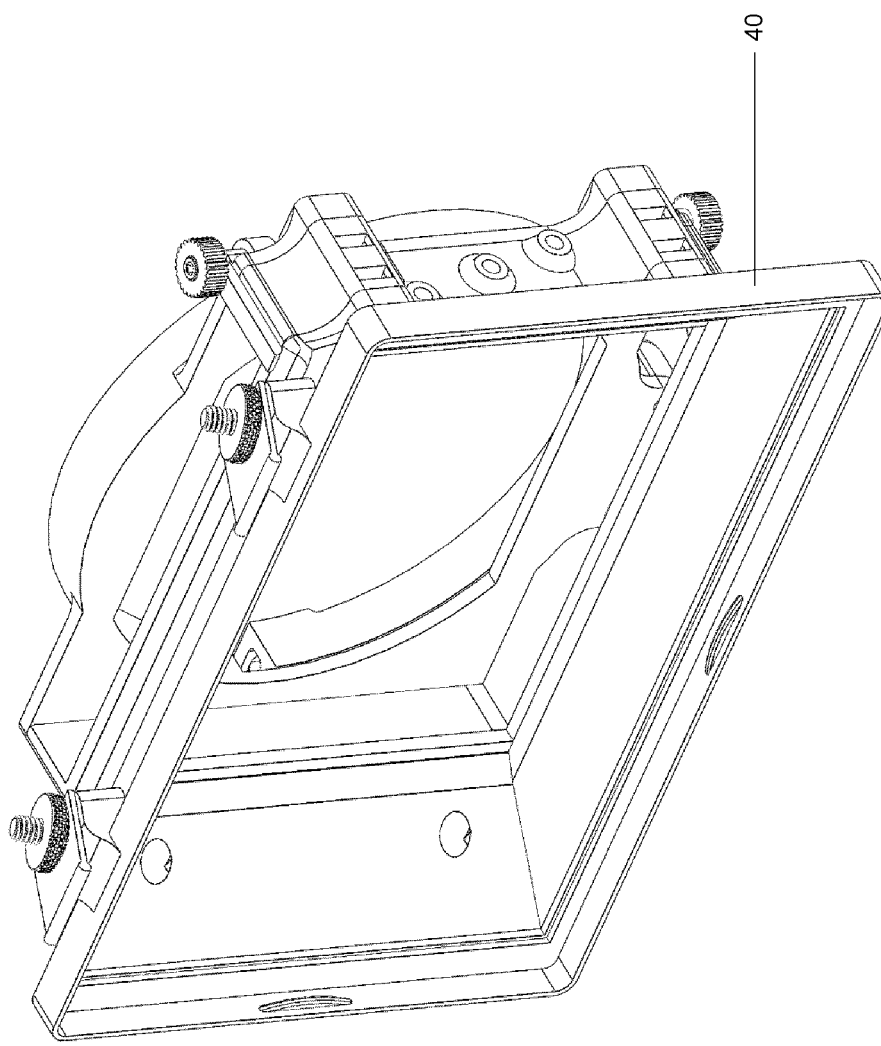
FIG. 26 shows a matte box.

FIG. 26 shows a matte box 40 without a flag as an example embodiment

Figure 27:
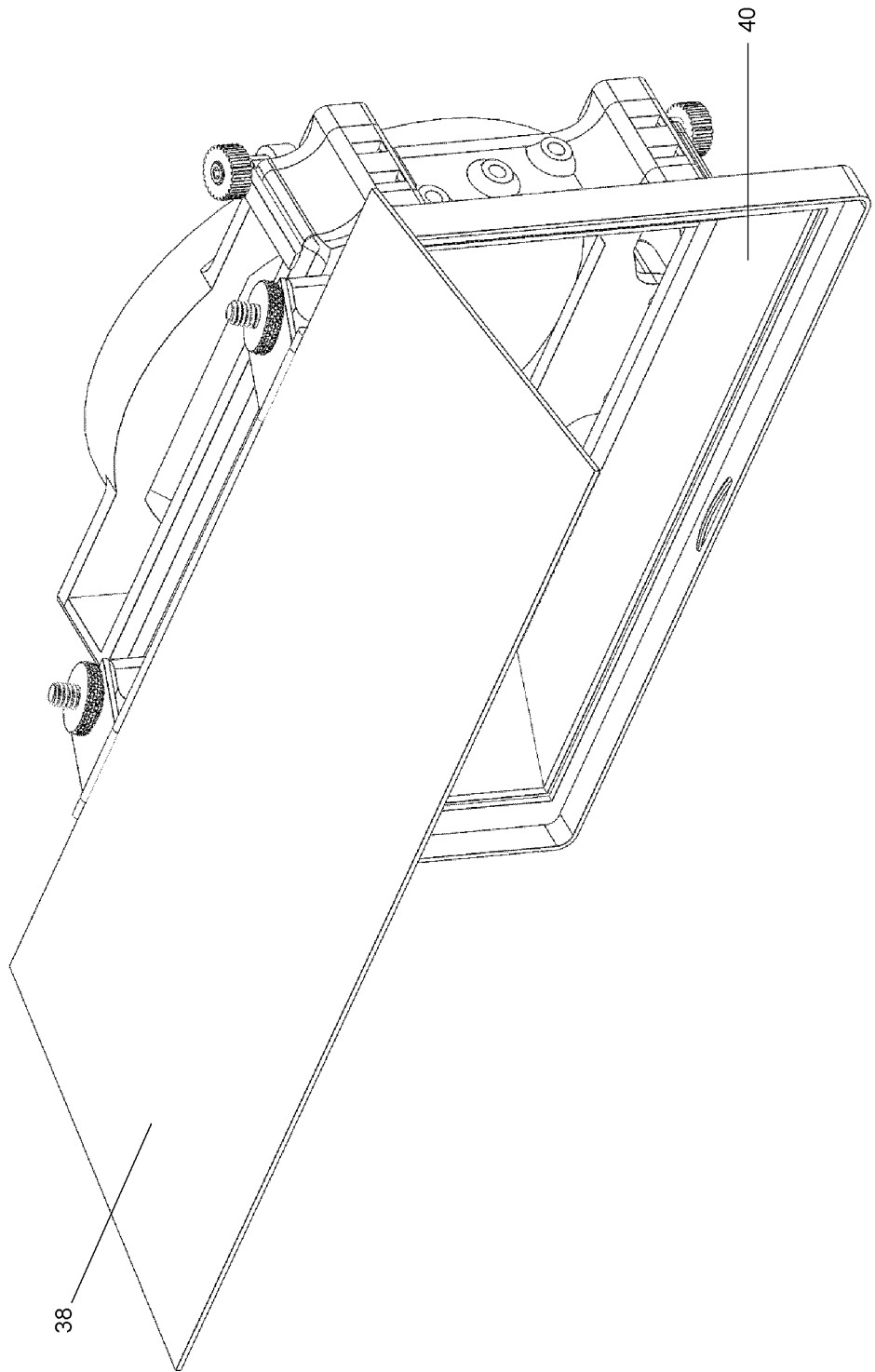
FIG. 27 shows a matte box with a flag.

FIG. 27 shows a matte box 40 with a top flag 38 as another example embodiment. The matte box 40 connects to the top flag 38 by a connector.

Figure 28:
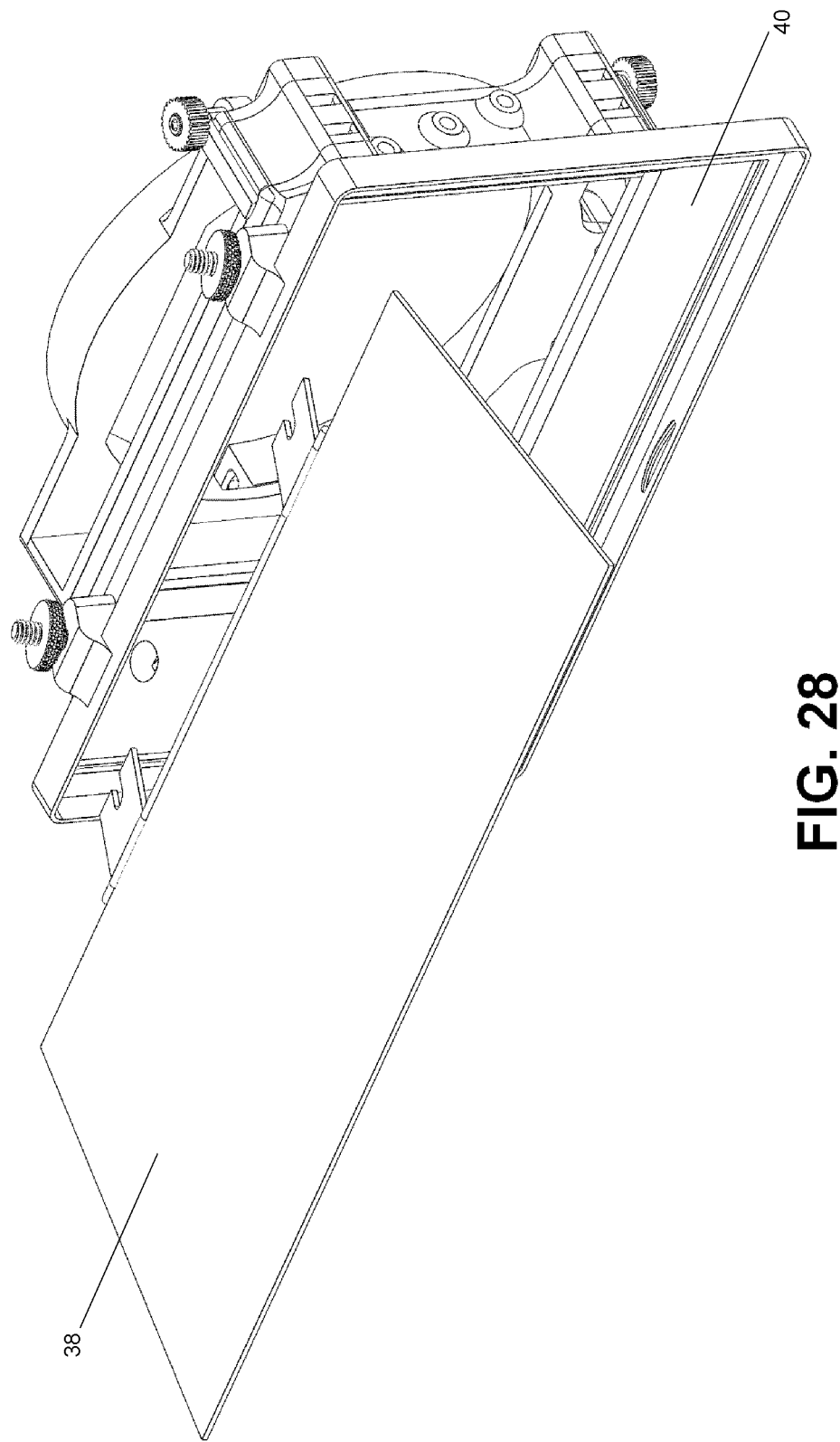
FIG. 28 shows a matte box with the flag not connected.

FIG. 28 shows the matte box 40 and the top flag 38 in an exploded view and not connected.

Figure 29:
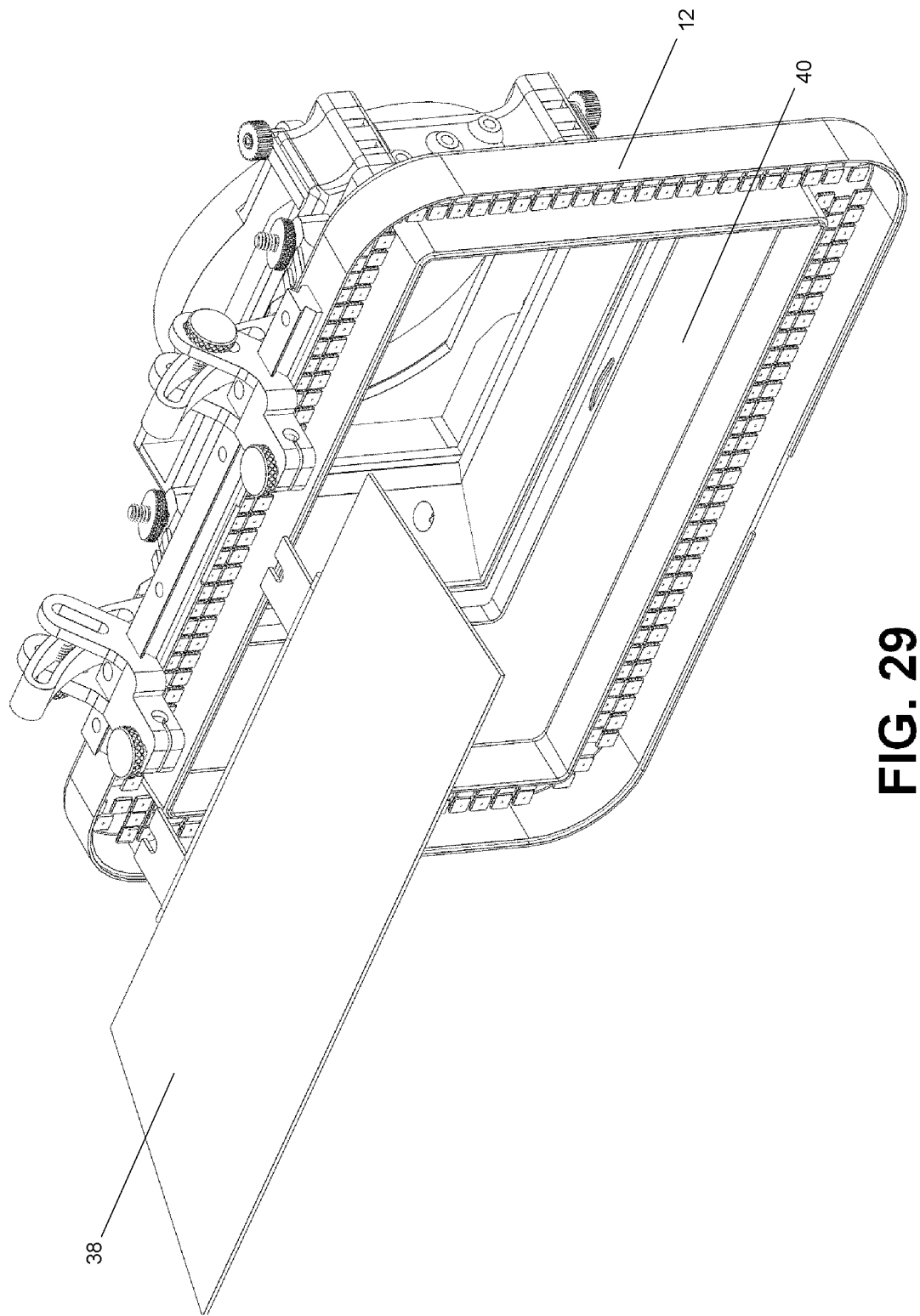
FIG. 29 shows a matte box with integrated lighting and a flag.

FIG. 29 shows another example matte box 40 connected to LEDs of the annular rectangular light 12. The top flag 38 is also shown in an exploded view.

Figure 30:
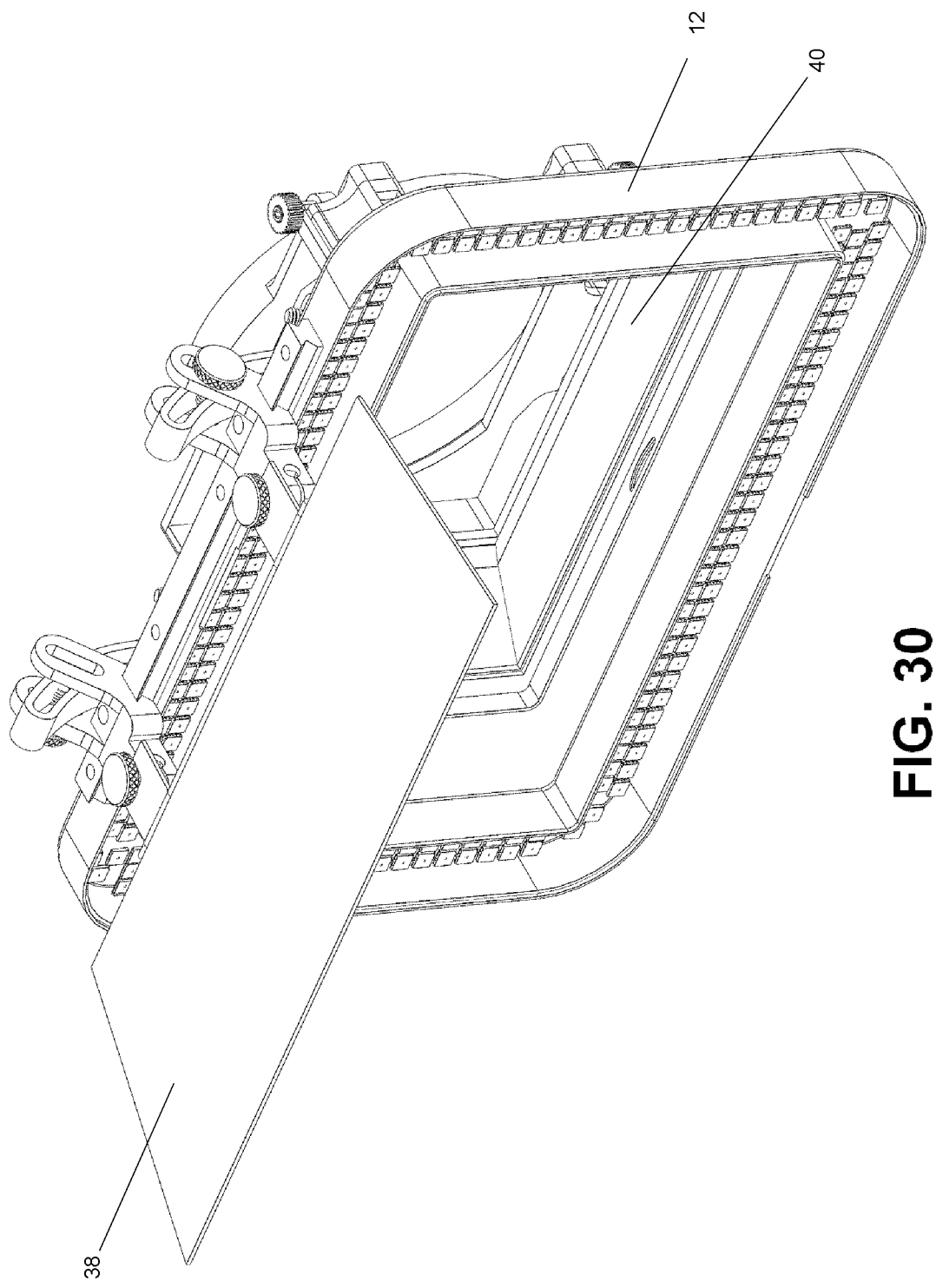
FIG. 30 shows a matte box with integrated lighting.

FIG. 30 shows the matte box 40 connected to LEDs of the annular rectangular light 12 and connected to the top flag 38.

Figure 31:
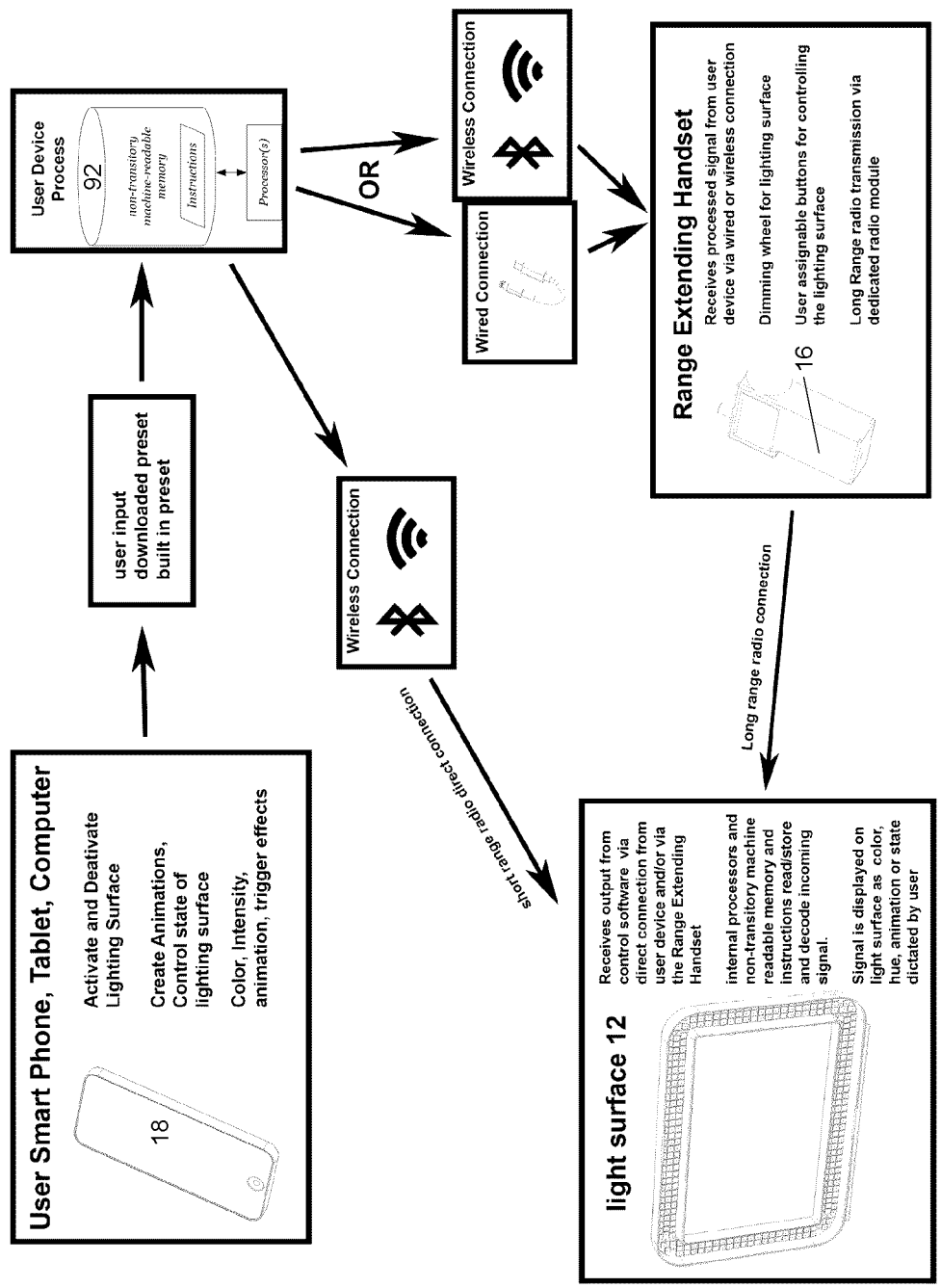
FIG. 31 shows a flow diagram for a control handset for controlling the lighting device.

FIG. 31 shows an example flow diagram for a control handset 12 for controlling the annular rectangular light 12. In this example, a mobile device 18 can transmit user input data to the computer 92. The mobile device 18 can be used to activate and deactivate the annular rectangular light 12. The mobile device 18 can be used to generate control files for animations and instructions to control the state of the annular rectangular light 12. The mobile device 18 can be used to generate control files with instructions to control the colour intensity, animation, and trigger effects of the annular rectangular light 12.

The mobile device 18 can transmit data to the computer 92. The computer 92 can connect to the control handset 16 in wireless connection to the annular rectangular light 12. In this example, the control handset 16 connects to the annular rectangular light 12 via long range radio connection. The control handset 16 receives processed signals from the computer 92 via wired connection or wireless connection. The control handset 16 can have different input devices, such as a dimming wheel to control the annular rectangular light 12. The control handset 16 can have user assignable buttons for controlling the annular rectangular light 12. The control handset 16 can have long range radio transmission via dedicated radio module. The annular rectangular light 12 receives the output or instructions from the control software of the control handset 16. The annular rectangular light 12 can also receive the output or instructions from the control software of the computer 92 via wireless connection. For example, the wireless connection can be a short range direct connection. The control handset 16 can be a range extending control device in this example.

The annular rectangular light 12 has internal processors and non-transitory machine readable memory and instructions to read, store and decode incoming signals and control instructions. The signal can be displayed on the annular rectangular light 12 as a colour, hue, animation or state dictated by the user and control signals.

The mobile device 18 can be configured with a Lighting Device Application to transmit control signals for the annular rectangular light 12.

The Lighting Device Application provides users with a series of ways to create static and animated light patterns on the annular rectangular light 12.

Upon logging into the Lighting Ring Application, users can access different functions of the application framework. An example function is "Tap Gestures" to select a variation of colors in order to create animation patterns on the surface of the annular rectangular light 12. There can be different command patterns.

An example command pattern is BASIC STATIC COLOR SELECTION. The user taps to select a visual element for a color swatch on the mobile device 18. The Lighting Ring Application saves the selected color to its local storage. If the user chooses, the Lighting Ring Application saves the selected color to the computer 92 under the logged-in user's account for later recollection and distribution. The color data is transferred over BLE to the Lighting Ring or to the attached REH.

An example command pattern is DEVICE CAMERA CAPTURE COLOR SELECTION. The user taps inside the Lighting Ring Application to open the mobile device 18 camera. The mobile device 18 camera launches, and the user taps various points inside the camera frame in order to capture color(s). The Lighting Device Application saves the selected color(s) to its local storage. If the user chooses, the Lighting Ring Application saves the selected color to the computer 92 under the logged-in user's account for later recollection and distribution. The color data is transferred over BLE to the Lighting Ring or to the attached REH.

An example command pattern is CREATE ANIMATION. The user opens the Lighting Device Application's 'create animation' mode. The mobile device 18 displays an on-screen diagram of the annular rectangular light 12, and provides users with the ability to utilize tap and drag gestures in order to free-draw inside the confines of the ring. Color selection in this mode is available. This interaction is recorded by the mobile device 18 camera. For example, the user taps BLUE, and than proceeds to draw inside a visual element representing the annular rectangular light 12 in order to highlight which areas (pixels) of the annular rectangular light 12 should appear BLUE upon data transfer. The data generated from the recorded color and animation pattern is encoded, and transferred via BLE to the annular rectangular light 12 or attached REH.

An example command pattern is CAPTURE OR RECOGNIZE ANIMATION. The user taps inside the Lighting Device Application to open the mobile device 18 camera. The user uses this selected mode to point the activated camera at an animation source (e.g. flashing police lights). The Lighting Device Application records the targeted animation, processes (encodes) the required data for comparison, and either pulls the recognized formation from a database of pre-recorded animation effects, or generates a new effect from the encoded data, and stores it locally (or remotely at computer 92) for later recollection. The newly created data is sent to the annular rectangular light 12 or the attached REH via BLE.

In order to display the different command patterns on the annular rectangular light 12 there can be different data encoding specifications. Examples include pixels selected by the user (e.g. so that the annular rectangular light 12 will know which color goes where), selected color temperature, duration of animation, speed of animation, opacity of each selected color, and RGB specs for each color selected.

Other command patterns can also be used to control the annular rectangular light 12.

Figure 32:
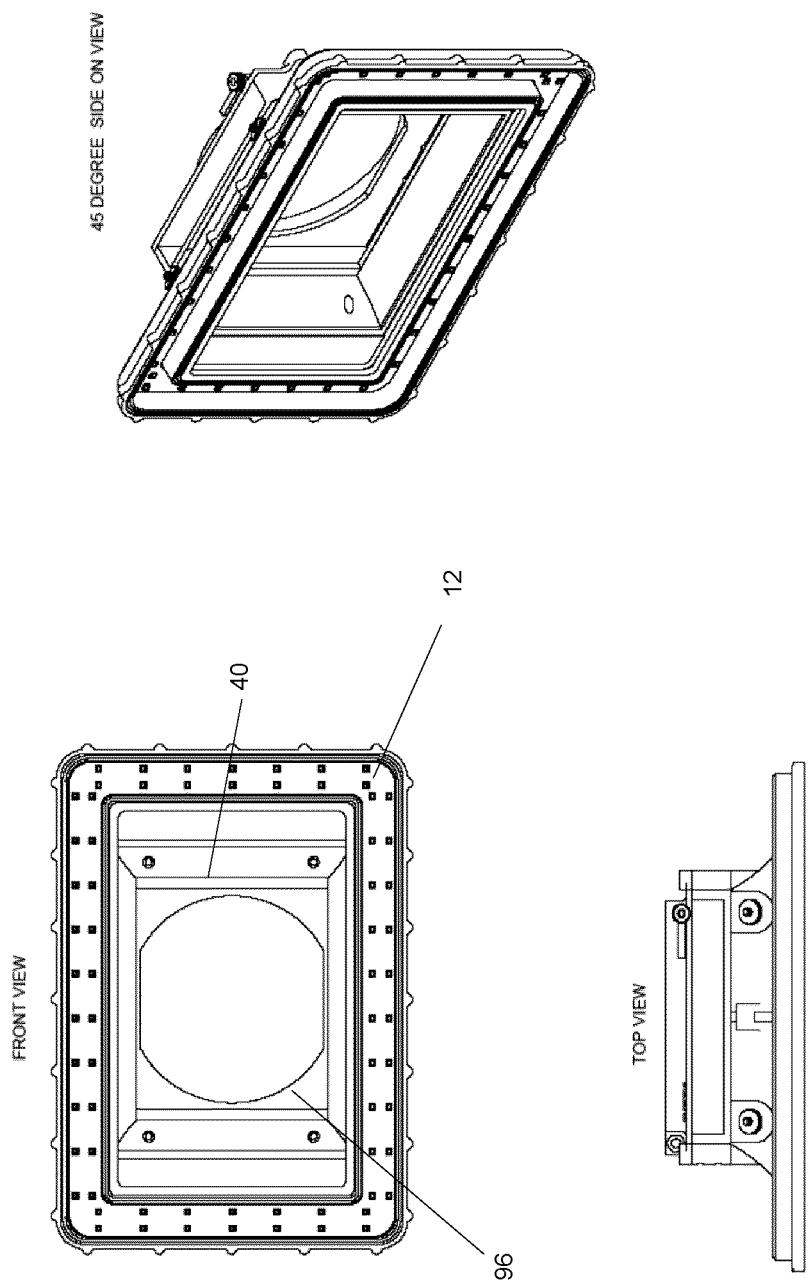
FIG. 32 shows a variant of the lighting device with the LED ring integrated into the matte box.

FIG. 32 shows a variant of the lighting device 10 with the annular rectangular light 12 integrated into the matte box 40. The matte box 40 has a shade with built in LED lighting surface to provide the annular rectangular light 12 in this example. The matte box 40 also has a lens clamp ring 96. FIG. 32 shows a front view, side on view, and a top view of the variant of the lighting device 10.

FIG. 33 shows an example rod system for the variant of the matte box 40 integrated with the annular rectangular light 12. The rod system can include a rod mount 98 that connects to the LED housing section of the annular rectangular light 12. FIG. 33 shows a front view and a side view of the rod system for the variant of the lighting device 10.

Figure 34:
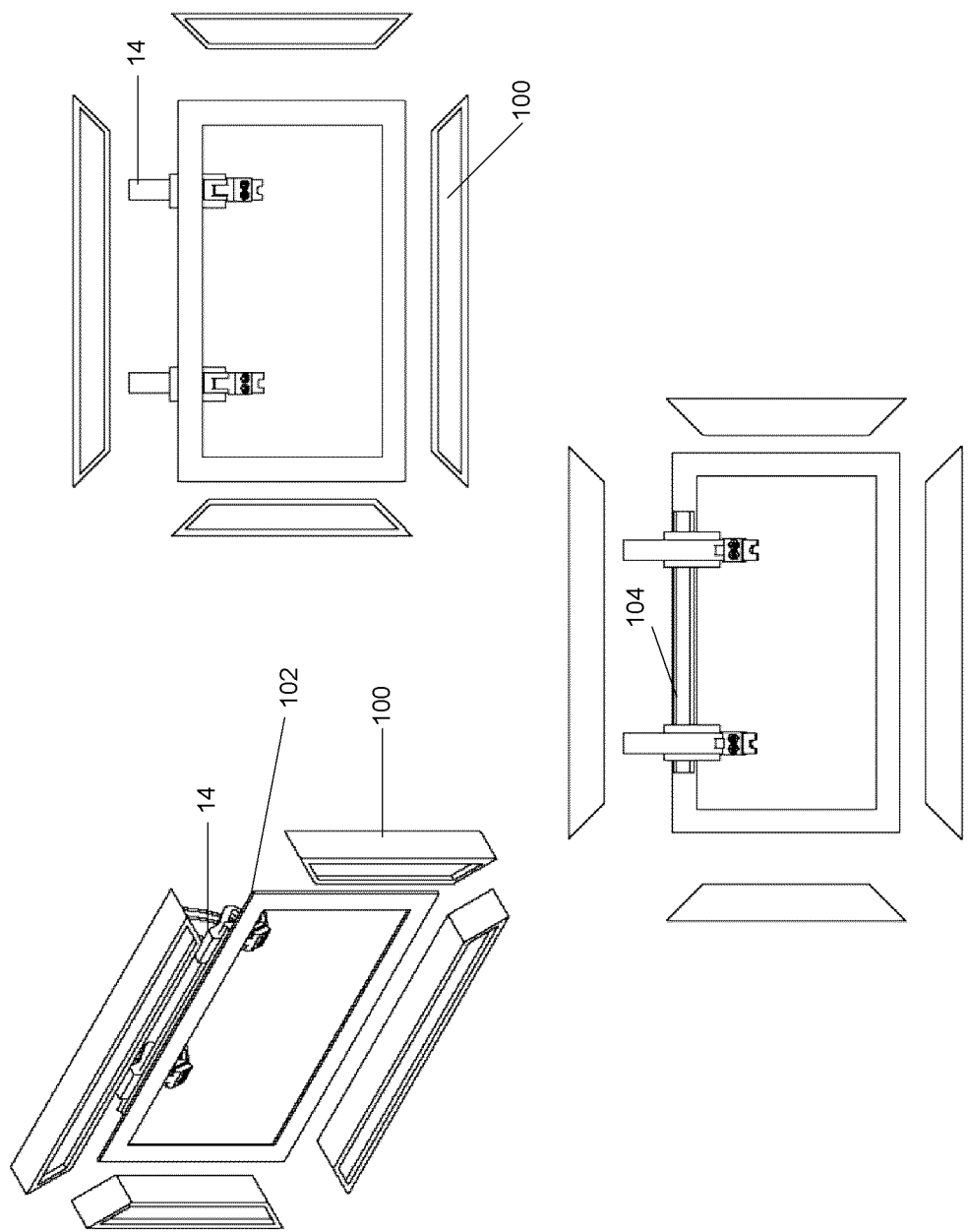
FIG. 34 shows another variant of the lighting device.

FIG. 34 shows another variant of the lighting device in an exploded view. FIG. 34 shows a front view, side on view, and a rear view. The variant of the lighting device 10 has a bracket system 14. A modular light surface 100 connects to the bracket system 14 by a static chassis 102 in this example. The modular light surface 100 can connect to other modular light surfaces 100 to form the annular rectangular light 12. The modular light surface 100 can be removable. The lighting device 10 has a linear rail 104.

Figure 35:
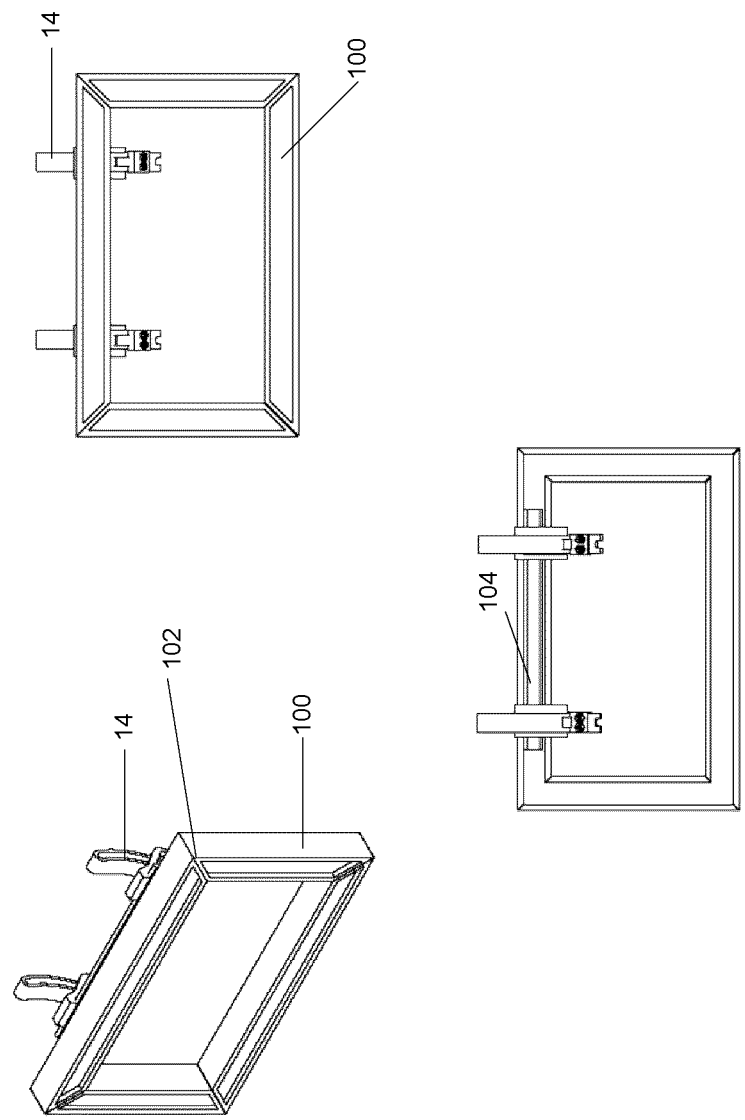
FIG. 35 shows another view of the variant lighting device.

FIG. 35 shows another view of the variant lighting device with the modular light surface 100 connected to the bracket system 14 by the static chassis 102.

Figure 36:
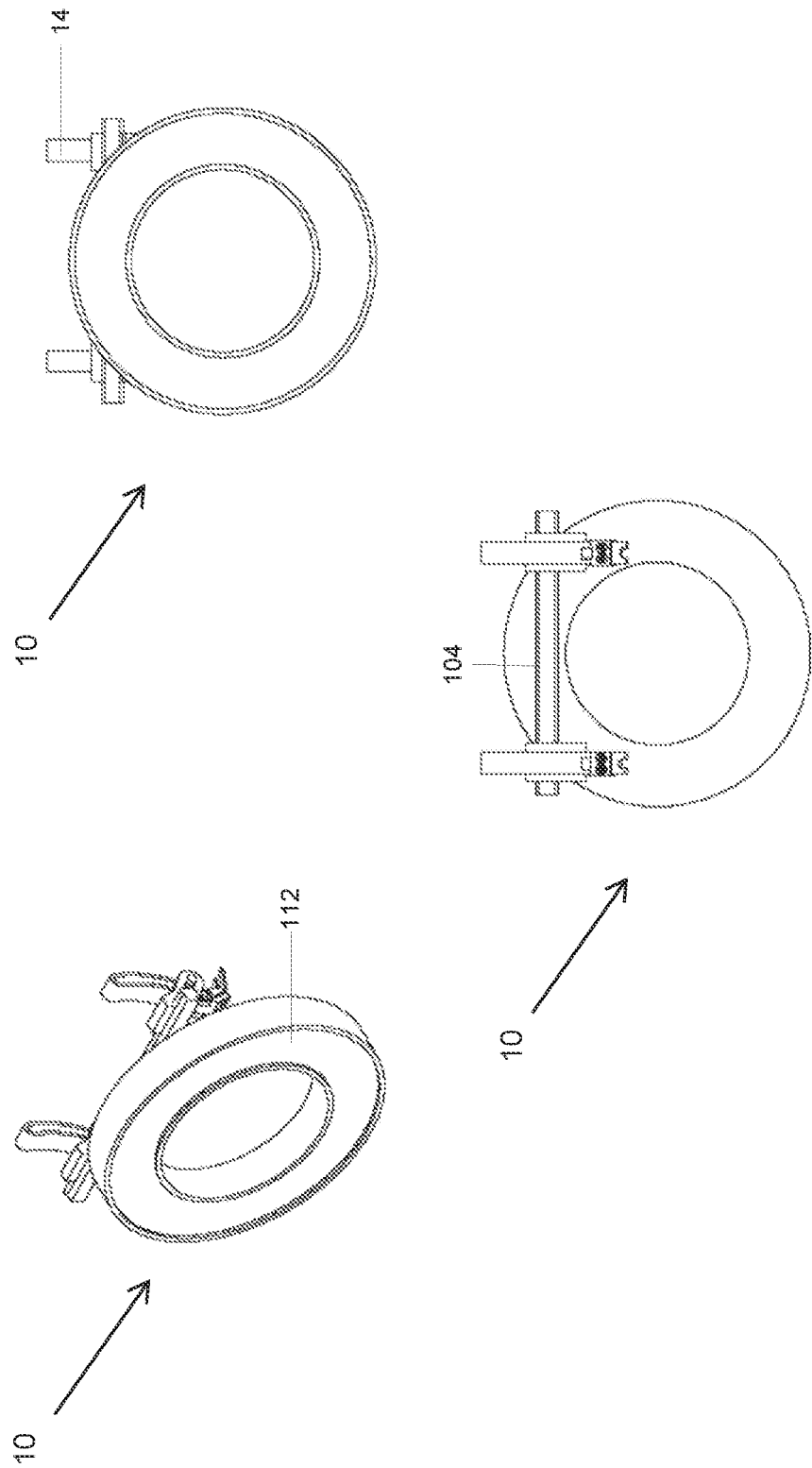
FIG. 36 shows an alternate shape for the lighting device.

FIG. 36 shows an alternate shape for the lighting device. The lighting device 10 can have different shapes of LED housings. In this example, the lighting device 10 is circular. The lighting device 10 has a circular housing 112 with a bracket system 14 and linear rail 104. FIG. 36 shows a front view, side on view, and a rear view.

Figure 37:
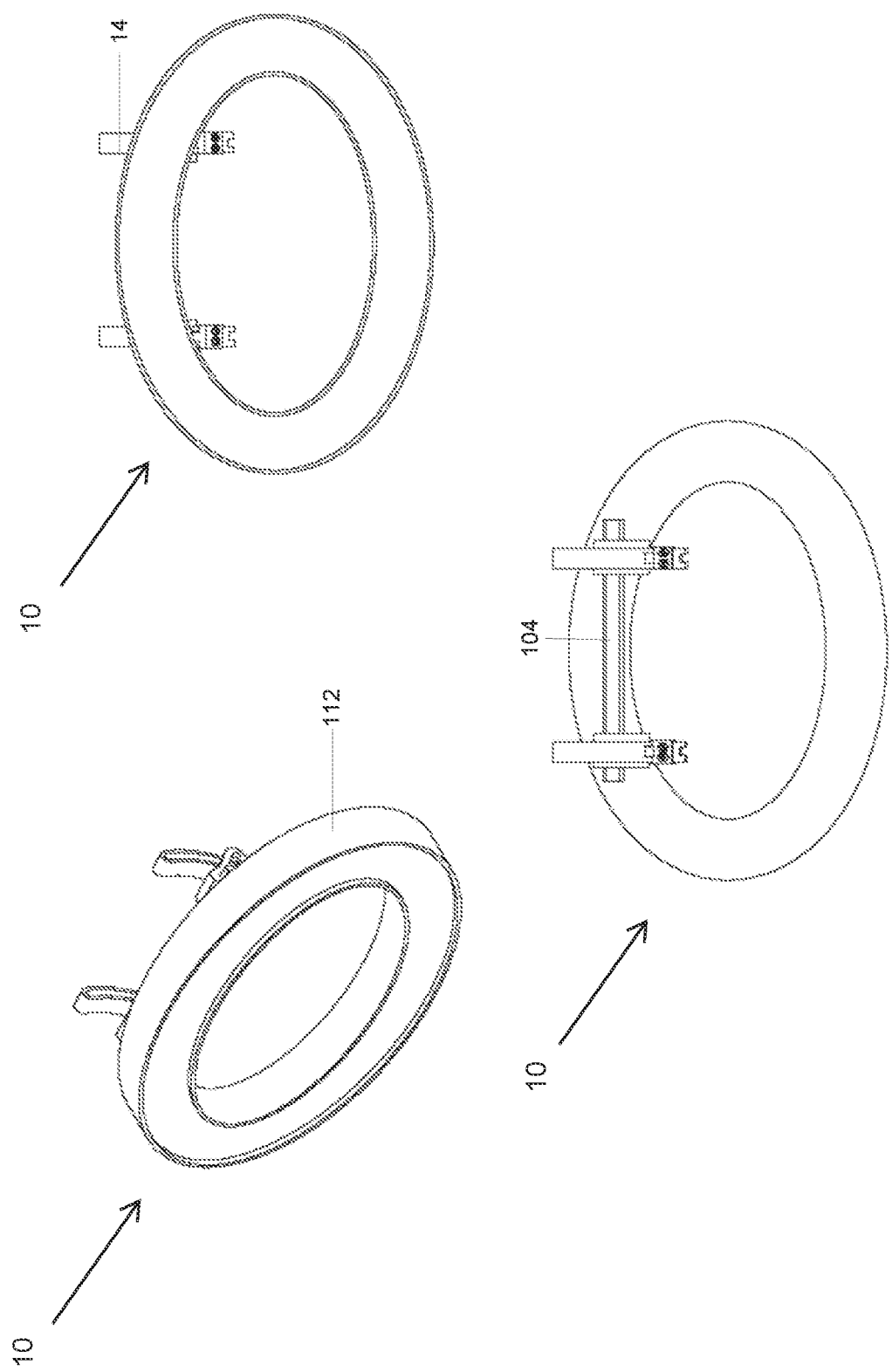
FIG. 37 shows another alternate shape for the lighting device.

FIG. 37 shows another alternate shape for the lighting device. As noted, the lighting device 10 can have different shapes. In this example, the lighting device is oval. The lighting device 10 has an oval housing with a bracket system 14 and linear rail 104. FIG. 37 shows a front view, side on view, and a rear view.

Figure 38:
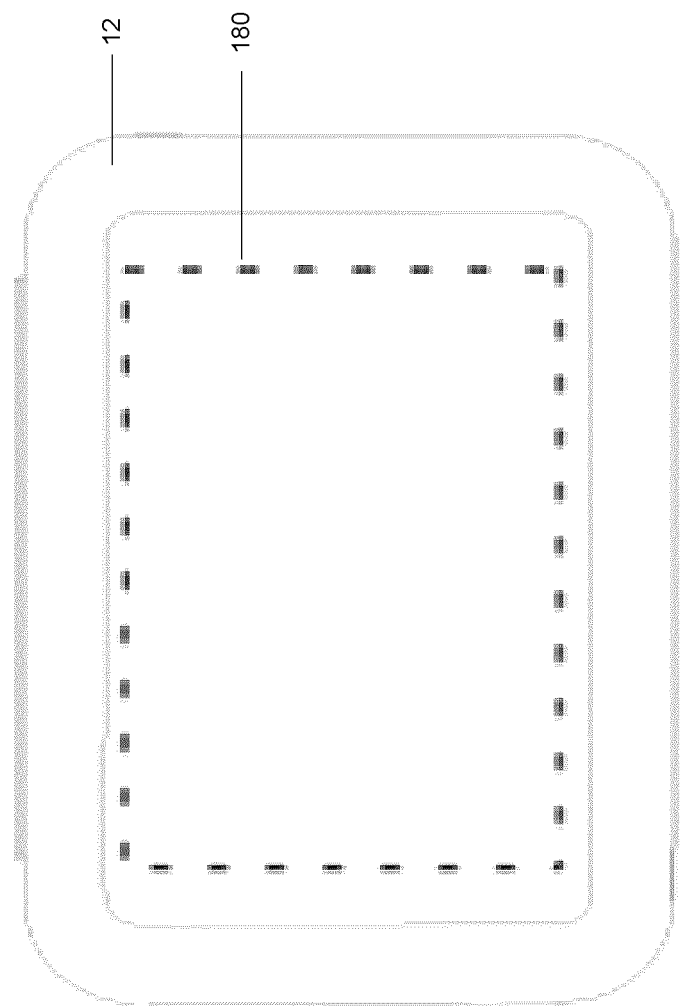
FIG. 38 shows an example field of view for a camera and the lighting device.

FIG. 38 shows an example FOV 180 for a camera. As shown, the annular rectangular light 12 does not obstruct the FOV 180.

Figure 39:
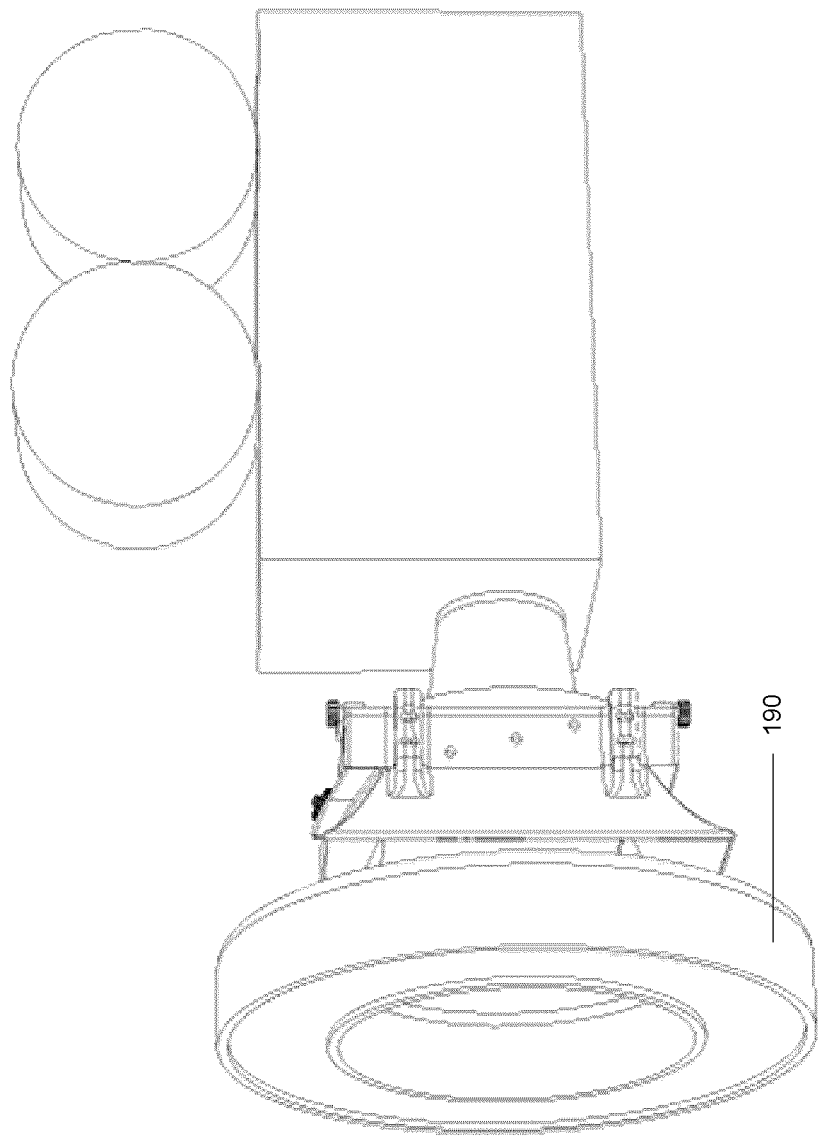
FIG. 39 shows an example assembly.

FIG. 39 shows a ring light 190 attached to an example assembly.

Figure 40:
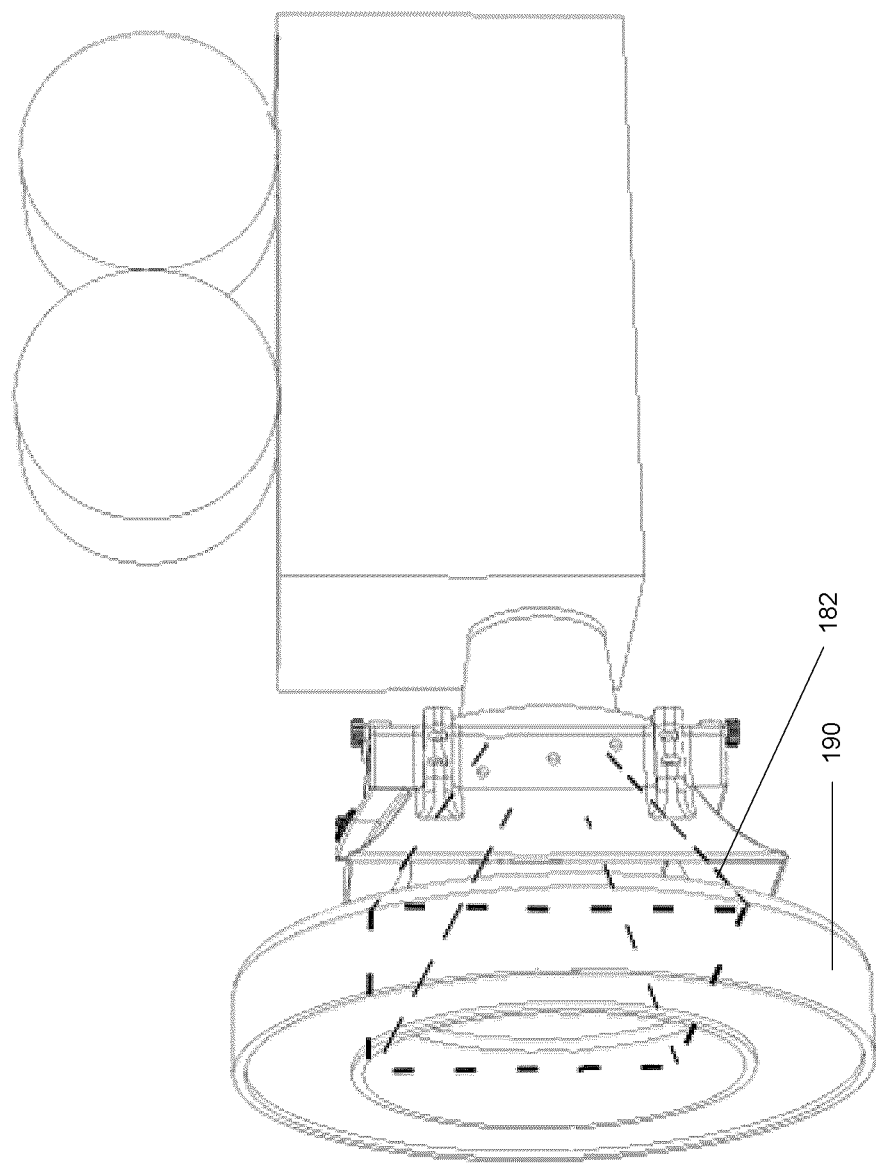
FIG. 40 shows an example assembly with an overlay for a field of view.

FIG. 40 shows the ring light 190 and the example assembly with an overlay corresponding to the FOV 182 of the assembly.

Figure 41:
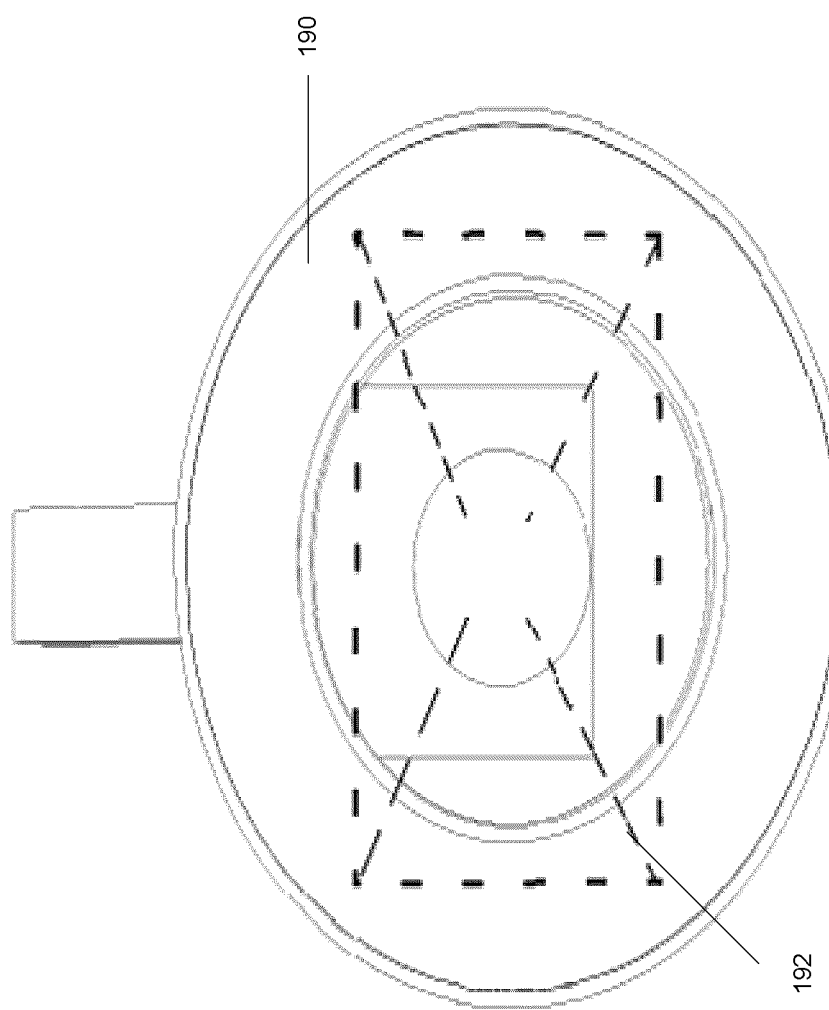
FIG. 41 shows an example ring light obscuring the field of view of the camera.

FIG. 41 shows the example ring light 190 obscuring the FOV 192 of a camera. The ring light 190 LED light intrudes into the captured area of the camera. This can be referred to as "vignette".

Figure 42:
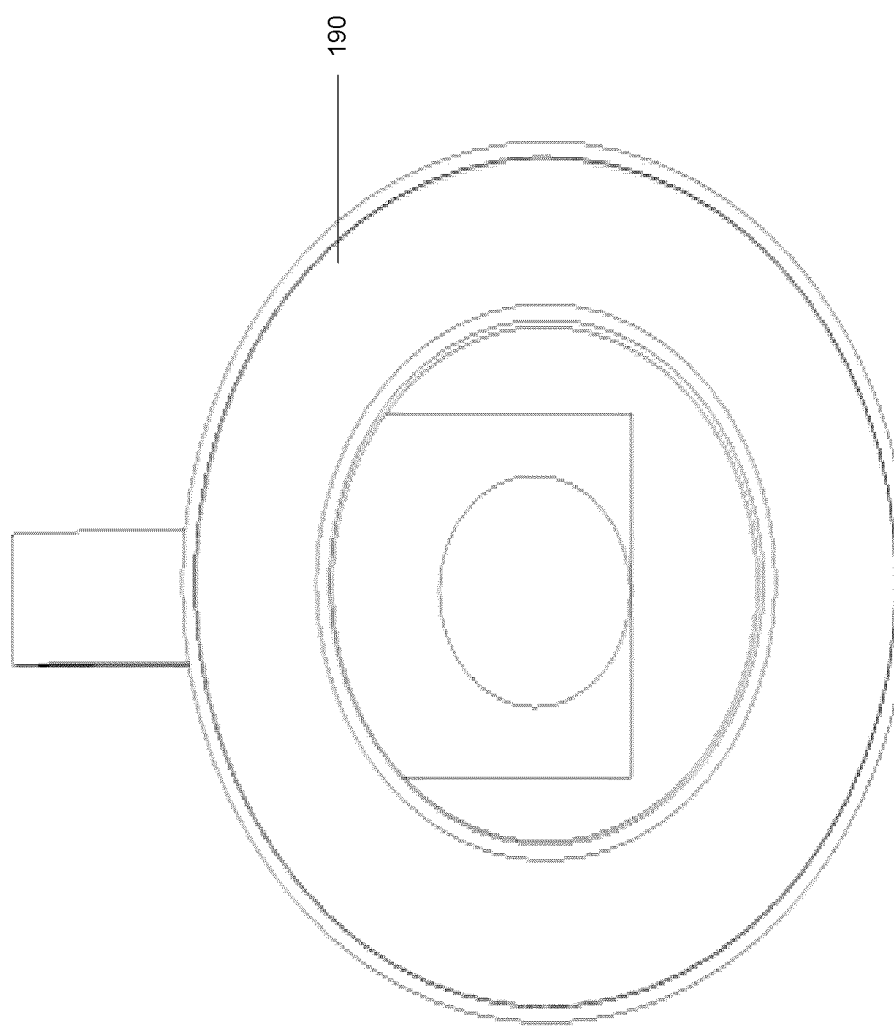
FIG. 42 shows an example ring light in front of the of the camera.

FIG. 42 shows an example ring light 190 in front of the of the camera.

Figure 43:
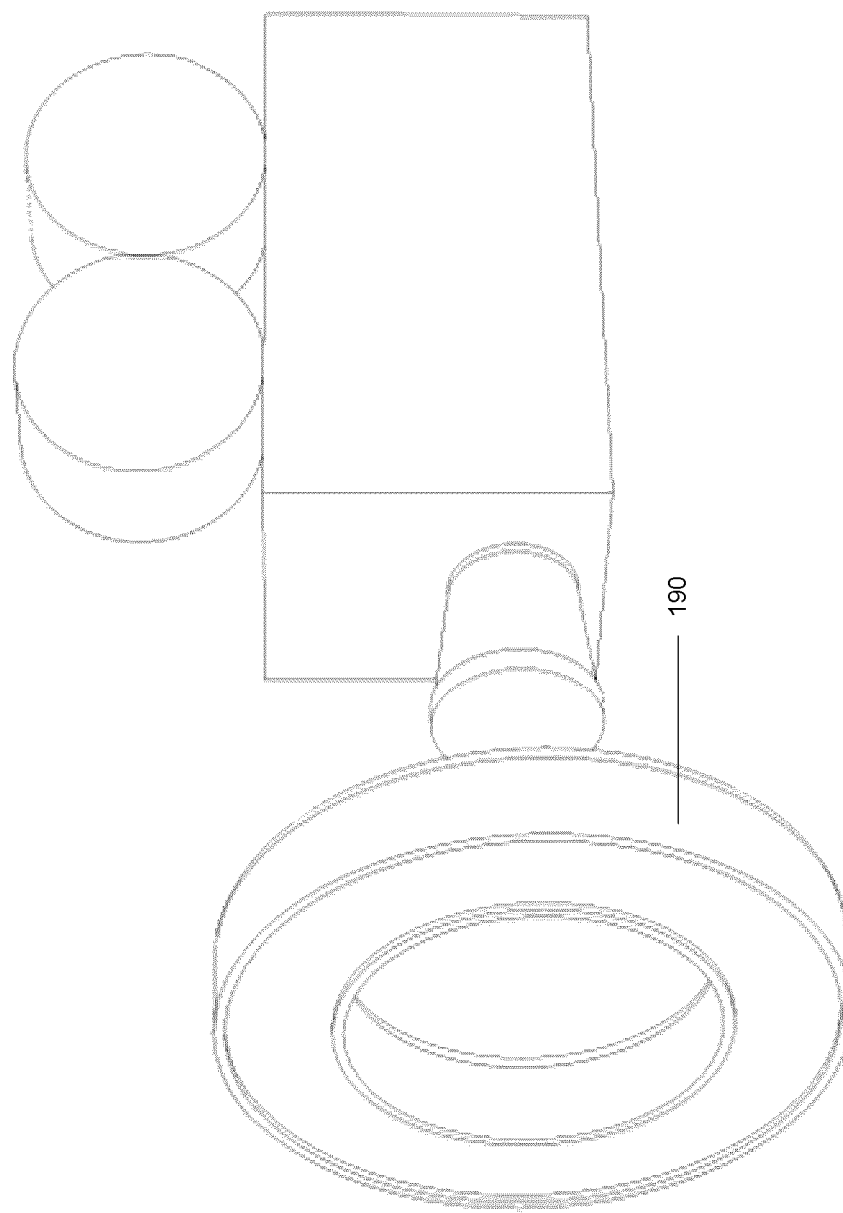
FIG. 43 shows an example side view of the ring light in front of the camera.

FIG. 43 shows an example side view of the ring light 190 in front of the camera.

Figure 44:
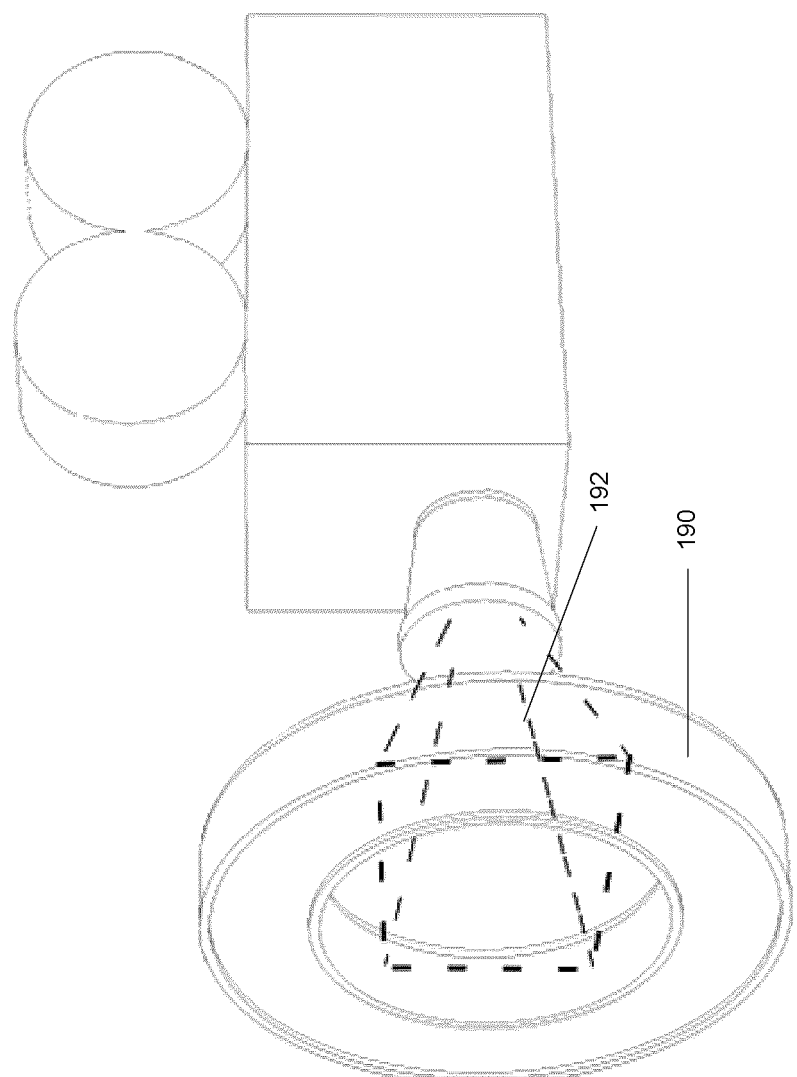
FIG. 44 shows an example side view of the ring light obscuring the field of view of the camera.

FIG. 44 shows an example side view of the ring light 190 obscuring the FOV 192 of the camera.

Figure 45:
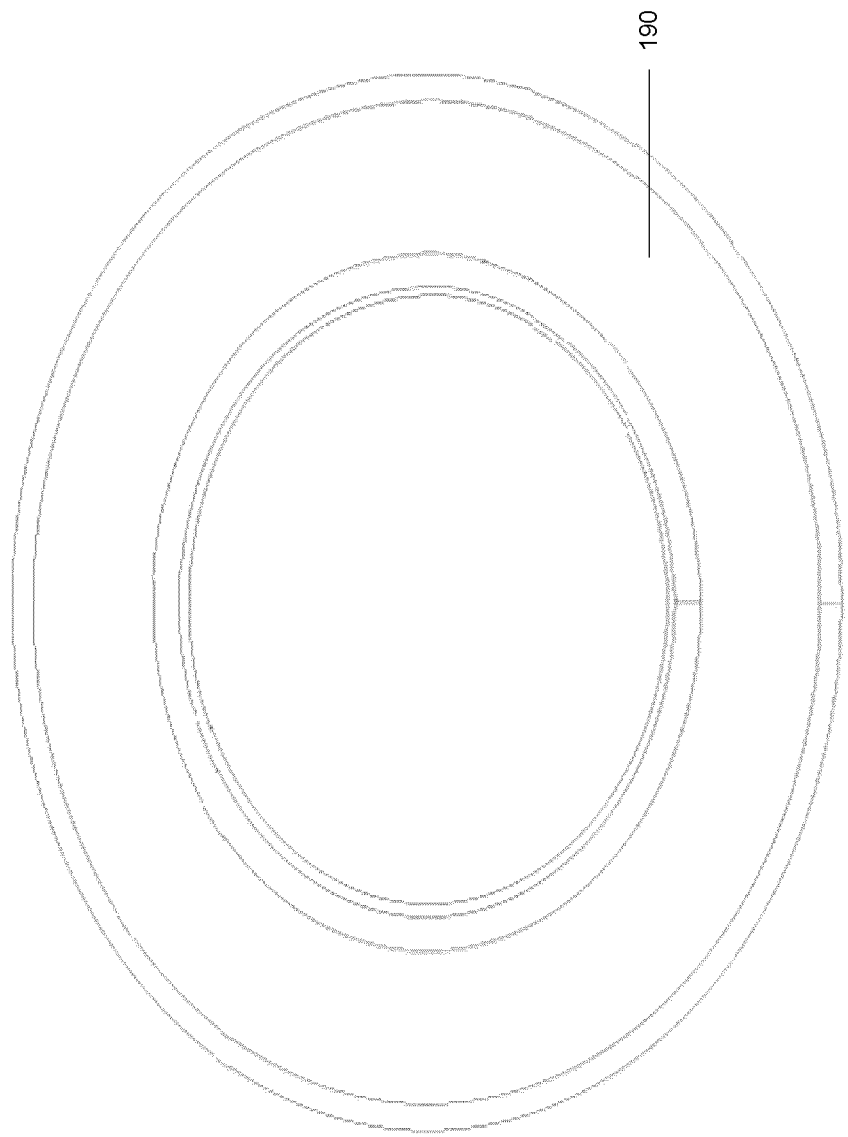
FIG. 45 shows an example ring light.

FIG. 45 shows an example ring light 190 that can be attached to a camera or assembly.

Figure 46:
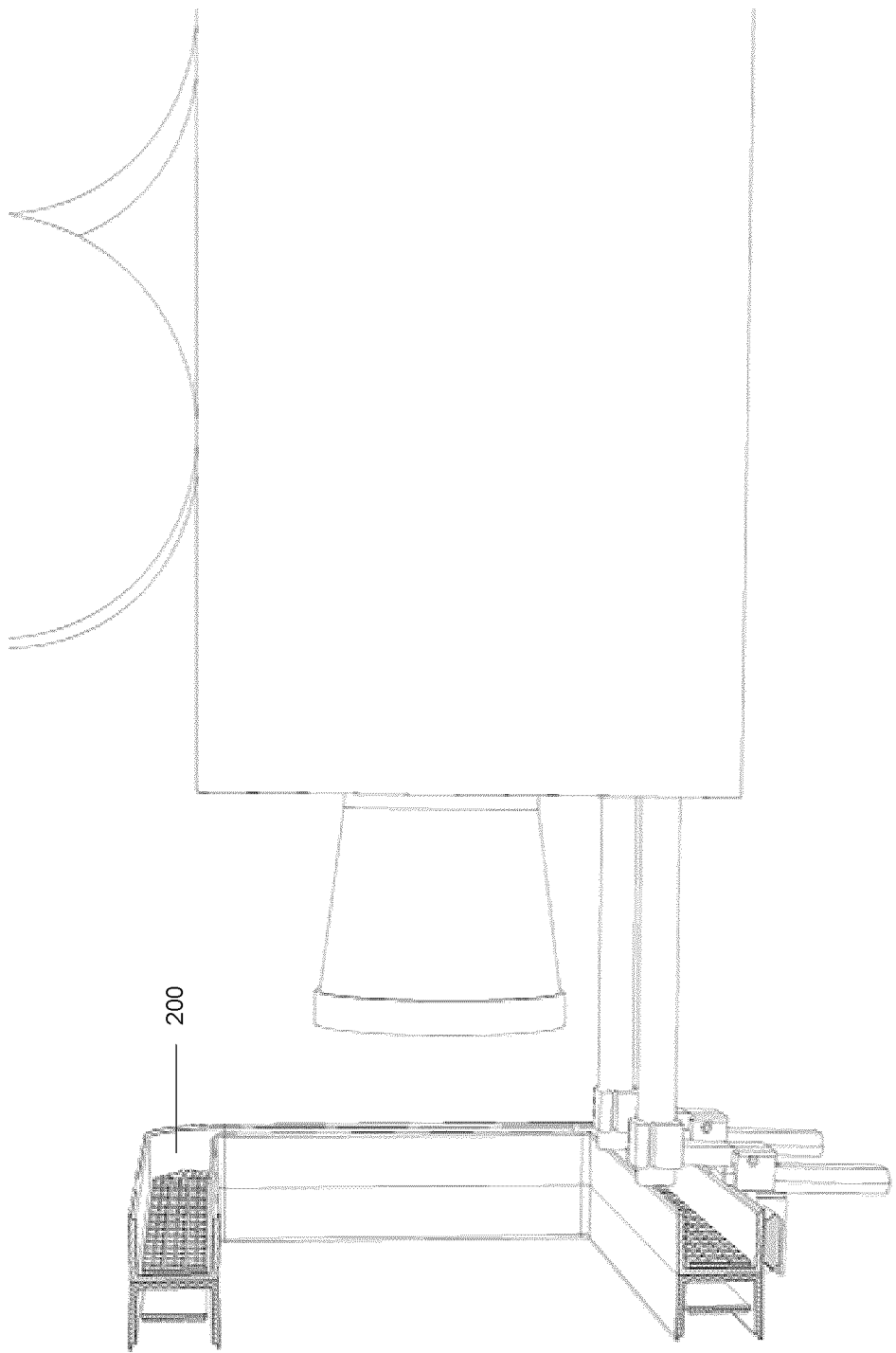
FIG. 46 shows another example lighting device.

FIG. 46 shows another example lighting device 200. This is a variant design with LEDs of the lighting device 200 facing forward and backwards simultaneously. This is a cut away view of the lighting device 200 to show both sides of the LED fixture.

Figure 47:
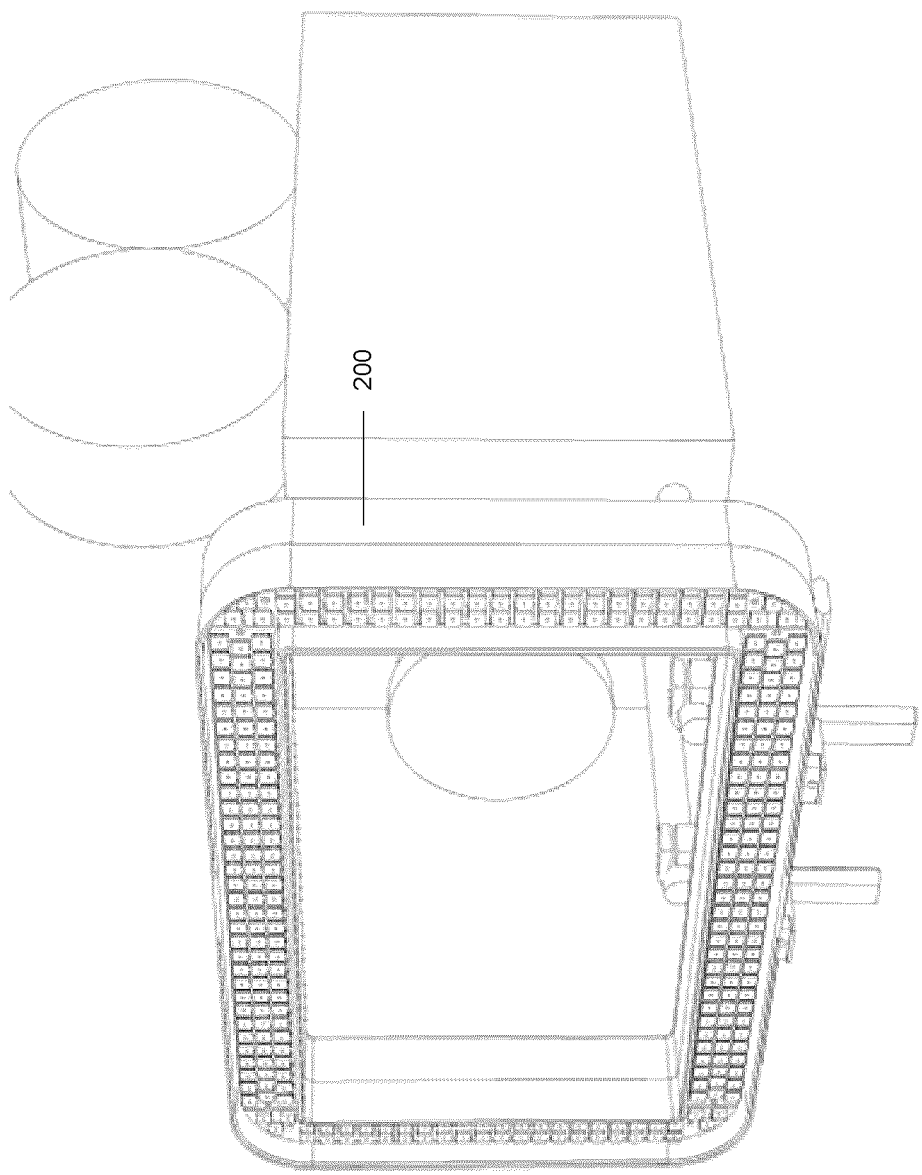
FIG. 47 shows a front view of the lighting device.

FIG. 47 shows a front view of the lighting device 200. This is a variant design with the LEDs facing forward and backward simultaneously. This is a frontal view.

Figure 48:
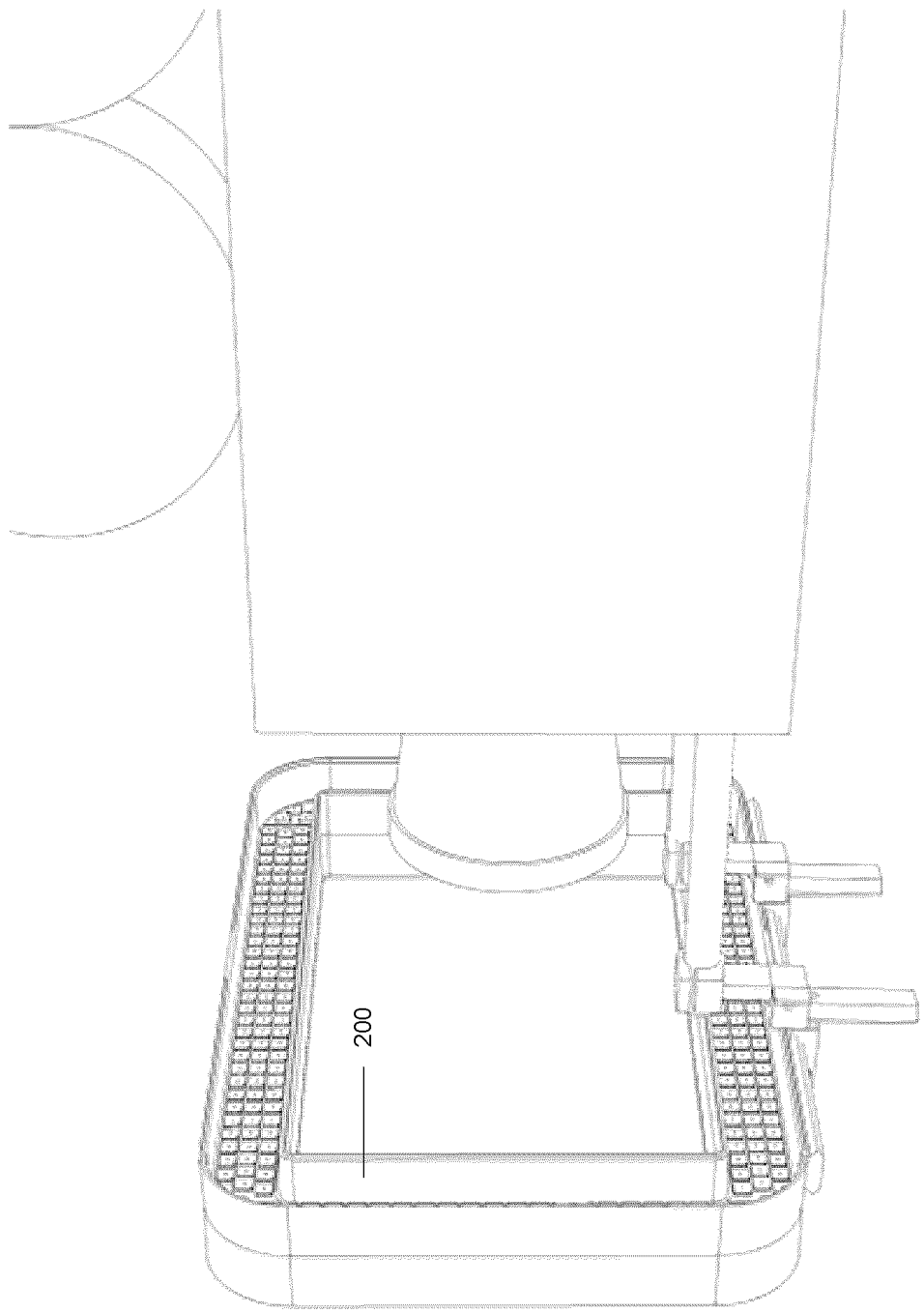
FIG. 48 shows a rear view of the lighting device.

FIG. 48 shows a rear view of the lighting device 200. This is a rear view of the variant design with the LEDs facing forward and backward simultaneously.

Figure 49:
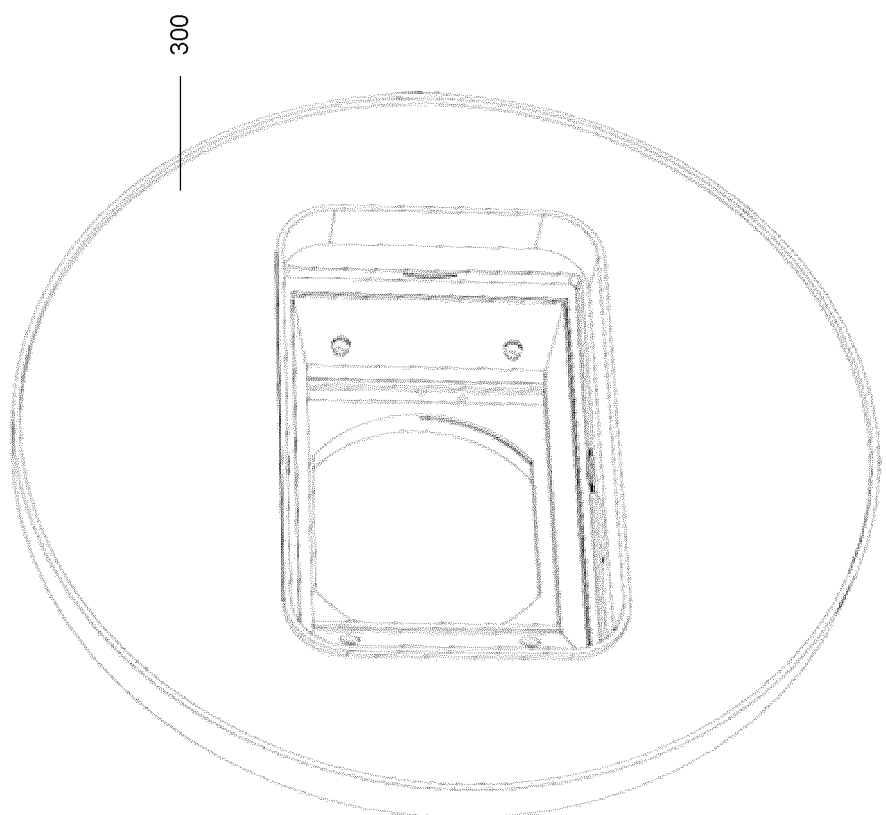
FIG. 49 shows front view of another example lighting device.

FIG. 49 shows a front view of another example lighting device 300. This is a variant design of the LED lighting surface 300 with an annular rectangle centre and round exterior. This is a front view.

Figure 50:
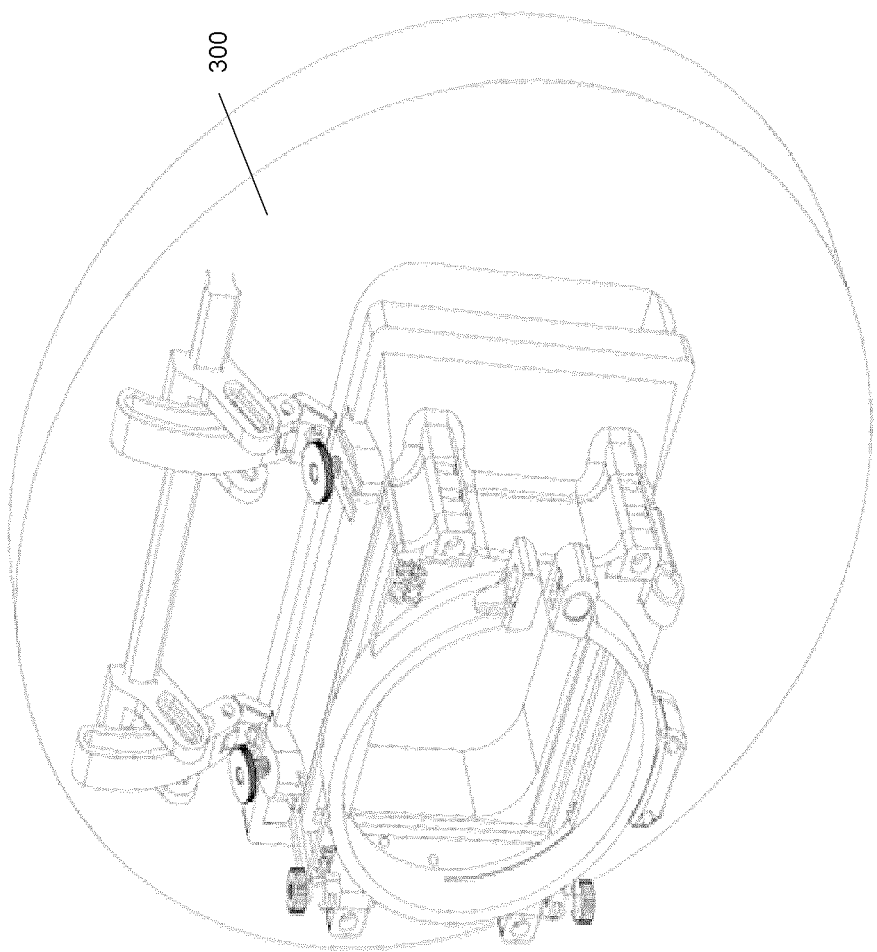
FIG. 50 shows rear view of another example lighting device.

FIG. 50 shows rear view of the other example lighting device 300. This is a rear view. The attachment method shown is UBS as an example.

Figure 51:
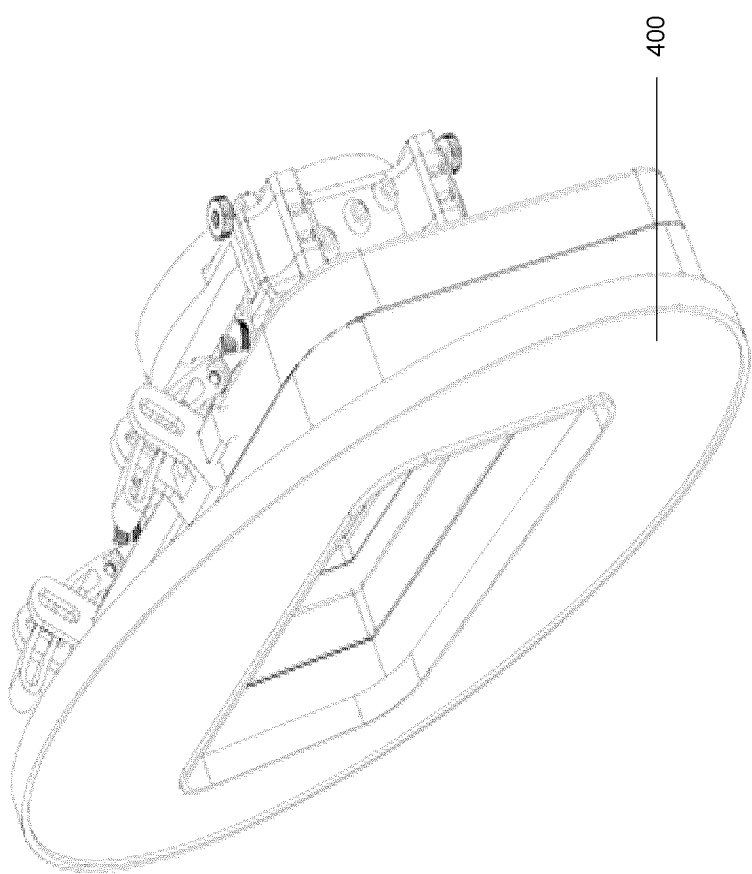
FIG. 51 shows an example accessory.

FIG. 51 shows an example accessory 400 having an alternative shape. The accessory 400 can be a diffuser. The accessory provides a variant design for the annular rectangle LED lighting surface. This is a diffuser accessory 400 that connects to the annular LED lighting surface and changes the shape of the light from an annular rectangle or to round light with a rectangle centre. This is a side view.

Figure 52:
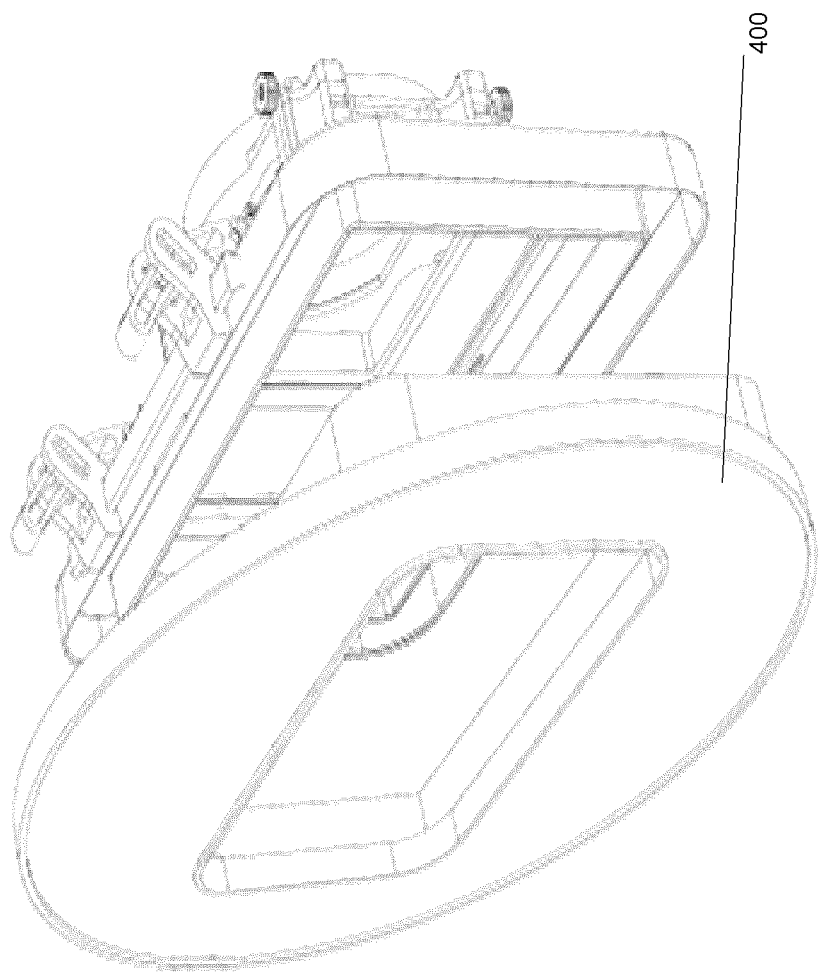
FIG. 52 shows an exploded view of an example accessory.

FIG. 52 shows an exploded view of an example accessory 400. The diffuser accessory 400 can connect to the lighting device and changes the shape of the light from an annular rectangle or to round light with a rectangle centre. This is a an exploded view to show how the accessory 400 is attached in relation to the annular rectangle lighting device.

Figure 53:
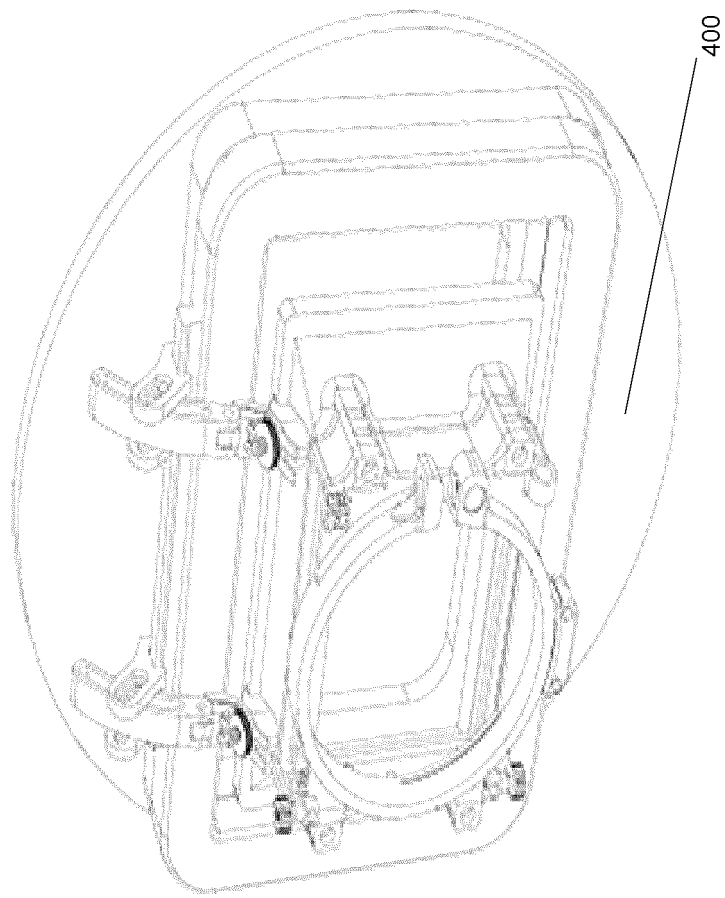
FIG. 53 shows a rear view of an example accessory.

FIG. 53 shows a rear view of an example accessory 400 to show the diffuser shape relative to the lighting device.

Figure 54:
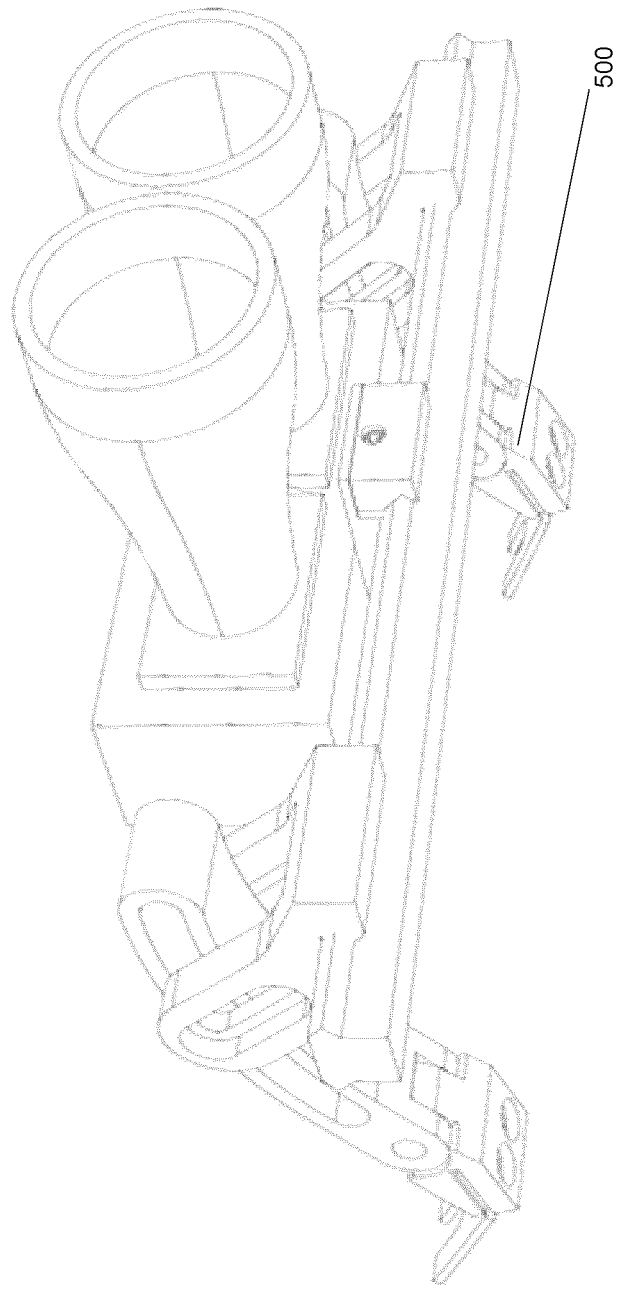
FIG. 54 shows a bracket system with an accessory.

FIG. 54 shows a bracket system 500 for different accessories. Different (third-party) accessories can be used for the bracket system described herein. This illustrates that the bracket system can be used to affix different third-party accessory with a ¼-20 or ⅜-16 thread. The bracket system can function without the LED light, for example.

Figure 55:
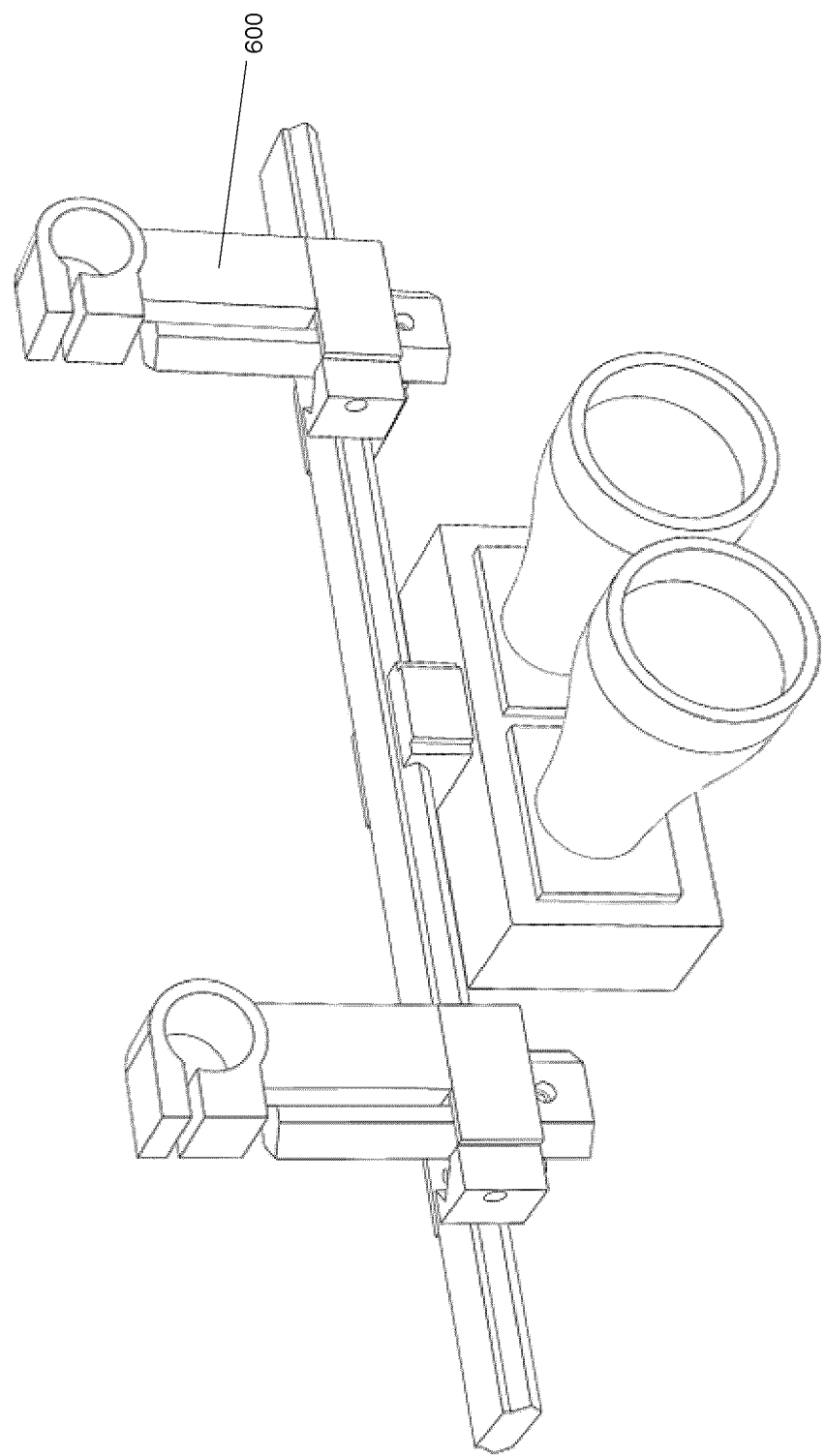
FIG. 55 shows a rod system with an accessory.

FIG. 55 shows a rod system 600 for different accessories. Different third party accessories can attach on the rod system (e.g. rod mount). This illustrates that the rod system of the lighting device can be used to affix different third-party accessories with a ¼-20 or ⅜-16 thread. The rod system can function without the LED light, for example.

The technical solution of embodiments may be in the form of a software product. The software product may be stored in a non-volatile or non-transitory storage medium, which can be a read-only memory, flash disk, or a removable hard disk, for example. The software product includes a number of instructions that enable a computer device (personal computer, server, or network device) to execute the methods provided by the embodiments.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the lighting device 10 can be a wirelessly controlled light that is designed to mount onto cinema matte boxes 40 or rods 80. The lighting device 10 can implement full colour animation and wireless control. The lighting device 10 can be controlled wirelessly via a long range radio that connects to the user's mobile device 18 with an external application. The user can connect the mobile device 18 to the lighting device 10 using different protocols, such as Bluetooth. The mobile device 18 can transmit long range to the lighting device 10.

The lighting device 10 can have multiple zones that can be individually animated to create unique lighting effects such as: fire flicker, police lights, club lights. The lighting device 10 can connect to an external application. The lighting device 10 can have internal software that can record and interpret lighting effects present on set and recreate them as an animation on the annular rectangular light 12. For example, the user can use the phone on their camera to record the lighting pattern of a police light on set, and have the lighting device 10 mimic that color, brightness, and animation pattern automatically.

The annular rectangular light 12 can be flipped backwards and used to flare the lens 44 on command. The lighting device 10 can do a global flare or a specific section of the ring can be used to selectively flare on section of the lens 44. The flare can also be animated to move around the lens 44, flash the lens 44, or create a variety of effects all without lighting the on-camera subject. Accordingly, in addition to lighting the camera's subject, the lighting device 10 can also be flipped backwards and used to flare the lens 44 from any angle.

Although the embodiments have been described in detail, it should be understood that various changes, substitutions and alterations can be made herein. As can be understood, the examples described above and illustrated are intended to be exemplary only.

What is claimed is:

1. A lighting device for a camera assembly comprising:
   a light surface that projects light, the light surface having an annular rectangular shape to surround a front of a lens of the camera assembly; and
   at least one mechanical linkage with a link to attach to a matte box of the camera assembly and position the light surface outside a field of view of the lens.

2. The lighting device of claim 1, wherein the at least one mechanical linkage has at least two translational degrees of freedom relative to the light surface.

3. The lighting device of claim 1, wherein the at least one mechanical linkage comprises two mechanical linkages.

4. The lighting device of claim 1, wherein the light surface projects light away from the front of the lens in a first configuration of the lighting device, and causes light to be projected towards the front of the lens in a second configuration of the lighting device.

5. The lighting device of claim 1, wherein the lighting surface includes a plurality of addressable light emitting diodes (LEDs) configured to project light.

6. The lighting device of claim 1, comprising:
   at least one processor operatively coupled to the light surface;
   non-transitory machine-readable memory storing instructions, the instructions configured to control the processor to:
   receive an input indicative of a state of the light surface, and
   cause the light surface to achieve the state by sending an output to the light surface based on the input.

7. The lighting device of claim 6, wherein the light surface includes a plurality of digital addressable light emitting diodes (LEDs) configured to project light via the lighting surface and the state of the light surface includes a color and an intensity of each of the plurality of digital addressable LEDs.

8. The lighting device of claim 1, wherein the at least one mechanical linkage is configured to position the light surface in front of the matte box of the camera assembly.

9. The lighting device of claim 1, wherein the at least one mechanical linkage has a first end connected to the light surface and a second end configured to attach to the matte box, the link of the mechanical linkage slidably engaged with the first end to position the second end.

10. The lighting device of claim 9, wherein the link is a first link and a mechanical linkage of the at least one mechanical linkage includes a second link slidably engaged with the first link, wherein a direction of slidable engagement of the second link with the first link is different than a direction of slidable engagement of the first link with the first end.

11. The lighting device of claim 1, wherein the at least one mechanical linkage has a first end and a second end, the first end connected to the light surface, the second end configured to attach to a mounting adapter of the matte box of the camera assembly, the mounting adapter being of a first type of mounting adapter.

12. The lighting device of claim 11, wherein at least one link of the mechanical linkage is removable to change the second end of the at least one mechanical linkage such that the second end is configured to attach to a second mounting adapter, the second mounting adapter being of a second type of mounting adapter.

13. The lighting device of claim 1, wherein the at least one mechanical linkage has a first end connected to the light surface and a second end configured to attach to the matte box, wherein a mechanical linkage of the at least one mechanical linkage includes a third link fixedly connected to the second end of the mechanical linkage, a second link connected to the third link via a pivot joint, the second link slidably engaged with the first link of the mechanical linkage.

14. The lighting device of claim 13, wherein the first link is slidably engaged with the first end.

15. The lighting device of claim 1, wherein the at least one mechanical linkage has a first end and a second end, the first end connected to the light surface, the second end including a connector configured to connect to a rod of the camera assembly.

16. The lighting device of claim 15, wherein the connector is an adjustable clamp configured to receive a rod.

17. The lighting device of claim 1, wherein the at least one mechanical linkage includes two mechanical linkages, each mechanical linkage has a first end connected to the light surface and a second end configured to attach to the matte box, a spacing between the second ends of the two mechanical linkages being adjustable.

18. The lighting device of claim 1, wherein the at least one mechanical linkage has a first end connected to the light surface and a second end configured to attach to the matte box, wherein the mechanical linkage comprises an adjustable joint for positioning the second end relative to the first end, a fastener coupled to the adjustable joint to permit movement of the adjustable joint in a first configuration and prevent movement of the adjustable joint in a second configuration.

19. The lighting device of claim 1, wherein the at least one mechanical linkage has a first end and a second end, the first end connected to the light surface, the at least one mechanical linkage configured to offset the second end of the mechanical linkage with respect to a center of the front of the lens in a vertical direction and in a horizontal direction, wherein the vertical and horizontal directions are parallel to a plane of the front of the lens.

20. The lighting device of claim 1, wherein an aspect ratio of the lighting surface is proportional to the field of view of the lens.

21. The lighting device of claim 1, wherein the link attaches to a matte box wing mounting point of the matte box, wherein the matte box wing mounts to the lighting device.

22. The lighting device of claim 1, wherein the at least one mechanical linkage is configured to move the light surface relative to the camera assembly in multiple planes of motion.

23. The camera assembly comprising the lighting device of claim 1.

24. A lighting device for a camera assembly comprising:
a light surface that projects light, the light surface having an annular rectangular shape to surround a front of a lens of the camera assembly; and
at least one mechanical linkage with a link to attach to the camera assembly and flexibly position the light surface outside a field of view of the lens.

25. A lighting device for a camera assembly comprising:
a light surface that projects light, the light surface having an annular rectangular shape to surround a front of a lens of the camera assembly; and
a plurality of mechanical linkages to attach to a matte box of the camera assembly and position the light surface outside a field of view of the lens, wherein the linkages have enable movement in a plurality of degrees of freedom.

26. A lighting device for a camera assembly comprising:
a light surface that projects light, the light surface having an annular rectangular shape to surround a front of a lens of the camera assembly; and
a plurality of mechanical linkages to position the light surface outside a field of view of the lens, wherein the linkages are configured to move the light surface relative to the camera assembly in multiple planes of motion.

27. A lighting device for a camera assembly comprising:
a light surface that projects light, the light surface having an annular rectangular shape to surround a front of a lens of the camera assembly; and
a plurality of mechanical linkages to attach to the camera assembly and position the light surface outside a field of view of the lens, wherein the linkages provide a bracket system and a rod system, wherein the linkages have enable movement of the light surface relative to the camera assembly.

* * * * *